(12) United States Patent
Dorfman et al.

(10) Patent No.: US 7,227,658 B2
(45) Date of Patent: Jun. 5, 2007

(54) CONTENT MANAGEMENT IN A BROADBAND PRINTING SYSTEM

(75) Inventors: Gregory Dorfman, Laguna Niguel, CA (US); William B. Warshaw, Brea, CA (US); Ramon Rubio, Downey, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 909 days.

(21) Appl. No.: 09/920,064

(22) Filed: Aug. 1, 2001

(65) Prior Publication Data
US 2003/0025931 A1    Feb. 6, 2003

(51) Int. Cl.
B41J 1/00 (2006.01)
G06F 15/00 (2006.01)

(52) U.S. Cl. .............. 358/1.15; 358/1.1; 358/1.15; 709/200; 709/201; 715/37; 715/44

(58) Field of Classification Search ............ 358/1.1, 358/1.15; 709/200, 201; 395/101; 725/37, 725/44
See application file for complete search history.

(56) References Cited

U.S. PATENT DOCUMENTS

| | | | |
|---|---|---|---|
| 5,712,712 A | | 1/1998 | Sayward ............ 358/403 |
| 5,721,827 A | * | 2/1998 | Logan et al. ......... 709/217 |
| 5,867,633 A | | 2/1999 | Taylor, III et al. ...... 395/109 |
| 6,226,686 B1 | | 5/2001 | Rothschild et al. ..... 709/245 |
| 6,229,621 B1 | | 5/2001 | Kulakowski et al. .... 358/1.15 |
| 6,330,598 B1 | * | 12/2001 | Beckwith et al. ....... 709/223 |
| 6,345,288 B1 | * | 2/2002 | Reed et al. ........... 709/201 |
| 6,799,198 B1 | * | 9/2004 | Huboi et al. .......... 709/203 |

FOREIGN PATENT DOCUMENTS

| | | |
|---|---|---|
| EP | 1071007 | 1/2001 |
| JP | 64-066768 | 3/1989 |
| WO | WO-0075757 | 12/2000 |
| WO | WO-0075768 | 12/2000 |

(Continued)

OTHER PUBLICATIONS

RFC 2565: "Internet Printing Protocol/ 1.0: Model and Semantics", <ftp://ftp.pwg.org/pub/pwg/ipp/published-ipp-rfcs/rfc2565.txt>, (visited Jul. 19, 1999) 32 pages.

(Continued)

*Primary Examiner*—Aung S. Moe
*Assistant Examiner*—Peter K. Huntsinger
(74) *Attorney, Agent, or Firm*—Fitzpatrick, Cella, Harper & Scinto

(57) ABSTRACT

An interface between a service provider application and a content providing application in a network printing system, comprising functionality for configuring the interface for the service provider to interface with the content providing application on a first level, wherein the first level comprises service provider administration properties, functionality for configuring the interface for a multi-service operator to interface with the content providing application on a second level, wherein the second level comprises multi-service level administration properties that comprise a portion of the service provider administration properties, and functionality for configuring the interface for an end user to interface with the content providing application on a third level, wherein the third level comprises end user level administration properties that comprise a portion of the multi-service provider administration properties. The service provider administration properties may comprise system maintenance, service maintenance and subscriber maintenance operations, the multi-service provider administration properties may comprise the service provider administration properties except system maintenance operations and service maintenance operations specifically relating to service provider level operations, and the end user administration properties may comprise the subscriber maintenance operations.

32 Claims, 81 Drawing Sheets

FOREIGN PATENT DOCUMENTS

| WO | WO-0075798 | 12/2000 |
| WO | WO-0075799 | 12/2000 |
| WO | WO-0076198 | 12/2000 |
| WO | WO-0076199 | 12/2000 |
| WO | WO-0076203 | 12/2000 |
| WO | WO-0076204 | 12/2000 |

OTHER PUBLICATIONS

RFC 2566: "Internet Printing Protocol/ 1.0: Encoding and Transport", <ftp://ftp.pwg.org/pub/pwg/ipp/published-ipp-rfcs/rfc2566.txt>, (visited Jul. 19, 1999) 150 pages.

RFC 2567: "Design Goals for an Internet Printing Protocol", <ftp://ftp.pwg.org/pub/pwg/ipp/published-ipp-rfcs/rfc2567.txt>, (visited Jul. 19, 1999) 38 pages.

RFC 2568: "Rationale for the Structure of the Model and Protocol for the Internet Printing Protocol", <ftp://ftp.pwg.org/pub/pwg/ipp/published-ipp-rfcs/rfc2565.txt>, (visited Jul. 19, 1999) 9 pages.

RFC 2569: "Mapping Between LPD and IPP Protocols", <ftp://ftp.pwg.org/pub/pwg/ipp/published-ipp-rfcs/rfc2569.txt>, (visited Jul. 19, 1999) 25 pages.

* cited by examiner

PSBContexBase interface

| | Method | Comment |
|---|---|---|
| Managing PSB configuration parameters | | |
| 1 | String getConfigParam (String paramName) | |
| 3 | PSBHashMap getConfigParamaAll () | |
| 5 | PSBConfigWriter getConfigWriter () | Returns *null* if write is illegal under the circumstances |
| Administrator profile | | |
| 6 | PSBInfoAdmin getPSInfoAdmin () | |
| General | | |
| 7 | PSBInfoPsbRegistration getPsbInfo () | |
| 8 | String getPsbServiceName () | |
| 9 | int getPsbServiceId () | |
| 10 | String getPSBPath() | Returns relative path to the location of PSB graphical resources (HTML, JSP, images) |

FIG. 16A

Context interfaces for different levels of hierarchy

| Method | Comment |
|---|---|
| PSBContextBpps interface | |
| 1 PSBInfoBpps getInfoBpps () | |
| PSBContextMso interface | |
| 2 PSBInfoMso getInfoMso () | |
| 3 PSBContextBpps getContextBpps () | |
| PSBContextEu interface | |
| 4 PSBInfoEu getInfoEu () | |
| 5 boolean isPrimarySubscriber () | |
| 6 PSBContextMso getContextMso () | |

FIG. 16B

| | Customer Service Rep | Administrator | System Operator |
|---|---|---|---|
| Subscriber Maintenance | x | x | x |
| 1. View Subscribers | x | x | x |
| 2. Add/Edit Subscriber | x | x | x |
| • Profile | x | x | x |
| • Subscriptions | x | x | x |
| • STB/Printers | x | x | x |
| 3. Delete Subscriber(s) | x | x | x |
| Service Maintenance | | | x |
| 1. View Services (PSB's) | | x | x |
| 2. Suspend Service(s) | | x | x |
| 3. Resume Service(s) | | x | x |
| 4. Add/Remove from MSO | | | x |
| System Maintenance | | | x |
| 1. View System Status | | x | x |
| 2. View Operators | | x | x |
| 3. Add/Edit Operators | | | x |
| • Customer Service | | x | x |
| • Administrators | | x | x |
| • System Operators | | | x |
| 4. Delete Operators | | | x |
| • Customer Service | | x | x |
| • Administrators | | x | x |
| • System Operators | | | x |
| 5. View Events | | x | x |
| 6. Configure Event | | x | x |

FIG. 17

Broadband Printing and Photo Services

BPPS

- Home
- Subscribers
- Services
- System

Services Maintenance > affiliate view
Affiliate | Global

| | Name | Service ID | Status | # Subscribers |
|---|---|---|---|---|
| | Print Library | 104 | Active | 0 |
| ☐ | Photo Center | 108 | Active | 0 |
| ☐ | North side Broadcast | 111 | Active | 51 |
| ☐ | South side Broadcast | 112 | Active | 50 |
| ☐ | ValuPage #1 | 113 | Active | 51 |
| ☐ | ValuPage #2 | 114 | Active | 50 |

○ Suspend  ● Resume

Home | Subscribers | Services | System
Copyright © 2001 Canon Information Systems. All rights reserved
Version: 2.00.1380

FIG. 20

Broadband Printing and Photo Services

BPPS

- Home
- Subscribers ▲
- Services ▲
- System ▲

BPPS User:
The Administrator
(ADMIN)

● Logout

Search:
Allan Bradley

Search:
● last name
○ account number
○ phone
[go]

Services Maintenance > global view — 211

Affiliate | Global
▲

| | Name | Service ID | Status | # Subscribers | Affiliate |
|---|---|---|---|---|---|
| ☐ | Print Library | 104 | Active | 0/0 | not implemented |
| ☐ | Photo Center | 108 | Active | 0/0 | not implemented |
| ☐ | North side Broadcast | 111 | Active | 51/51 | not implemented |
| ☐ | South Side Broadcast | 112 | Active | 50/50 | not implemented |
| ☐ | ValuPage #1 | 113 | Active | 51/51 | not implemented |
| ☐ | ValuPage #2 | 114 | Active | 50/50 | not implemented |

— 212

● Suspend  ● Resume                                    ● Update

Home | Subscribers | Services | System
Copyright © 2001 Canon Information Systems. All rights reserved
Version: 2.00.1380

FIG. 21

Broadband Printing and Photo Services

BPPS

Home
Subscribers ▶
Services ▲ ▼
System ▲ ▼

BPPS User:
The Administrator
(ADMIN)

● Logout

Search:
Allan Bradley

Search: [    ] go
◉ last name
○ account number
○ phone

Services Maintenance > edit

Print Library

| Set-up | About PSB |

*216*  *217*

Print Library System configuration

Print Library Server Address (URL)
[146.184.27.169:7001]  *218*
Just type in host name and port number. I.E:
*samehost.com:7001*
Do not include protocol
You cannot leave the field blank ● Save  ● Exit
[Click to save]
*219*

*215*

Home | Subscribers | Services | System
Copyright © 2001 Canon Information Systems. All rights reserved
Version: 2.00.1380

FIG. 22

Broadband Printing and Photo Services

BPPS

Home
Subscribers ▲
Services ▲
System ▲

BPPS User:
The Administrator
(ADMIN)

● Logout

Search:
Allan Bradley

Search: [        ] (go)
◉ last name
○ account number
○ phone

Services Maintenance > affiliate view

Affiliate | Global
▲

| | Name | Service ID | Status | # Subscribers |
|---|---|---|---|---|
| ☐ | Print Library | 104 | Active | 0 |
| ☐ | Photo Center | 108 | Active | 0 |
| ☐ | North side Broadcast | 111 | Active | 51 |
| ☐ | South Side Broadcast | 112 | Active | 50 |
| ☐ | ValuPage #1 | 113 | Active | 51 |
| ☐ | Valupage #2 | 114 | Active | 50 |

225 ↗                                    220

● Suspend  ● Resume

Home | Subscribers | Services | System
Copyright © 2001 Canon Information Systems. All rights reserved
Version: 2.00.1380

FIG. 24

Broadband Printing and Photo Services

BPPS

- Home
- Subscribers
- Services
- System

BPPS User:
The Administrator
(ADMIN)

● Logout

Selected:
Allan Bradley

Search: [    ] (go)
● last name
○ account number
○ phone

Services Maintenance > edit
Print Library

[ Manage Documents ]  — 230

[ About PSB ]

Document Status [Active ▼]  [ List ]

Number of documents found : 16

| | Doc ID | Nick Name | Title | Modified | Active |
|---|---|---|---|---|---|
| ☐ | 15 | Boston News | 𝄞 The Boston Globe | 07/26/01 | ✓ |
| ☐ | 9 | Classics | 𝄞 Millenium Classics 2000 | 07/25/01 | ✓ |
| ☐ | 6 | Climate | 𝄞 Climate Today | 07/25/01 | ✓ |
| ☐ | 18 | Diseases | 𝄞 Diseases | 07/26/01 | ✓ |
| ☐ | 16 | Fax | 𝄞 Intelligent Fax | 07/26/01 | ✓ |
| ☐ | 12 | Flight | 𝄞 Flight Standards | 07/25/01 | ✓ |
| ☐ | 8 | James Bond 007 | 𝄞 007 - James Bond | 07/26/01 | ✓ |
| ☐ | 13 | Movie | 𝄞 Movies and Entertainment | 07/26/01 | ✓ |
| ☐ | 17 | Movies | 𝄞 Movie Entertainment | 07/25/01 | ✓ |
| ☐ | 1 | News | 𝄞 News and Weather | 07/25/01 | ✓ |
| | 5 | | Other Information | 07/26/01 | |

[ Delete ]  [ Add ]

— 226

● Save  ● Exit

Broadband Printing and Photo Services

BPPS

- Home
- Subscribers
- Services
- System

BPPS User:
The Administrator
(ADMIN)

● Logout

Selected:
Allan Bradley

Search: [go]
● last name
○ account number
○ phone

Services Maintenance > edit
Print Library

| Manage Documents | | About PSB | | |
|---|---|---|---|---|
| Add | | Document Status [Active ▼] | Number of documents found: 17 | List |

| Doc ID | Nick Name | Title | Modified | Active |
|---|---|---|---|---|
| ☐ 15 | Boston News | The Boston Globe | 07/26/01 | ✓ |
| ☐ 9 | Classics | Millenium Classics 2000 | 07/25/01 | ✓ |
| ☐ 6 | Climate | Climate Today | 07/25/01 | ✓ |
| ☐ 18 | Diseases | Diseases | 07/26/01 | ✓ |
| ☐ 20 | DMV License | DMV - Special License Application | 07/27/01 | ✓ |
| ☐ 16 | Fax | Intelligent Fax | 07/26/01 | ✓ |
| ☐ 12 | Flight | Flight Standards | 07/26/01 | ✓ |
| ☐ 8 | James Bond 007 | 007 - James Bond | 07/25/01 | ✓ |
| ☐ 13 | Movie | Movies and Entertainment | 07/26/01 | ✓ |
| ☐ 17 | Movies | Movie Entertainment | 07/25/01 | ✓ |
| ☐ 1 | News | News and Weather | 07/25/01 | ✓ |
| ☐ 5 | Other Info | Other Information | 07/25/01 | ✓ |
| ☐ 7 | Recepie | Barberque Recepies | 07/25/01 | ✓ |
| ☐ 4 | Restaurants | Local Restaurants | 07/25/01 | ✓ |
| ☐ 10 | Science Info | Science Booth | 07/26/01 | ✓ |
| ☐ 2 | Sitar | Recipes | 07/25/01 | ✓ |
| ☐ 14 | US Economy | US Economy | 07/26/01 | ✓ |

Delete

FIG. 33

Broadband Printing and Photo Services

BPPS

- Home
- Subscribers
- Services
- System

BPPS User:
The Administrator
(ADMIN)

● Logout

Selected:
Allan Bradley

Search:
◉ last name
○ account number
○ phone

Services Maintenance > edit
Print Library

| Affiliate | |
| Global | |

Manage Documents | About PSB

Add

| Doc ID | Nick Name | Title | Document Status | Active ▼ | List |
|---|---|---|---|---|---|

Number of documents found: 16

| Doc ID | Nick Name | Title | Modified | Active |
|---|---|---|---|---|
| ☐ 15 | Boston News | 🗎 The Boston Globe | 07/26/01 | ✓ |
| ☐ 9 | Classics | 🗎 Millenium Classics 2000 | 07/25/01 | ✓ |
| ☐ 6 | Climate | 🗎 Climate Today | 07/25/01 | ✓ |
| ☐ 18 | Diseases | 🗎 Diseases | 07/26/01 | ✓ |
| ☐ 16 | Fax | 🗎 Intelligent Fax | 07/26/01 | ✓ |
| ☐ 12 | Flight | 🗎 Flight Standards | 07/25/01 | ✓ |
| ☐ 8 | James Bond 007 | 🗎 007 - James Bond | 07/26/01 | ✓ |
| ☐ 13 | Movie | 🗎 Movies and Entertainment | 07/26/01 | ✓ |
| ☐ 17 | Movies | 🗎 Movie Entertainment | 07/26/01 | ✓ |
| ☐ 1 | News | 🗎 News and Weather | 07/25/01 | ✓ |
| ☐ 5 | Other info | 🗎 Other Information | 07/25/01 | ✓ |
| ☐ 7 | Recepie | 🗎 Barberque Recepies | 07/25/01 | ✓ |
| ☐ 4 | Restaurants | 🗎 Local Restaurants | 07/26/01 | ✓ |
| ☐ 10 | Science Info | 🗎 Science Booth | 07/25/01 | ✓ |
| ☐ 2 | Sitar | 🗎 Recipes | 07/26/01 | ✓ |
| ☐ 14 | US Economy | 🗎 US Economy | 07/26/01 | ✓ |

● Save   ● Exit

Address: http://146.184.27.169:7001/Main/services

Broadband Printing and Photo Services

BPPS

- Home
- Subscribers ▲
- Services ▲
- System ▲

BPPS User:
The Administrator
(ADMIN)

● Logout

Search: [____] (go)
◉ last name
○ account number
○ phone

Services Maintenance > affiliate view
Affiliate | Global

| | Name | Service ID | Status | # Subscribers |
|---|---|---|---|---|
| ☐ | Print Library | 104 | Active | 0 |
| ☐ | Photo Center | 108 | Active | 0 |
| ☐ | North Side Broadcast | 111 | Active | 52 |
| ☐ | South Side Broadcast | 112 | Active | 50 |
| ☐ | ValuPage #1 | 113 | Active | 51 |
| ☐ | ValuPage #2 | 114 | Active | 50 |

● Suspend  ● Resume

Home | Subscribers | Services | System
Copyright © 2001 Canon Information Systems. All rights reserved
Version: 2.00.1380

FIG. 35

Broadband Printing and Photo Services

BPPS

Home
Subscribers
Services
System

BPPS User:
The Administrator
(ADMIN)

● Logout

Selected:
Allan Bradley

Search:
◉ last name
○ account number
○ phone

Services Maintenance > edit
North Side Broadcast

| Set - up | English | About PSB |

Broadcast Start Date : 07/19/2001
Broadcast End Date : 09/21/2001
Number Of Subscribers: 51
Delivery counter (since last document upload) : 53

● Save  ● Exit

Home | Subscribers | Services | System
Copyright © 2001 Canon Information Systems. All rights reserved
Version: 2.00.1380

Address: http://146.184.27.169:7001/Main/servicesglobal

Broadband Printing and Photo Services

BPPS

- Home
- Subscribers ▲
- Services ▲
- System ▲

BPPS User:
The Administrator
(ADMIN)

● Logout

Search: [____] (go)
● last name
○ account number
○ phone

Services Maintenance > global view

Affiliate | Global
▲

| | Name | Service ID | Status | # Subscribers | Affiliate |
|---|---|---|---|---|---|
| ☐ | Print Library | 104 | Active | 0 / 0 | not implemented |
| ☐ | Photo Center | 108 | Active | 0 / 0 | not implemented |
| ☐ | North Side Broadcast | 111 | Active | 52/52 | not implemented |
| ☐ | North Side Broadcast | 112 | Active | 50/50 | not implemented |
| ☐ | ValuPage # 1 | 113 | Active | 51/51 | not implemented |
| ☐ | ValuPage # 2 | 114 | Active | 50/50 | not implemented |

● Suspend  ● Resume                                      ● Update

Home | Subscribers | Services | System
Copyright © 2001 Canon Information Systems. All rights reserved
Version: 2.00.1380

Address: http://146.184.27.169:7001/Main/services

Broadband Printing and Photo Services

BPPS

- Home
- Subscribers ▲
- Services ▲
- System ▲

BPPS User:
The Administrator
(ADMIN)

● Logout

Search: [    ] go
● last name
○ account number
○ phone

Services Maintenance > affiliate view

Affiliate | Global
▲

| | Name | Service ID | Status | # Subscribers |
|---|---|---|---|---|
| ☐ | Print Library | 104 | Active | 0 |
| ☐ | Photo Center | 108 | Active | 0 |
| ☐ | North Side Broadcast | 111 | Active | 52 |
| ☐ | South Side Broadcast | 112 | Active | 50 |
| ☐ | ValuPage #1 | 113 | Active | 51 |
| ☐ | ValuPage #2 | 114 | Active | 50 |

● Suspend  ● Resume

Home | Subscribers | Services | System
Copyright © 2001 Canon Information Systems. All rights reserved
Version: 2.00.1380

Address: http://146.184.27.169:7001/Main/editservice?serviceID=113

Broadband Printing and Photo Services

BPPS

- Home
- Subscribers ▲
- Services ▲
- System

BPPS User:
The Administrator
(ADMIN)

● Logout

Selected:
Allan Bradley

Search:
(go)
● last name
○ account number
○ phone

Services Maintenance > edit

ValuPage #1

| View |
| Add |
| Primary |
| Set-top Box |
| Subscriptions |

Security | About PSB

? X

Catalina Coupons Security Settings

User Name for accessing remote server
[BPS]

User Password for accessing remote server
[******]

Re-type Password
[******]

Test connection
This optional test validates account credentials for accessing the Catalina Coupons remote server. Please enter the user Name and password provided by catalina coupons and click the Execute button.

[Execute]

Notes:
1. You must have an active connection to the Internet and the catalina coupons server must be accepting request for this to succeed.
2. The catalina coupons remote server URL needs to be entered. If it has not been, please refer to the Global level page for this PSB and enter it now ○ Internet

FIG. 44

Address: http://146.184.27.169:7001/Main/subscribers

Broadband Printing and Photo Services

BPPS

- Home
- Subscribers ▲
- Services ▲
- System

BPPS User:
The Administrator
(ADMIN)

● Logout

Selected:
Allan Bradley

Search: [____] 🔘
● last name
○ account number
○ phone

Services Maintenance 52 result(s) found ....

1 - 10 ▲

| | | Name | Type | Account Number | Phone |
|---|---|---|---|---|---|
| ◇ | ☐ | Allen, Chan | Primary | 987853430002 | 624.365.9656 |
| ◇ | ☐ | Amit, Gupta | Primary | 987853430003 | 973.598.7845 |
| ◇ | ☐ | Asente, Paul | Primary | 987853430062 | 503.603.2111 |
| ◇ | ☐ | Bradley, Jeff | Primary | 987853430004 | 503.439.6393 |
| ◇ | ☐ | Byer, Scott | Primary | 987853430014 | 787.465.4567 |
| ◇ | ☐ | Cong, Nguyen | Primary | 987853430031 | 949.737.6836 |
| ◇ | ☐ | Doyce, Paul | Primary | 987853430001 | 925.928.9292 |
| ◇ | ☐ | DSilva, Anabela | Primary | 987853430052 | 363.369.5648 |
| ◇ | ☐ | Enos, Randy | Primary | 987853430006 | 965.454.4587 |
| ◇ | ☐ | Feuntes, Mary | Primary | 987853430006 | 788.454.6985 |

● Add  ● Remove

Home | Subscribers | Services | System
Copyright © 2001 Canon Information Systems. All rights reserved
Version: 2.00.1380

FIG. 45

Address: http://146.184.27.169:7001/Main/subscribers

Broadband Printing and Photo Services

BPPS

- Home
- Subscribers ▲
- Services ▲
- System ▲

BPPS User:
The Administrator
(ADMIN)

● Logout

Selected:
Allan Bradley

Search: [____] (go)
● last name
○ account number
○ phone

Services Maintenance 52 result(s) found ...

🔍 ? ×

1 - 10 ▲

| | | View | Name | Type | Account Number | Phone |
|---|---|---|---|---|---|---|
| ◇ | ☐ | Add | Allen, Chan | Primary | 987853430002 | 624.365.9656 |
| ◇ | ☐ | Primary | Amit, Gupta | Primary | 987853430003 | 973.598.7845 |
| ◇ | ☐ | Set-top Box | Asente, Paul | Primary | 987853430062 | 503.603.2111 |
| ◇ | ☐ | Subscriptions | Bradley, Jeff | Primary | 987853430004 | 503.439.6393 |
| ◇ | ☐ | | Byer, Scott | Primary | 987853430014 | 787.465.4567 |
| ◇ | ☐ | | Cong, Nguyen | Primary | 987853430031 | 949.737.6836 |
| ◇ | ☐ | | Doyce, Paul | Primary | 987853430001 | 925.928.9292 |
| ◇ | ☐ | | DSilva, Anabela | Primary | 987853430052 | 363.369.5648 |
| ◇ | ☐ | | Enos, Randy | Primary | 987853430006 | 965.454.4587 |
| ◇ | ☐ | | Feunles, Mary | Primary | 987853430006 | 788.454.6985 |

● Add   ● Remove

Home | Subscribers | Services | System
Copyright © 2001 Canon Information Systems. All rights reserved
Version: 2.00.1380

○ Internet

Broadband Printing and Photo Services

BPPS

- Home
- Subscribers ▲
- Services ▲
- System ▲

BPPS User:
The Administrator
(ADMIN)

● Logout

Search: [go]
◉ last name
○ account number
○ phone

Services Maintenance > edit primary

Primary | Set-top Box | Subscriptions

Enter properties for the new subscriber, then press the OK button.

| | |
|---|---|
| first name: | Allan |
| last name: | Bradley * |
| user name: | allan * |
| account number: | 987853430127 |
| Password: | ***** * |
| address: | 721 Sullivan Drive |
| city: | Los Angeles |
| State: | CA |
| Zip | 91825 * |
| phone: | 979 856 7356 * |
| email: | allanbrad@hotmail.com |
| country: | United States |
| Language: | English |

● OK  ● Cancel

Home | Subscribers | Services | System

FIG. 48

Address: http://146.184.27.169:7001/Main/subscribers

Broadband Printing and Photo Services

BPPS

- Home
- Subscribers ▲
- Services ▲
- System ▲

BPPS User:
The Administrator
(ADMIN)

● Logout

Selected:
Allan Bradley

Search: [____] go
- ◉ last name
- ○ account number
- ○ phone

Services Maintenance 53 result(s) found ...

1 - 10 ▲

| | | Name | Type | Account Number | Phone |
|---|---|---|---|---|---|
| ◇ | ☐ | Allen, Chan | Primary | 987853430002 | 624.365.9656 |
| ◇ | ☐ | Amit, Gupta | Primary | 987853430003 | 973.598.7845 |
| ◇ | ☐ | Asente, Paul | Primary | 987853430062 | 503.603.2111 |
| ◇ | ☐ | Bradley, Allan | Primary | 987853430127 | 979.856.7356 |
| ◇ | ☐ | Bradley, Jeff | Primary | 987853430004 | 503.439.6393 |
| ◇ | ☐ | Byer, Scott | Primary | 987853430014 | 787.465.4567 |
| ◇ | ☐ | Cong, Nguyen | Primary | 987853430031 | 949.737.6836 |
| ◇ | ☐ | Doyce, Paul | Primary | 987853430001 | 925.928.9292 |
| ◇ | ☐ | DSilva, Anabela | Primary | 987853430052 | 363.369.5648 |
| ◇ | ☐ | Enos, Randy | Primary | 987853430006 | 965.454.4587 |

( ● Add ) ( ● Remove )

Home | Subscribers | Services | System
Copyright © 2001 Canon Information Systems. All rights reserved
Version: 2.00.1380

FIG. 50

Address: http://146.184.27.169:7001/Main/subscribers

Broadband Printing and Photo Services

BPPS

Services Maintenance

Home | Subscribers | Services | System

| Subscribers ▲ | View |
|---|---|
| Services ▲ | Add |
| System ▲ | Primary |
| | Set-top Box |
| | Subscriptions |

BPPS User:
The Administrator
(ADMIN)

● Logout

Selected:
Allan Bradley

Search:
[go]
◉ last name
○ account number
○ phone 53 result(s) found....

1 - 10 ▲

| | | Name | Type | Account Number | Phone |
|---|---|---|---|---|---|
| ☐ | ◇ | Allen, Chan | Primary | 987853430002 | 624.365.9656 |
| ☐ | ◇ | Amit, Gupta | Primary | 987853430003 | 973.598.7845 |
| ☐ | ◇ | Asente, Paul | Primary | 987853430062 | 503.603.2111 |
| ☐ | ◇ | Bradley, Allan | Primary | 987853430127 | 979.856.7356 |
| ☐ | ◇ | Bradley, Jeff | Primary | 987853430004 | 503.439.6393 |
| ☐ | ◇ | Byer, Scott | Primary | 987853430014 | 787.465.4567 |
| ☐ | ◇ | Cong, Nguyen | Primary | 987853430031 | 949.737.6836 |
| ☐ | ◇ | Doyce, Paul | Primary | 987853430001 | 925.928.9292 |
| ☐ | ◇ | DSilva, Anabela | Primary | 987853430052 | 363.369.5648 |
| ☐ | ◇ | Enos, Randy | Primary | 987853430006 | 965.454.4587 |

● Add  ● Remove

Home | Subscribers | Services | System
Copyright © 2001 Canon Information Systems. All rights reserved
Version: 2.00.1380 settopbox

FIG. 51

Address: http://146.184.27.169:7001/Main/addsettopbox

Broadband Printing and Photo Services

BPPS

Home
Subscribers
Services
System

BPPS User:
The Administrator
(ADMIN)

● Logout

Selected:
Allan Bradley

Search: [____] go
⦿ last name
○ account number
○ phone

Services Maintenance > Set - top box > add    ? x

Enter properties for the new Set-top Box, then press the OK button.

STB address: [0010DC465C67] * location: [Living Room] *

● OK    ● Cancel

Home | Subscribers | Services | System
Copyright © 2001 Canon Information Systems. All rights reserved
Version: 2.00.1380 javascript:validate()    Internet

Address: http://146.184.27.169:7001/Main/search?action=search

Broadband Printing and Photo Services

BPPS

Home
Subscribers ▲

BPPS User:
csr csr
(CSR)

● Logout

Search: [ gg ]
⦿ last name
○ account number
○ phone

Subscriber Maintenance

◎ ? x 1 result(s) found..

| | | Name | Type | Account Number | Phone |
|---|---|---|---|---|---|
| ◇ | □ | Cong, Nguyen | Primary | 987953430031 | 949.737.6836 |

● Add   ● Remove

Home | Subscribers
Copyright © 2001 Canon Information Systems. All rights reserved
Version: 2.00.1380

Address: http://146.184.27.169:7001/Main/editsettopbox?action=submit

Broadband Printing and Photo Services

BPPS

Home
Subscribers ▲

BPPS User:
csr csr
(CSR)

● Logout

Selected:
Allan Bradley

Search: [____] (go)
● last name
○ account number
○ phone

Services Maintenance > Set-top box      ○ ? ×

Primary | Set-top Box | Subscriptions
▲

| ☑ | STB Address | Location | Status | # Jobs | Make | Model |
|---|---|---|---|---|---|---|
| ☐ | 0010DC465D12 | Discussion Bay | Active | 0 | Canon | BJC-2100 |
| ☐ | 0010DC465C67 | Living Room | Active | 0 | Canon | S600 |

● Add  ● Remove  ● Suspend  ● Resume

---

Home | Subscribers

Copyright © 2001 Canon Information Systems. All rights reserved
Version: 2.00.1382

CONTENT MANAGEMENT IN A BROADBAND PRINTING SYSTEM

BACKGROUND OF THE INVENTION

1. Field of the Invention

The invention concerns content management in broadband printing systems. More particularly, the invention concerns interfacing between a printing service provider application and a content providing application on different hierarchical levels for communication by the printing service application, a multi-service operator, and an end user with the content providing application for managing content information.

2. Description of the Related Art

A broadband printing system (BPS) has been proposed in co-pending U.S. patent application Ser. No. 09/357,433, filed Jul. 20, 1999 entitled "Internet-Based Push Printing Over Cable Network" in which a third party merchant (e.g. coupon provider) can push-print information across a high speed cable network to a set-top box in a user's home so that the information is printed on a printer connected to the set-top box. In the proposed BPS, the information to be printed on the user's home printer is transmitted via the Internet from the third party merchant to the user via a cable company (commonly referred to as a "cable head end"). The cable head end merely performs rasterization of the information utilizing a print driver corresponding to the type of printer connected to the set-top box in the user's home and then transmits the rasterized information via the cable network to the set-top box for printing on the user's home printer.

In the foregoing BPS system, a user generally enters into a subscription arrangement with the third party merchant to allow the merchant to push-print information onto the user's home printer. The cable head end merely acts as a channel of communication that receives the information from the merchant, processes the information with a print driver to prepare the information for printing on the user's home printer, and then transmits the processed information to the user's home printer via a cable network and a set-top box. Accordingly, management of the content information is provided by the third party merchant directly to the home user and different levels of hierarchy are not used.

While the foregoing system is effective as a broadband printing system, the inventors herein have found a technique for managing the content information in a way that is different from the foregoing approach.

Another system has been described in published PCT International Publication Number WO 00/75798, published on Dec. 14, 2000 (hereinafter referred to as the '798 publication). In the system described in the '798 publication, a document server manages content information for generating and delivering documents, including personalized publications requested by users. Content information is transmitted by content providers to the document server, which categorizes and stores the received content information in a content database. When a user wants to have a personalized publication delivered, the user activates a web page of a printing service provider (e.g. HP Instant Delivery) and completes a questionnaire to provide their name, address, areas of interest and scheduled delivery time. When the user has completed the questionnaire, the user's information is used to form a user profile which is stored in the document server. At the requested delivery time, the document server analyzes the user's profile to determine what content information stored in the content database is likely to be of interest to the user, retrieves the content information from the content database and assembles and delivers a personalized publication.

While the system of the '798 publication purports to provide for delivery of a personalized publication, the extent of the personalization is somewhat limited. In this regard, the foregoing system does not provide for the requesting user to interface with the content provider directly to select content information that he wants to receive. Instead, the user merely fills out a questionnaire that includes areas of interest and the document server selects the content information to be included in the personalized publication. As a result, the user has no way of knowing what content information he/she is going to receive until the personalized publication is delivered. Therefore, the lack of any direct link between the user and the content provider to allow the user to select the content information he wants to receive is one drawback of the '798 publication's system.

Another drawback with the '798 publication relates to multi-service operators, such as cable operators (cable head end). As described in the '798 publication, the delivery of personalized documents or publications is effected by the user requesting delivery of the document directly from the document server (via the Internet) and the document server delivering the document directly to the user (via the Internet). Therefore, the user enters into a subscription with the document server directly and does not subscribe with a multi-service operator. Therefore, there is no way for the multi-service operator to control the type of content information that their users can select for printing in the personalized publication.

As can be seen from the foregoing, the '798 publication lacks the ability for the user to communicate with the content providing application to select the content information they want to receive. In addition, the foregoing system lacks the ability for multi-service operators to control the accessability of the content information by their customers.

SUMMARY OF THE INVENTION

The present invention addresses the foregoing by providing an interface with different levels of access for managing the content information. According to the invention, an interface between a printing service application and a content providing application can be configured at different levels for each entity in the system to access the content providing application. In one representative embodiment, the interface is configured on one level for a service provider to access the content providing application, the interface is configured on a second level for a multi-service operator to access the content providing application, and the interface is configured on a third level for an end user to access the content providing application.

As a result, the interface provides an interactive way for printing service providers, multi-service operators and end users to all access the content providing application. Therefore, the multi-service operators are able to control the content information that is made available to their customers (end users) by configuring the interface accordingly, and the end user is able to access the content providing application to select the content information he/she wants to receive. Accordingly, the end users can select the content information directly, rather than receiving content information selected by a server.

Thus, in one aspect the invention is a publication service interface between a service provider application and a content providing application in a network printing system, comprising functionality for configuring the interface for the service provider to interface with the content providing application on a first level, wherein the first level comprises service provider administration properties, functionality for configuring the interface for a multi-service operator to interface with the content providing application on a second level, wherein the second level comprises multi-service level administration properties that comprise a portion of the service provider administration properties, and functionality for configuring the interface for an end user to interface with the content providing application on a third level, wherein the third level comprises end user level administration properties that comprise a portion of the multi-service provider administration properties.

In related aspects, the service provider administration properties may comprise system maintenance, service maintenance and subscriber maintenance operations, the multi-service provider administration properties may comprise the service provider administration properties except system maintenance operations and service maintenance operations specifically relating to service provider level operations, and the end user administration properties may comprise the subscriber maintenance operations. The system maintenance operations may comprise viewing system status, viewing operators, adding and editing operators, and deleting operators, the service maintenance operations comprise viewing services, suspending services, resuming services and adding/removing services, and the subscriber maintenance properties comprise viewing subscribers, adding and editing subscribers and deleting subscribers. The multi-service administration properties may comprise each of the system maintenance properties except some adding and editing operators and some deleting operators operations, each of the service maintenance operations except adding and removing services, and each of the subscriber maintenance operations, and the end user administration properties may comprise on the subscriber maintenance properties.

The interface may further comprise functionality for obtaining content information from the content providing application at a scheduled delivery time, and for managing delivery of the content information to the end user. Additionally, the interface can be configured differently for each of a plurality of multi-service operators to provide each multi-service operator with a different interface at the second level to the content providing application.

In another aspect, the invention manages content information between a service providing application and a content providing application by the service providing application interfacing with the content providing application on a first level to perform service provider operator level administration operations, a multi-service provider interfacing with the content providing application on a second level to perform multi-service operator level administration operations, the multi-service operator level operations being less than all of the service provider operator level administration operations, and an end user interfacing with the content providing application on a third level to perform end user operator level administration operations, the end user operator level administration operations being less than all of the multi-service operator level operations.

In yet another aspect, the invention manages content information in a network printing system by a printing service provider, which maintains a printing service application, configuring an interface between the printing service application and a content providing application, which is maintained by a content provider, so that the printing service application can perform administration operations with the content providing application on a first level, a multi-service operator, which provides subscriptions for a printing service provided by the printing service provider to end users of the multi-service operator, configuring the interface to interface between the multi-service operator and the content providing application so that the multi-service operator can perform administration operations on the content providing application on a second level, and an end user, which subscribes to the printing service provided by the multi-service operator, configuring the interface between the end user and the content providing application for the end user to perform administration operations on the content providing application on a third level.

In yet a further aspect, the invention is a network printing system, comprising a printing service provider that provides a printing service application, the printing service application including an interface with a content providing application of a content provider that provides content information to be included in a publication generated by the printing service application, the interface being configured for the printing service provider to perform administration operations on the content providing application on a first level, a multi-service operator that provides subscriptions to the printing service to end users, the interface being configured for the multi-service operator to perform administration operations on the content providing application on a second level, and an end user that subscribes to the printing service with the multi-service operator, the interface being configured for the end user to perform administration operations on the content providing application on a third level.

In yet a further aspect, the invention is a broadband printing system in which content information maintained by a content provider is printed on an end user's printer based on subscription information provided by the end user to a broadband printing service provider, comprising plural content providers that each maintain a content providing application of content information for printing on the end user's printer, a broadband printing service provider that operates a broadband printing service that obtains content information from at least one of the plural content providers and processes the obtained content information to be printed on the end users printer, plural multi-service operators that each receive subscription requests for the broadband printing service from plural end users, wherein each multi-service operator can determine which of the plural content providers the end user can request a subscription to, and plural end users that subscribe with at least one of the plural multi-service operators to receive content information and have it printed on the end user's printer, wherein, an interface between the broadband printing service and the content providing application provides for the broadband printing service to perform operations with the content providing application on a first level, for each of the plural multi-service operators to perform operations with the content providing application on a second level lower than the first level, and for each of the end user's to perform operations with the content providing application on a third level lower than the second level.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 16A and 16B are tables listing context interface functions.

FIG. 17 is a table listing services available to an operator based on the operator's level of access.

FIGS. 18 to 58 depict user interface screens for various operations performed by a BPPS level operator in an example of the invention.

FIGS. 59 to 80 depict user interface screens for various operations performed by an end user level operator (customer service representative) in an example of the invention.

DETAILED DESCRIPTION OF THE PREFERRED EMBODIMENTS

Figure 1:
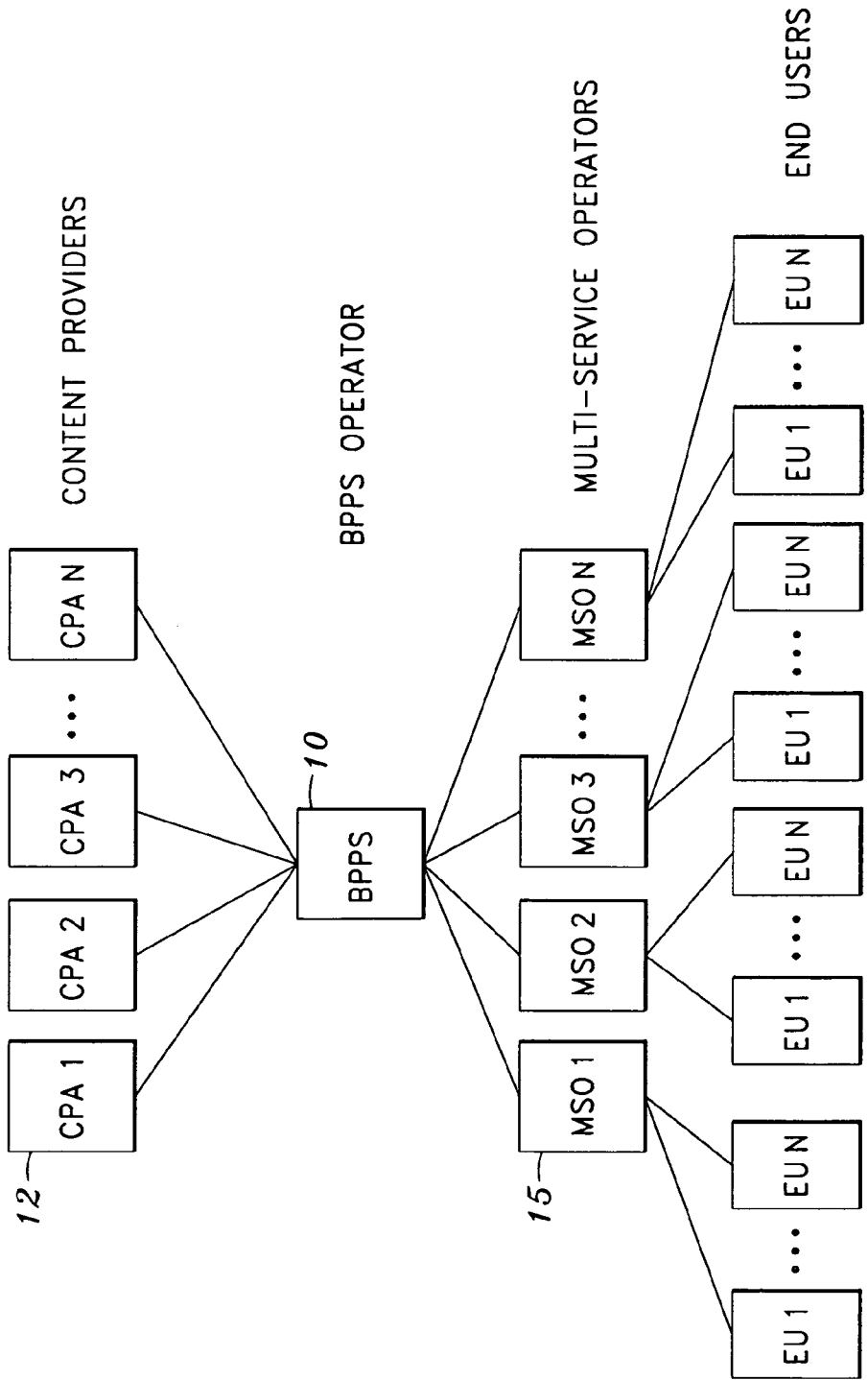
FIG. 1 depicts an example of a printing network in which the invention may be employed.

FIG. 1 depicts an example of a network printing system in which the invention may be employed. Generally, the network depicted in FIG. 1 is preferably a broadband printing system in which home users subscribe with a cable operator to have information printed on a printer in the user's home that is connected to a set-top box that can be controlled by the cable operator. Such a broadband printing system preferably includes a system operator that operates the broadband printing system (hereinafter referred to as a BPPS provider (Broadband Printing and Photo Services)). The BPPS provider may be, for example, Canon. As will be described in more detail below, the BPPS provider receives requests from users for delivery of content information and manages various processes to deliver the information to the users.

As seen in FIG. 1, BPPS provider 10 communicates with multiple content providers 12. Content providers 12 are preferably entities that offer content information that can be accessed and/or obtained from a content providing application (CPA) that is maintained in a server of the content provider. For example, a coupon vendor may be a content provider that provides an application program in a server which maintains a library of coupons. The coupons may be for grocery stores, hardware stores, restaurants, convenience stores, movie theaters, etc. The coupons are stored in electronic form in a database of the content provider's server and at any given time, can be retrieved from the database for downloading to the home user's printer.

Another example of a content provider may be a news organization that publishes daily newspapers. For instance, the Wall Street Journal may be a content provider that generates an electronic version of its daily publication that can be downloaded to the home user to be printed on a printer in their home. However, as will be described below, the present invention provides distinct advantages over conventional hardcopy subscriptions to receive the daily hardcopy publication by allowing the home user to tailor their electronic subscription to receive only the content information contained in the daily publication that the user wants to receive, while omitting other content.

BPPS provider 10 also communicates with multiple multi-service operators 15. The multi-service operators are preferably local cable companies that provide a variety of services to home users. For example, a multi-service operator may provide digital cable television to home viewers, as well as digital Internet access via a high speed cable line. Generally, a multi-service operator that provides digital television services installs and configures a digital set-top box in the user's home. The digital set-top box may be, for example, a Scientific Atlanta Explorer 2010 or higher model set-top box. In practicing the invention, the set-top box preferably includes the ability to connect with a printer, e.g. a USB (Universal Serial Bus) connection. By connecting the printer to the set-top box, the multi-service operator can transmit print data via its cable network to the set-top box to be printed on the home user's printer.

With the system shown in FIG. 1, in order for each of the multi-service operators to communicate with the BPPS provider, the multi-service operators enter into a licensing agreement or some other type of agreement with the BPPS provider for the multi-service operator to have access to the BPPS application so they can offer the BPPS service to their customers (e.g. home users). Of course, the BPPS provider and the multi-service operator could be the same entity and could provide the BPPS service to its end users without the need for any type of license agreement. However, the system shown in FIG. 1 is preferred. After having entered into an agreement with the BPPS provider, the multi-service operator is provided access to the BPPS application and can then configure the BPPS application according to their (the multi-service operator's) needs and offer it to their customers (end users). That is, the BPPS provider generally permits the multi-service operator to have access to all of the content provider applications that the BPPS provider has available. However, in some cases, the multi-service operator may not want to provide some of the content applications to its customers. Therefore, as will be described in more detail below, the multi-service operator can configure the access that they want to allow their customers to have to the BPPS services based on their preferences.

Returning to FIG. 1, a brief description will be given regarding the process of a home user requesting (subscribing) to have content information printed on their home printer and the content information being delivered to the home user. The home user subscribes with their multi-service operator to receive content information. They may, for example, call a customer service representative to request the BPPS service, log-in to a web site of the multi-service operator and request the service, call up a subscription screen on their television, etc. The home user sets up a subscription account that may include their name, address, type of printer, type of set-top box, type of connection, delivery days and times, and the content information to be printed. The home user can select the content information that he/she wants to have printed based on the information made available by the multi-service operator's configuration of the BPPS service. The home user's subscription information is provided to the BPPS application, which maintains the subscription in a database. At the requested delivery time, the BPPS provider obtains the requested content information from the appropriate content providing application and processes the content information to deliver it to the home user, via the multi-service operator. The processed content information is then printed on the user's home printer via the set-top box.

In the system of FIG. 1, the BPPS application is maintained in a BPPS application server of the BPPS provider. The BPPS application provides the functionality for operating the broadband printing system. As will be described in more detail below, each content provider develops a publication service bundle (PSB) specific to their content information and provides the developed PSB to the BPPS provider. The BPPS provider plugs the developed PSB into BPPS framework that controls the BPPS application. The BPPS provider configures the PSB for the BPPS application to access the content providing application. The BPPS provider notifies each multi-service operator that a new content providing application is available and, if the multi-service operator agrees to provide its customers access to the new content providing application, configures the PSB with their preferences for access to the content providing application. The multi-service operator can then offer their customers access to the new content provider's information.

Figure 10:
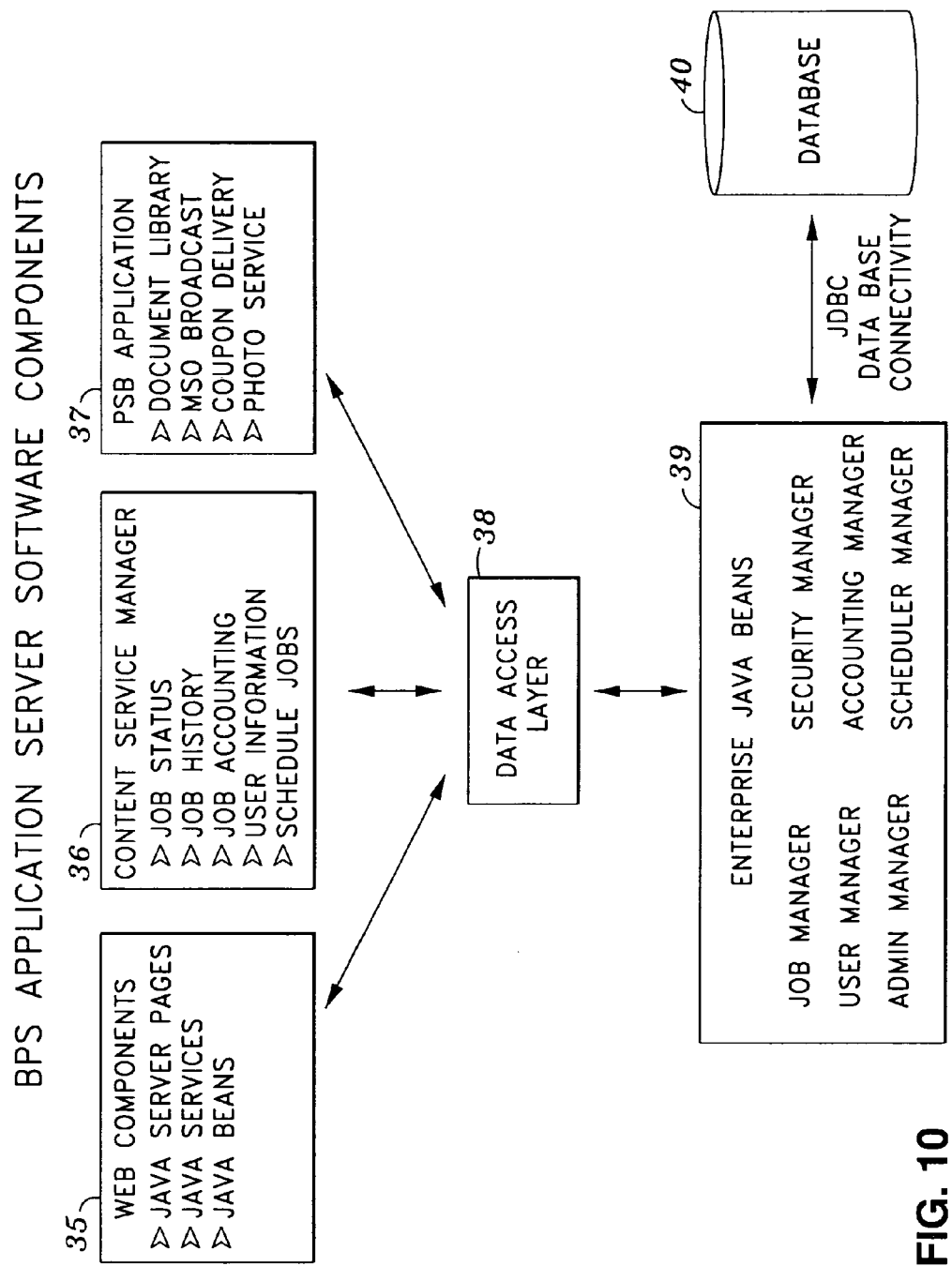
FIG. 10 depicts software components for a BPPS application server.

The BPPS application server includes various software components as shown in FIG. 10. As seen in FIG. 10, the components may include web components 35, content service manager component 36, and PSB application component 37. Web component 35 may manage Java server pages, Java servlets and Java beans. Content service manager component 36 may manage job status, job history, job accounting, user information and job schedule services. PSB application component 37 may manage various types of PSB applications including a document library, multi-service operator (MSO) broadcast, coupon delivery and a photo service. Each component communicates via data access layer 38 with an Enterprise Java Beans component 39, which may include a job manager, user manager, administrator manager, security manager, accounting manager and a scheduler manager.

Figure 2:
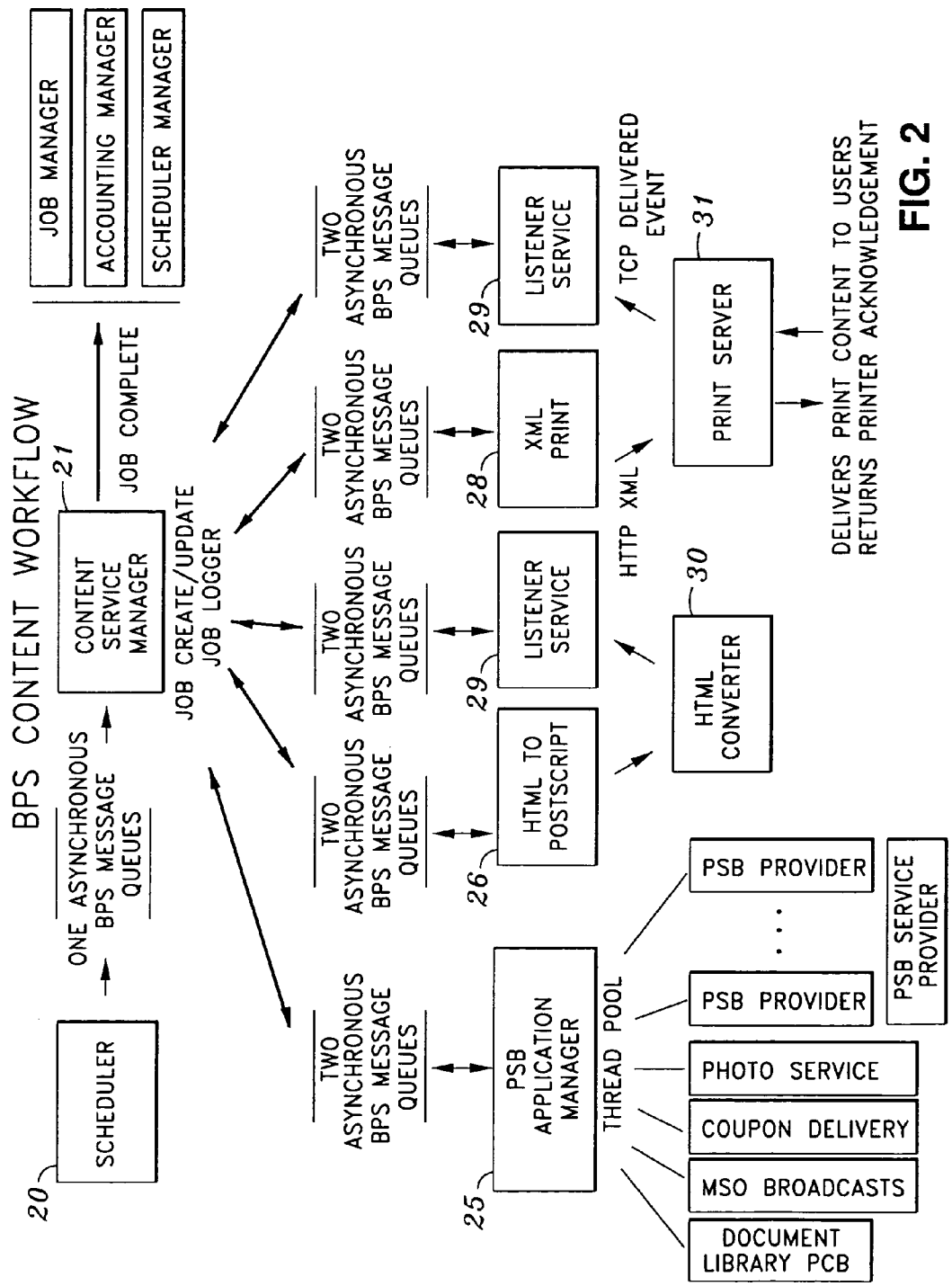
FIG. 2 is a diagram illustrating content workflow through a BPPS application.

FIG. 2 depicts a diagram of the content workflow through a BPPS application, which is shown in the figure as a BPPS APPS Framework. As shown, the framework includes a scheduler 20 and a content/service manager 21. Scheduler 20 delivers subscription content to a user's home on a schedule selected by the home user and represents a set of services utilized by a variety of service bundles (discussed later) to provide operators, administrators, and end-users with the ability to schedule jobs/events. The scheduling services may also be used by other services for the scheduling of recurring system events. Scheduler 20 queries events in a database and forwards all of the events that are to be processed for the current time to the content/service manager. Content/service manager 21 manages the flow of the content based on job type (i.e. coupon, newspaper, bank statement, etc.) and forwards a job scheduled for delivery by scheduler 20 to various services that the job type requires for processing. All updates on the job are also done by content/service manager 21 (i.e. when the job transfers from one state to another, when it is complete, when it fails, etc.), as well as updates to an event log and accounting services. The use of content/service manager 21 provides for making the various services much simpler since the services will only have to handle their own service logic and do not have to be concerned with managing the job.

Some of the services shown in FIG. 2 that may be utilized in processing the subscription content include PSB Application Manager 25, HTML to Postscript service 26, XML Print service 28 and Listener service 29. PSB Manager 25 will be discussed in greater detail below, but briefly, provides the functionality for the BPPS application to communicate with a content provider application for the end user to select the content information for his/her subscription, and to retrieve the content information at the scheduled delivery time.

HTML to Postscript service 26 provides for conversion of HTML files to Postscript. An HTML file is either locally accessible or can be referenced via a URL. If a URL is supplied, the HTML to Postscript service will retrieve the URL and then convert the HTML data to Postscript.

XML Print service 28 submits operation requests to a print server using XML formatted messages sent through the HTTP protocol. The print server is preferably maintained by the multi-service operator and processes the content information with a print driver to perform rasterization of the print data prior to forwarding the data to the set-top box for printing by the end user's printer.

Listener Service 29 waits to receive messages from HTML converter 30 and print server 31 indicating whether the job was successfully processed or if an error occurred. The message is then passed on to the content/service manager for handling of the next service.

Figure 3:
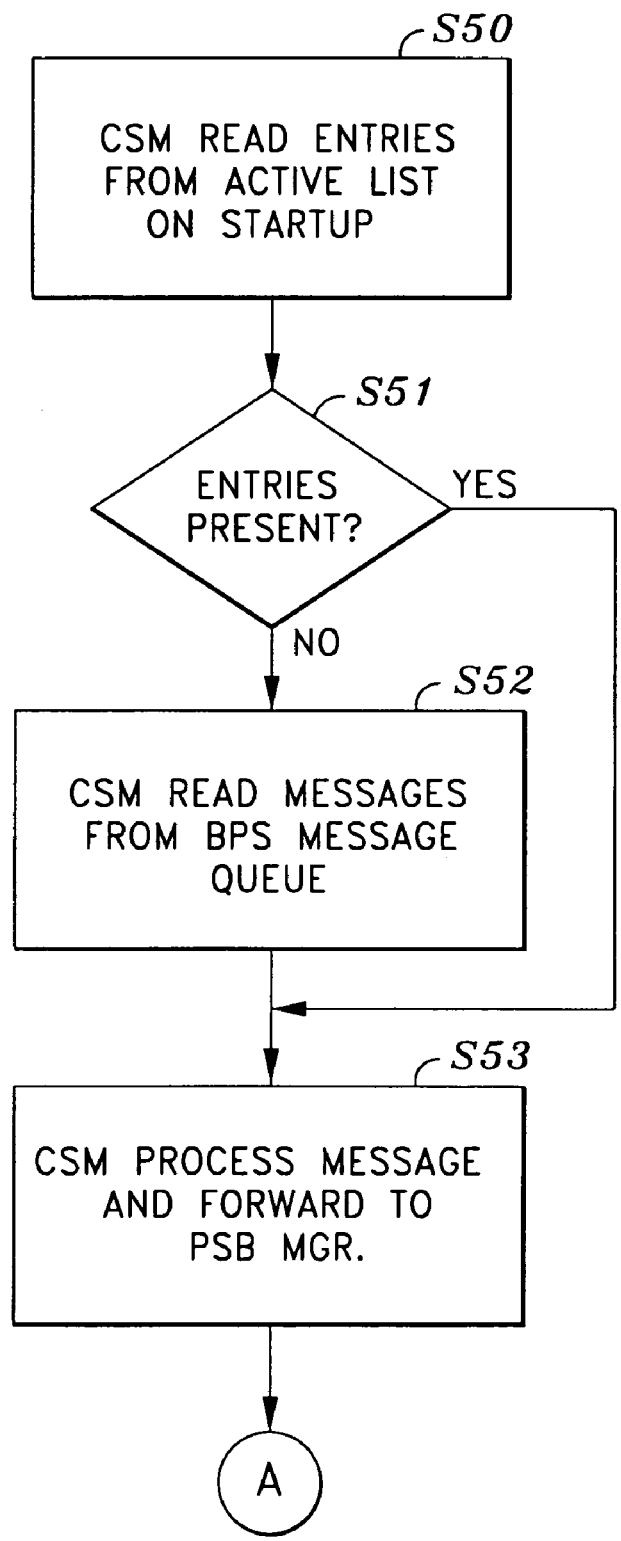
FIGS. 3 to 9 are flowcharts depicting the processing of a job through a BPPS application.

FIGS. 3 to 9 are flowcharts depicting the workflow of a job through the BPPS framework. FIG. 3 depicts initial processing of messages by content/service manager 21. At startup, content/service manager 21 reads entries from an active list (step S50). The active list would have entries, for example, where the BPPS server crashed prior to the job being submitted to the Print Server. If entries are present in the active list (step S51), content/service manager 21 processes these entries first (step S53). Content/service manager 21 also reads messages from its queue one at a time and processes any messages (step S52). The messages may comprise a message from the scheduler to create a new job, to service a job (i.e. forward the job to the next service), or to reschedule the job. When content/service manager 21 receives a message to create a new job or to cancel a job, flow proceeds to FIG. 4.

Figure 4:
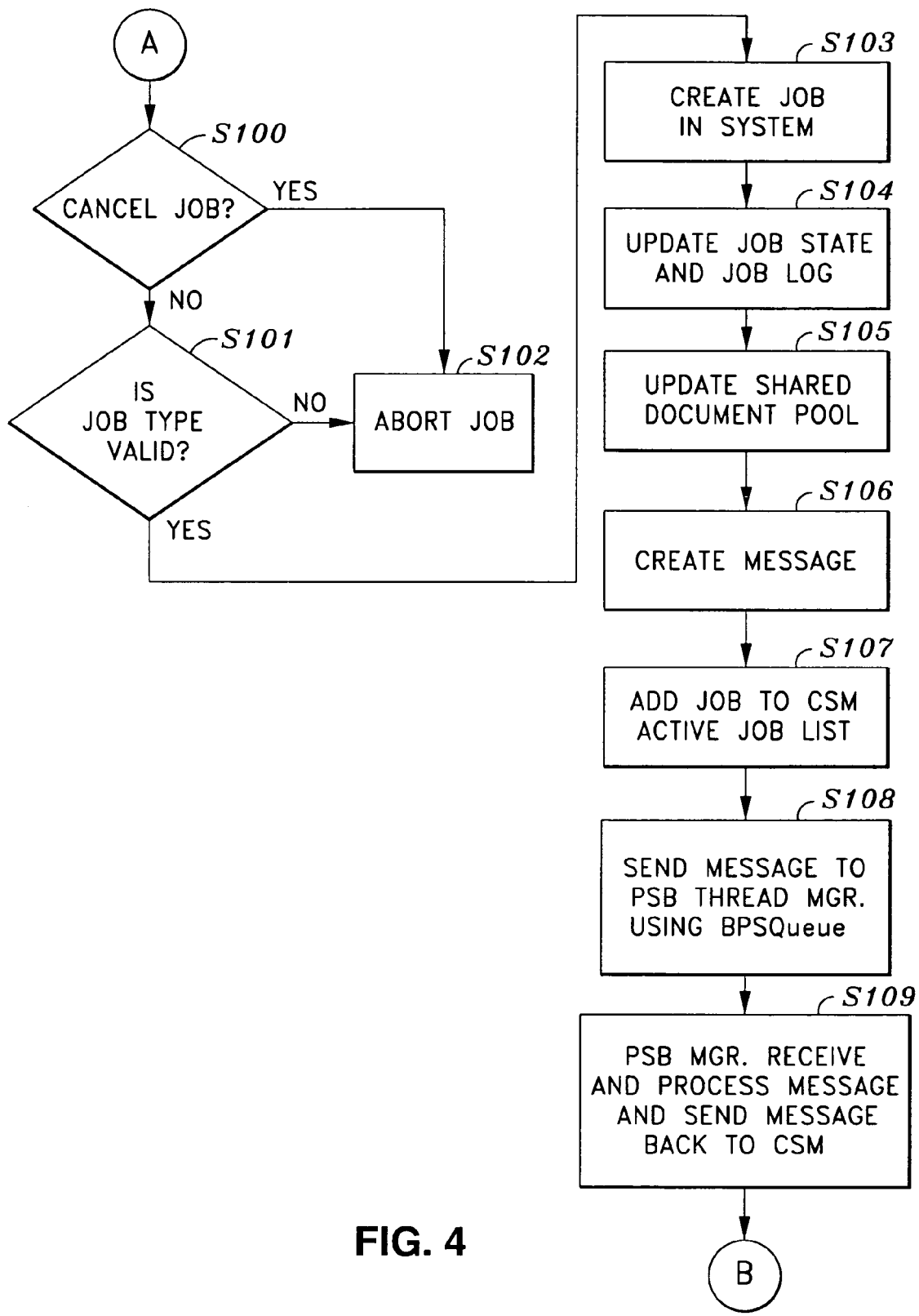

In FIG. 4, a create job or cancel job message is received by the content/service manager (CSM). In step S100, the CSM determines whether a cancel job message was received, and if so, the job is aborted in step S101. When a job is aborted, the job state is updated, as is the job state description (i.e. reason why the job was aborted). In addition, the job log is updated, a cleanup of the shared document pool is performed and accounting information is updated. The job is then moved to the job history and is removed from the CSM's active job list. If a retry is specified, the CSM will resubmit the job. If the job has not been canceled, then the CSM determines whether the job type is valid (step S102). This may comprise the CSM determining if the job is registered with the CSM and whether the services needed to process the job are registered with the CSM. If the job is not valid, then the job is aborted (step S101). If the job is valid, then the CSM performs various processes to forward the job to the next service.

In steps S103 to S107, the CSM creates a job in the system, updates the job state and the job log, updates the shared document pool, creates a message and adds the job the CSM's active job list. The CSM then sends a message to the next service, in this case, the PSB manager service (step S108). Upon receiving the message, the PSB manager processes the message and sends a message back to the CSM (step S109). The PSB manager processes the message by passing the message to an unused PSB thread in its PSB thread pool. The PSB thread then instantiates the correct PSB object, retrieves user information (if required) and calls a PSB action function. The PSB manager then sends a message back to the CSM, whereby flow proceeds to FIG. 5.

Figure 5:
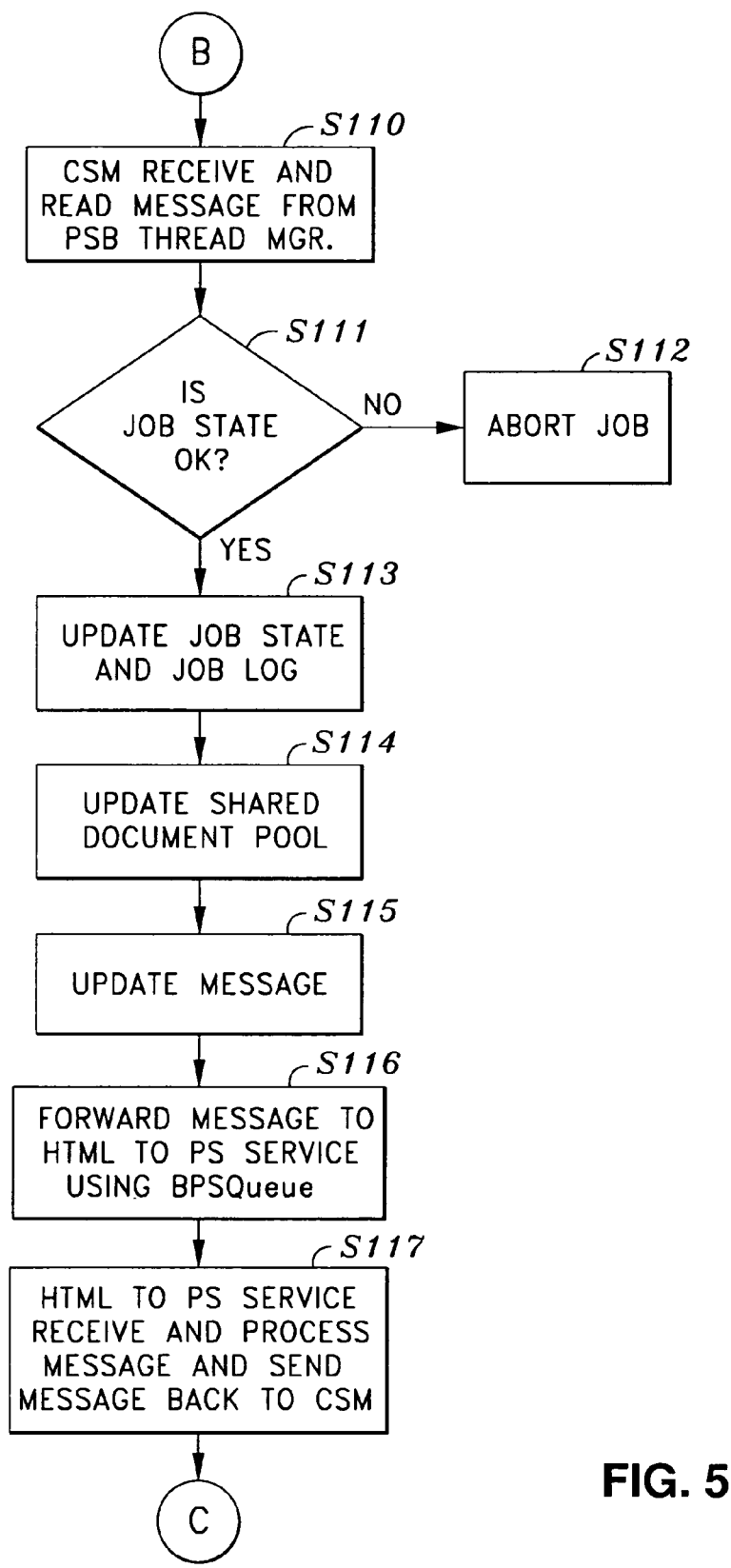

In FIG. 5, the CSM receives the message from the PSB manager (step S110) and checks to see if the job state is OK (step Sill). If the job state is not OK, i.e. an error has occurred, then the job is aborted (step S112). If the job state is OK, then the CSM updates the job state and the job log (step S113), updates the shared document pool (step S114), updates the message (step S115), and forwards the message to the next service, in this case, the HTML to Postscript conversion service (step S116). The HTML to Postscript service reads the message, retrieves information from the shared document pool, performs HTML to Postscript conversion, updates the shared document pool with the new Postscript file, and if an error occurs, updates the message description and job state in the message. The HTML to Postscript service then sends a message back to the CSM (step S117), whereby flow proceeds to FIG. 6.

Figure 6:
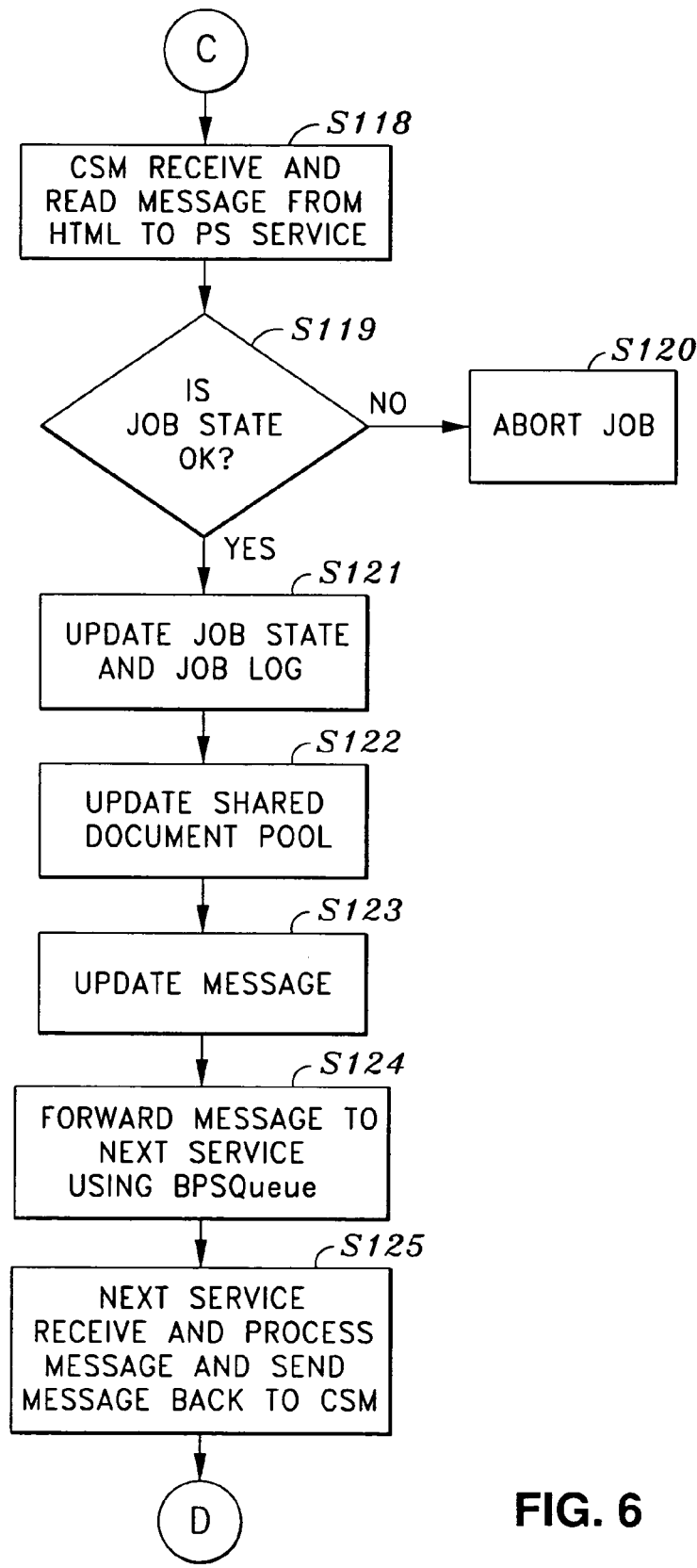

In FIG. 6, the CSM receives the message from the HTML to Postscript service (step S118) and checks to see if the job state is OK (step S119). If the job state is not OK, i.e. an error has occurred, then the job is aborted (step S120). If the job state is OK, then the CSM updates the job state and the job log (step S121), updates the shared document pool (step S122), updates the message (step S123), and forwards the message to the next service (step S124), which may be, for example, an Ad Insertion service. The next service reads the message, retrieves information from the shared document pool, performs the service's function, updates the shared document pool (if necessary), and if an error occurs, updates the message description and job state in the message. The service then sends a message back to the CSM (step S125), whereby flow proceeds to FIG. 7.

Figure 7:
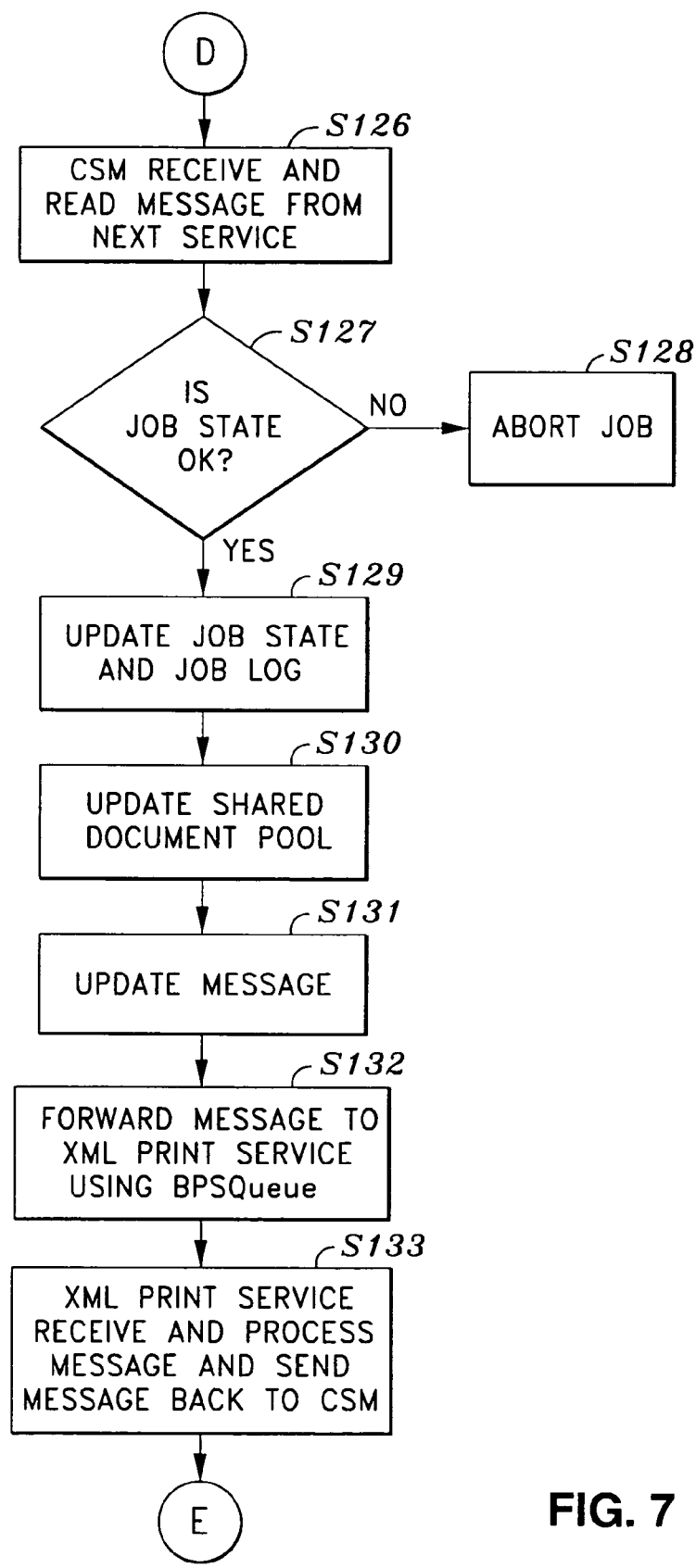

In FIG. 7, the CSM receives the message from the next service (step S126) and checks to see if the job state is OK (step S127). If the job state is not OK, i.e. an error has occurred, then the job is aborted (step S128). If the job state is OK, then the CSM updates the job state and the job log (step S129), updates the shared document pool (step S130), updates the message (step S131), and forwards the message to the XML Print service (step S132). The XML Print service reads the message, retrieves information from the shared document pool, performs the service's function, updates the shared document pool (if necessary), and if an error occurs, updates the message description and job state in the message. The service then sends a message back to the CSM (step S133), whereby flow proceeds to FIG. 8.

Figure 8:
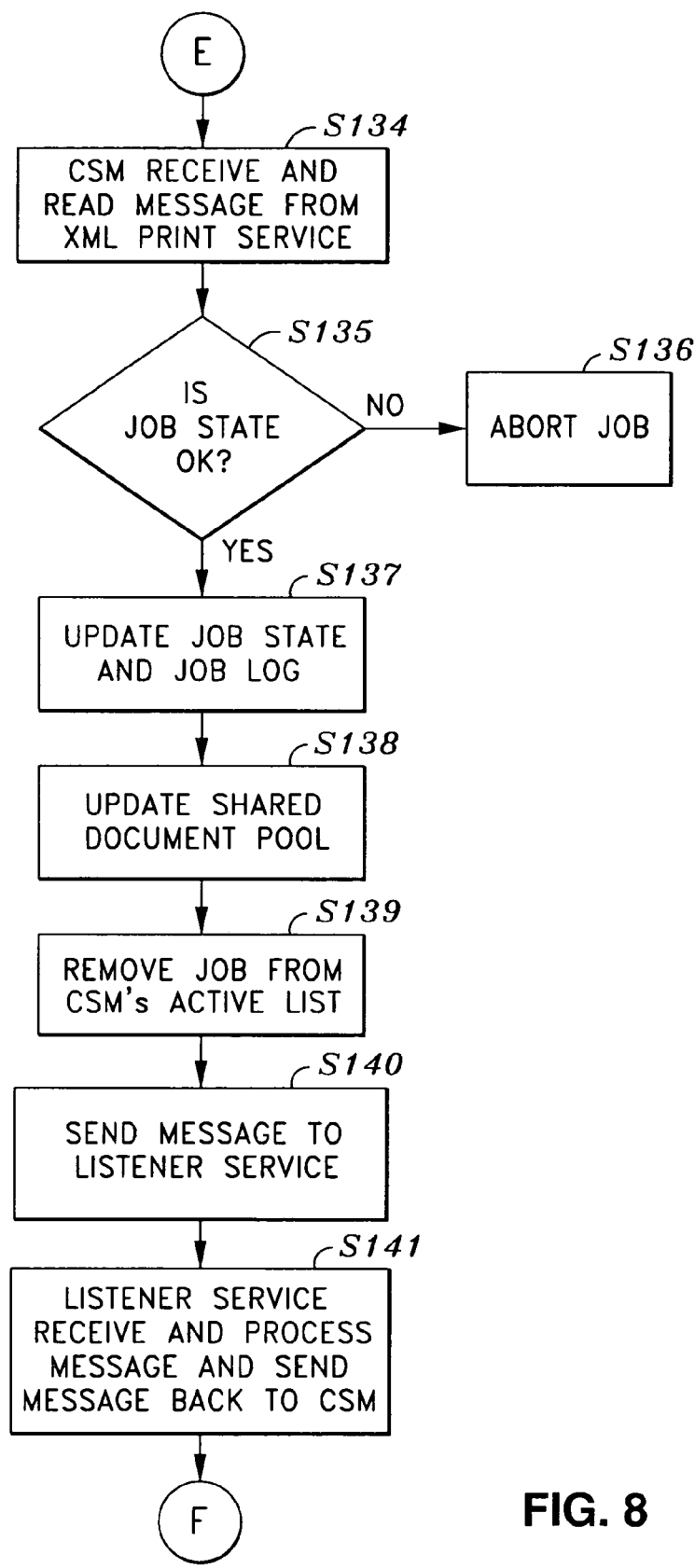

In FIG. 8, the CSM receives the message from the XML Print service (step S134) and checks to see if the job state is OK (step S135). If the job state is not OK, i.e. an error has occurred, then the job is aborted (step S136). If the job state is OK, then the CSM updates the job state and the job log (step S137), updates the shared document pool (step S138), removes the job from the CSM's active job list (step S139), and sends a message to the Listener service (step S140). The Listener service reads the message, sends a message to the server for notification of the completion state, and waits for notification of either completion or error for the job. If notification is received, the Listener service forwards the notification to the CSM. If an error occurs, the message description and job state are updated in the message. The service then sends a message back to the CSM (step S141), whereby flow proceeds to FIG. 9.

Figure 9:
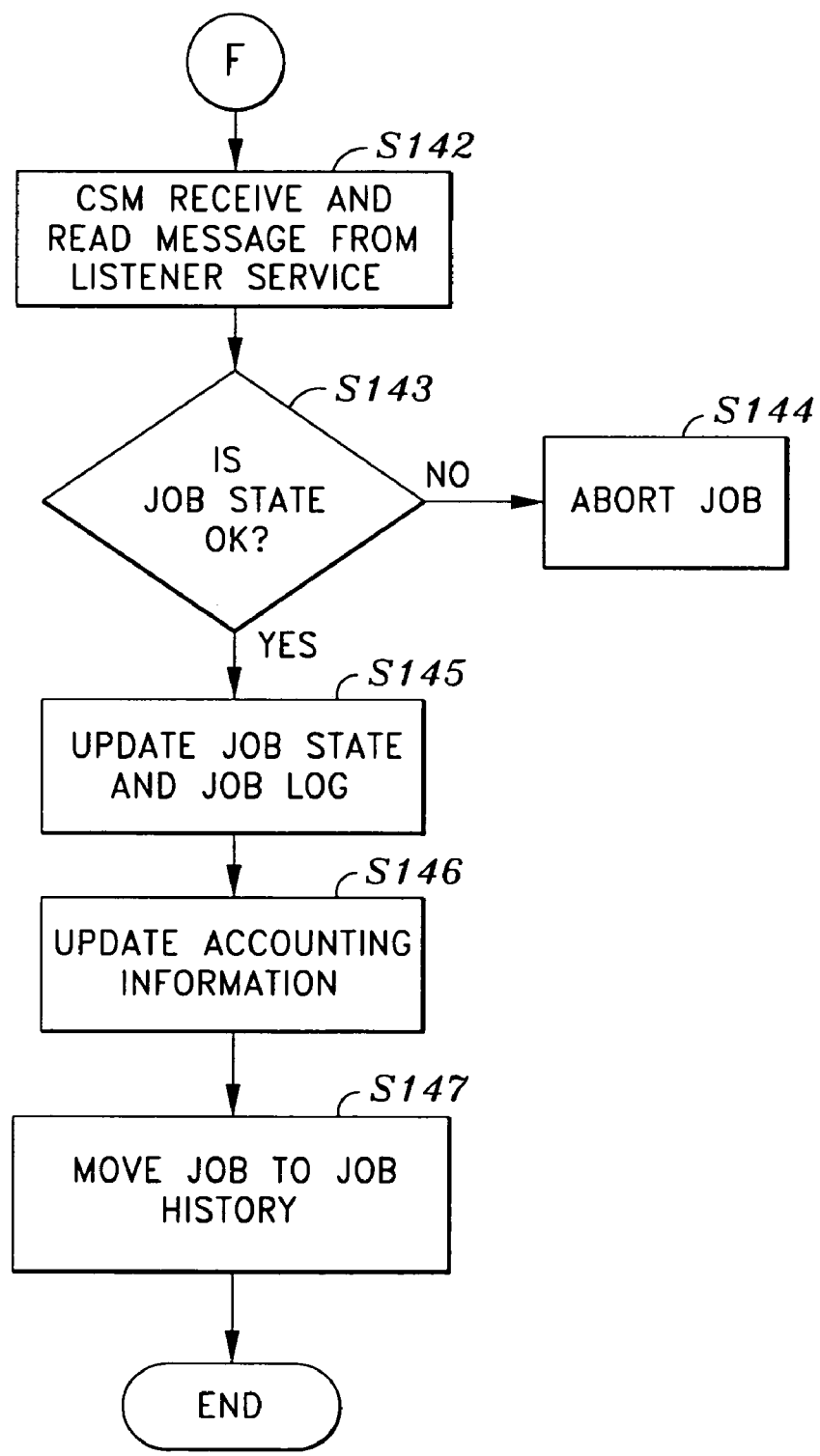

In FIG. 9, the CSM receives the message from the Listener service (step S142) and checks to see if the job state is OK (step S143). If the job state is not OK, i.e. an error has occurred, then the job is aborted (step S144). If the job state is OK, then the CSM updates the job state and the job log (step S145), updates the accounting information (step S146), and moves the job to the job history (step S147).

Figure 11:
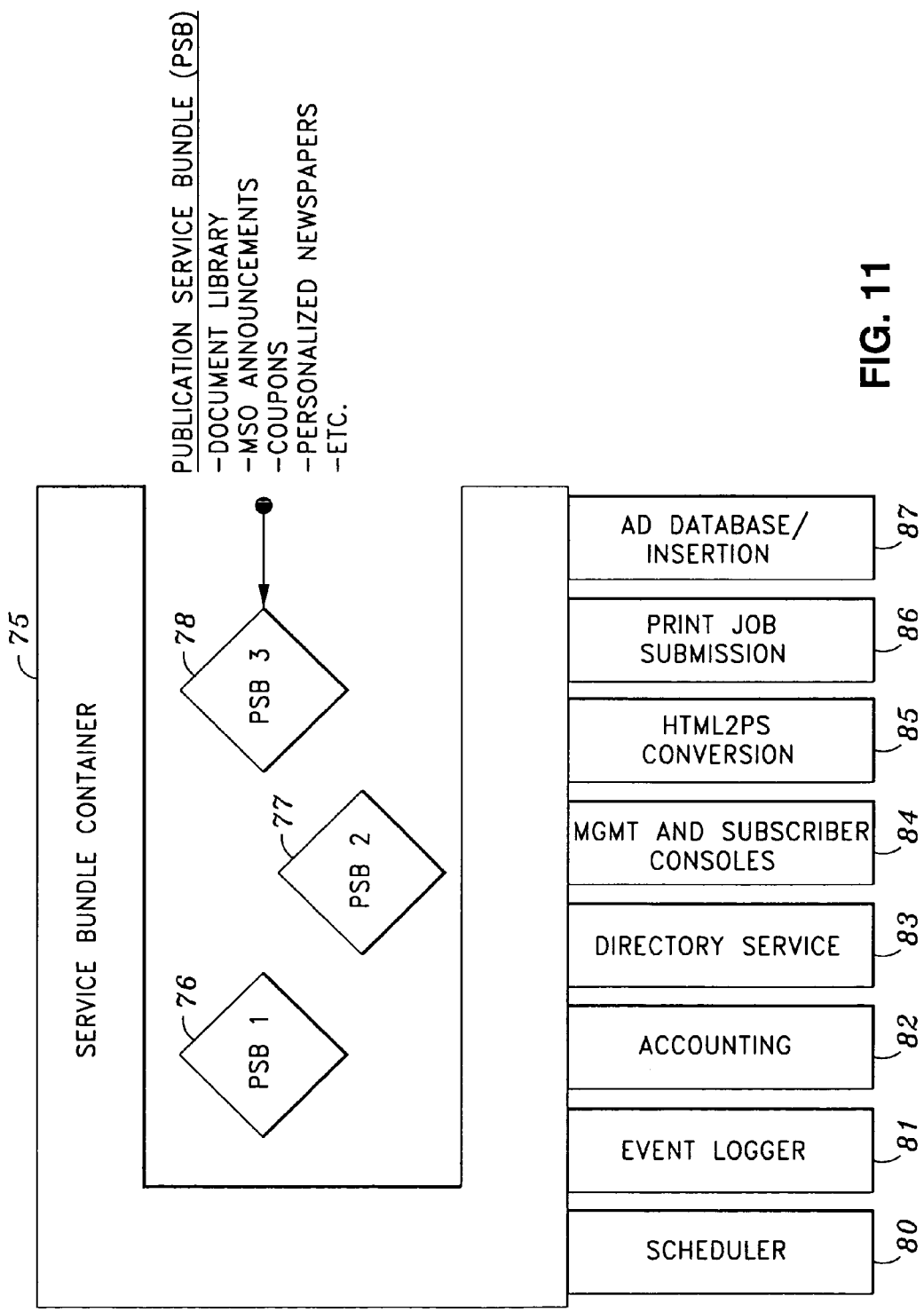
FIG. 11 depicts an example architecture for a PSB manager.

FIG. 11 depicts an example architecture for the PSB manager. As seen in the figure, multiple PSB's (PSB1 76, PSB2 77 and PSB3 78) are plug-ins to a PSB container 75. Each PSB is an interface for interfacing between the BPPS application in the BPPS server and a content providing application in a server maintained by the content provider. Each PSB is preferably provided to each content provider as a software development kit for which the content provider can write the code to develop the PSB. The content provider develops the PSB to allow the maximum degree of freedom of access to their content database and delivers the developed PSB to the BPPS operator. The BPPS operator plugs the PSB into the PSB container and configures the PSB for communication between the BPPS application and the content providing application. The PSB is also configured for access to the content providing application by multi-service operators and end users. The configuration process will be described in more detail below. The PSB container also communicates with the other services included in the BPPS framework (i.e. scheduler, event logger, etc.).

Figure 12:
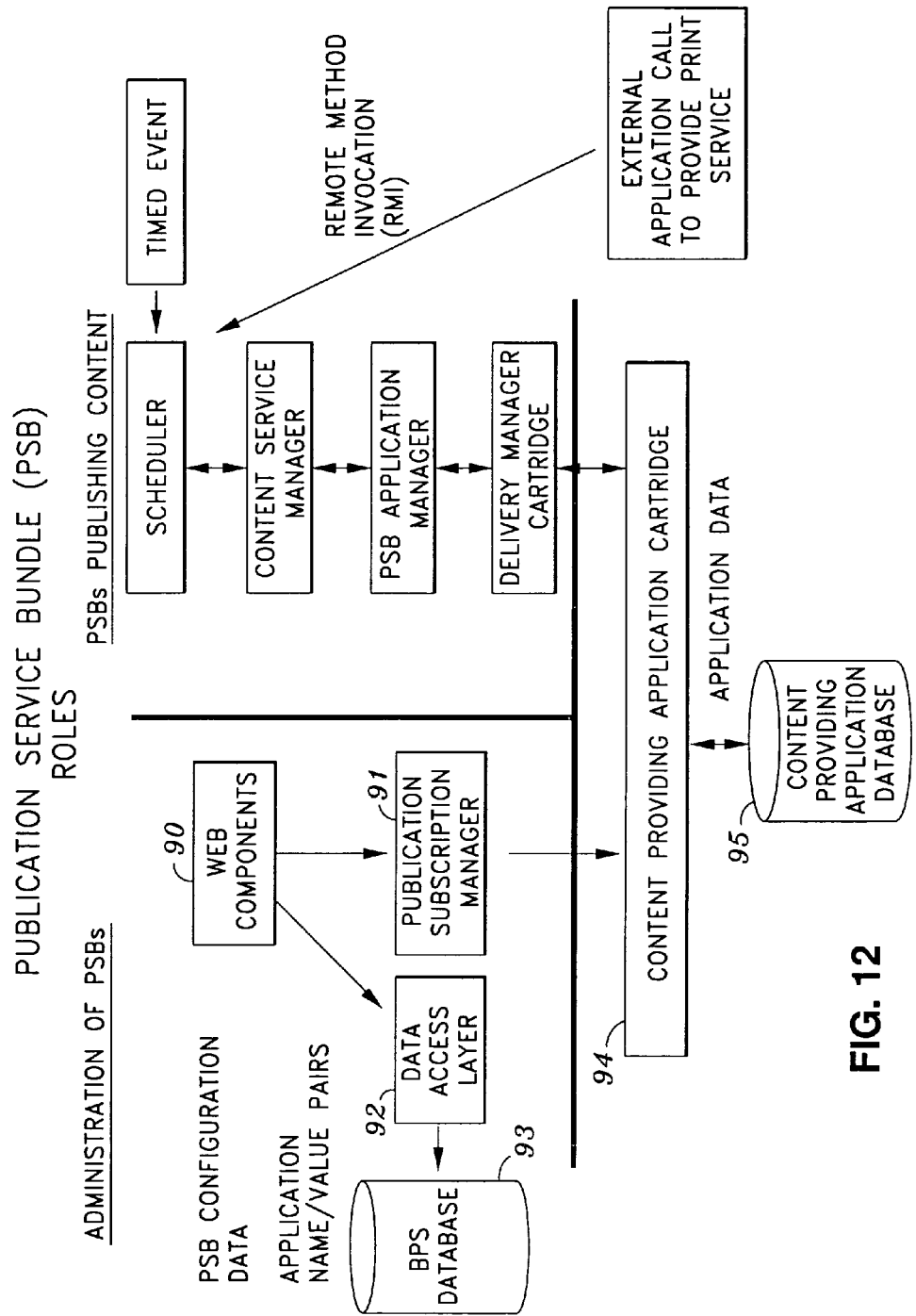
FIG. 12 shows an example of different roles performed by a publication service bundle.

FIG. 12 shows an example of different roles performed by a publication service bundle. As seen in the figure, the PSB generally has two roles: administration (configuration and subscription management) and publishing (delivery management). The publishing (delivery management) role was described in detail above with respect to FIGS. 3 and 4 and therefore will not be discussed again here. The administration role provides for both configuration of the PSB, as well as subscription functions for an end user to subscribe for delivery of content information. As shown, the administration of the PSB includes web components 90 for operators to manage the configuration and subscription functions via a web interface. Web components 90 interface with publication subscription manager 91 and data access layer 92. Publication subscription manager 91 communicates with content providing application 94 of the content provider that developed the PSB, and data access layer 92 communicates with BPS database 93 to store subscription information (i.e. user information, requested delivery time, content information subscribed to, etc.) entered by an end user, as well as other information utilized by the BPPS application.

Figure 13:
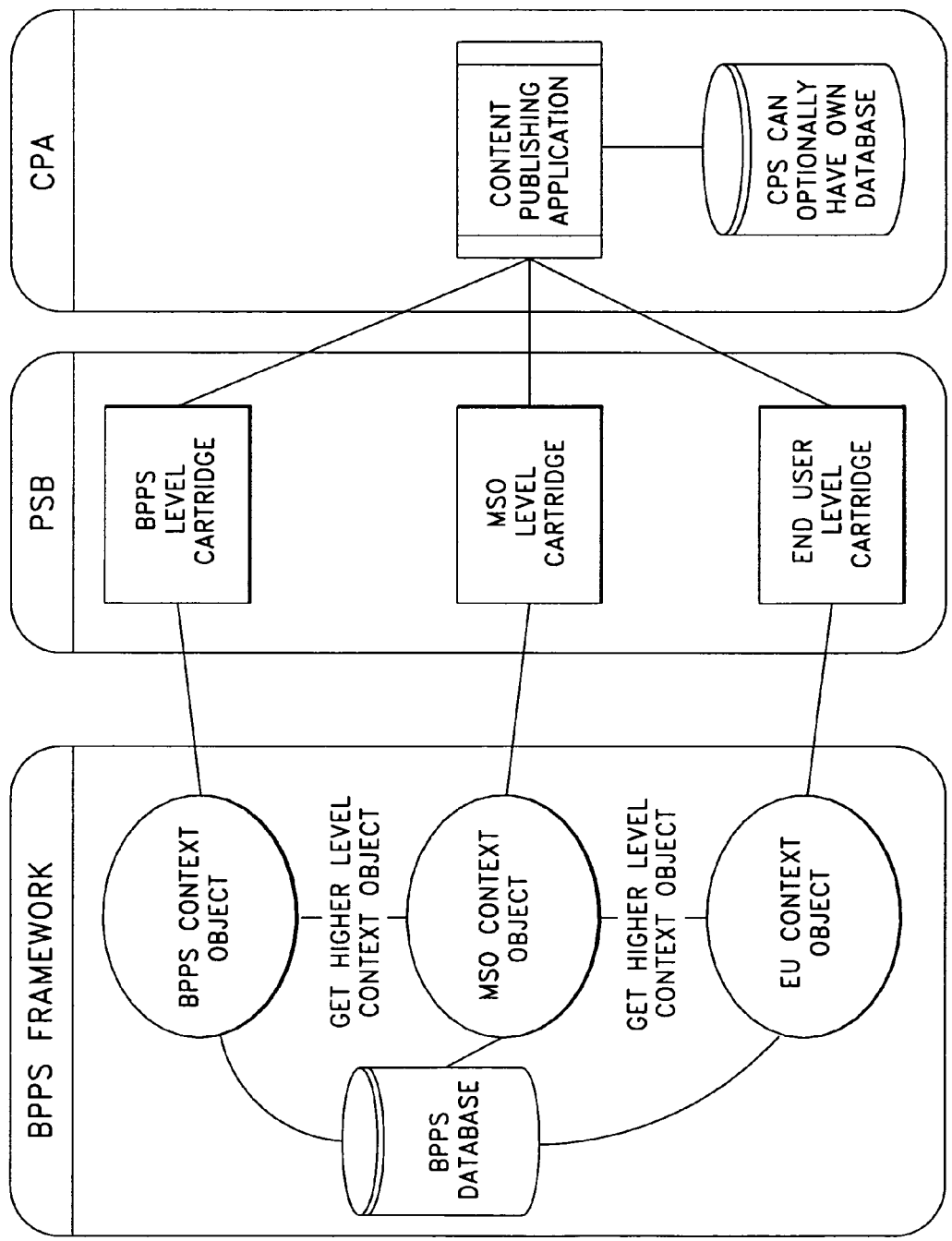
FIG. 13 depicts the structure of a publication subscription manager.

FIG. 13 shows an example structure of publication subscription manager 91. As shown, the publication subscription manager includes BPPS framework components and PSB components. The publication subscription manager implements three levels of interaction with the content providing application, depending on who the operator is. That is, the publication subscription manager implements one level of interaction for BPPS operators (the highest level of interaction), a second level for multi-service operator interaction, and a third level for end user interaction. The framework instantiates and dismisses the appropriate level cartridge (or module) of the PSB for interaction with the content providing application during operator interaction. For example, if the operator is a BPPS level operator (i.e. system administrator for the BPPS) who performs configuration of the PSB at the BPPS level, the framework instantiates the BPPS level cartridge. If the operator is an MSO level operator (i.e. an administrator at the MSO), the framework instantiates the MSO level cartridge. If the operator is an end user (i.e. a home user that is subscribing to receive content information), the framework instantiates the end user (EU) level cartridge.

Figure 14:
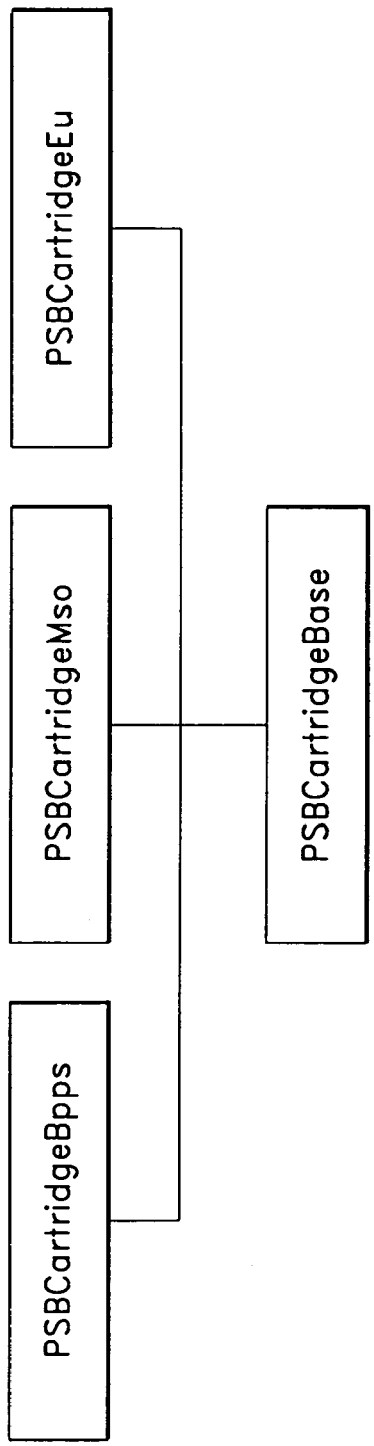
FIG. 14 is a tree structure of hierarchy level interfaces for a PSB.

One task of the PSB developer is to write Java classes that implement certain interfaces and one task of the framework developer is to write Java code that calls methods of the interfaces in a certain order. The publication subscription manager preferably includes three interfaces, each one for a corresponding level of publication subscription manager hierarchy. One level of hierarchy is the BPPS level, another the MSO level and a third the end user (EU) level. Each interface preferably has substantial similarity and therefore can be inherited from one common base interface. FIG. 14 shows a tree structure of each interface with the BPPS level being referred to as PSBCartridgeBpps, the MSO level being referred to as PSBCartridgeMso, the end user level being referred to as PSBCartridgeEu, and the base interface being referred to as PSBCartridgeBase.

The BPPS level cartridge can read and write BPPS level configuration parameters of the PSB without limitation. The MSO level cartridge can read and write MSO level configuration parameters of the PSB without limitation. It can also acquire a reference to a higher level context object by which it can read BPPS level configuration parameters. However, the MSO level cartridge can not set or remove BPPS level configuration parameters. The end user level cartridge can read and write end user level configuration parameters of the PSB without limitation. It can also acquire a reference to higher level context objects, which it can use to read MSO and BPPS level configuration parameters. However, the end user level cartridge can not set or remove BPPS level or MSO level configuration parameters.

When the cartridge is instantiated, the framework creates a context object for the cartridge and pastes it into the cartridge right after the cartridge is instantiated. The cartridge can then use the context object as a callback handle to the framework. For example, the end user level cartridge can use the end user level context object to query the BPPS database for attributes of the associated user. The MSO level cartridge can use the MSO context object to query the BPPS database for the configuration parameters of the associated MSO. Each context object is created within the context of a higher level of hierarchy, and therefore can provide reference to the higher level context object. For instance, the end user may want to know the system level configuration attributes. This could be resolved in three steps. First, using a reference to the end user context object, call the corresponding method and get a reference to MSO context object. Then, using MSO context object, call the corresponding method and get a reference to the BPPS context object. Finally, using the BPPS context object, get the system level configuration attributes.

Figure 15:
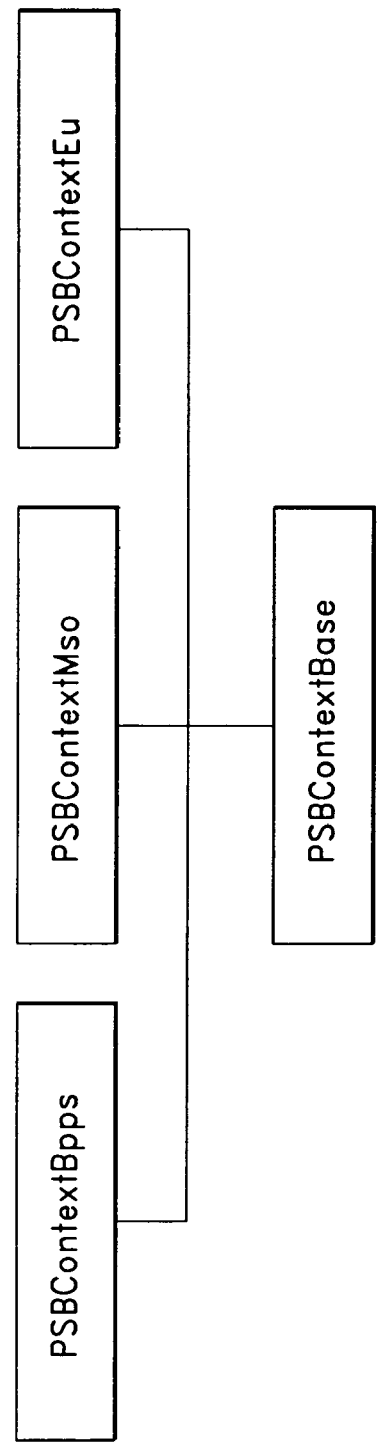
FIG. 15 is a tree structure of a hierarchy level of context objects for a PSB.

Similar to FIG. 14, FIG. 15 shows a tree structure of each context interface with the BPPS level being referred to as PSBContextBpps, the MSO level being referred to as PSBContextMso, the end user level being referred to as PSBContextEu, and the base interface being referred to as PSBContextBase. As stated above, right after the cartridge object is instantiated by the framework, the corresponding context is passed to it and is saved for later use. At any time during the PSB cartridge lifecycle, the context interface can be used for querying the BPPS database for certain information, e.g. end user attributes, MSO configuration parameters, security role of the current operator, etc.

FIGS. 16A and 16B are tables listing various functions for the context interfaces. FIG. 16A depicts functions for the PSBContextBase interface, and FIG. 16B depicts functions for different levels of hierarchy for each of the BPPS, MSO and EU levels.

As stated above with regard to FIGS. 12 and 13, the PSB includes different hierarchy level interfaces with the content providing application for each level operator. Each interface level provides the operator with a different level of services that the operator can perform. In one embodiment of the invention, three different types of services can be performed: system maintenance, service maintenance and subscriber maintenance. FIG. 17 is a table listing the various operations for each service that each operator level can perform. The system operator is at the BPPS level and generally provides for the operator to perform all of the available operations for each service.

The administrator level is the MSO level and provides for the MSO level operator to perform all of the available subscriber maintenance operations and most of the service maintenance and system maintenance operations except for those which are operations primarily only performed at the BPPS level.

The customer service representative level is the end user level. In this regard, in one embodiment of the invention, a home user wanting to subscribe to the BPPS service may contact a customer service representative at the MSO to subscribe to the service. In this case, the customer service representative would log-in to the BPPS service to perform the subscription operations as a proxy for the home user. The customer service representative may ask the home user various questions while filling out the subscription information in the BPPS system. In an alternative embodiment, the home user may access a self-registration facility interactively on their television via the set-top box, or the user may perform the subscription operations via a web browser on their home computer. As seen in FIG. 17, the customer service representative (end user) can only perform subscriber maintenance operations and can not perform service or system maintenance operations.

The following is a discussion of an example of an operator performing the various operations in a BPPS system. The example will be discussed with regard to the user interfaces shown in FIGS. 18 to 80.

Figure 18:
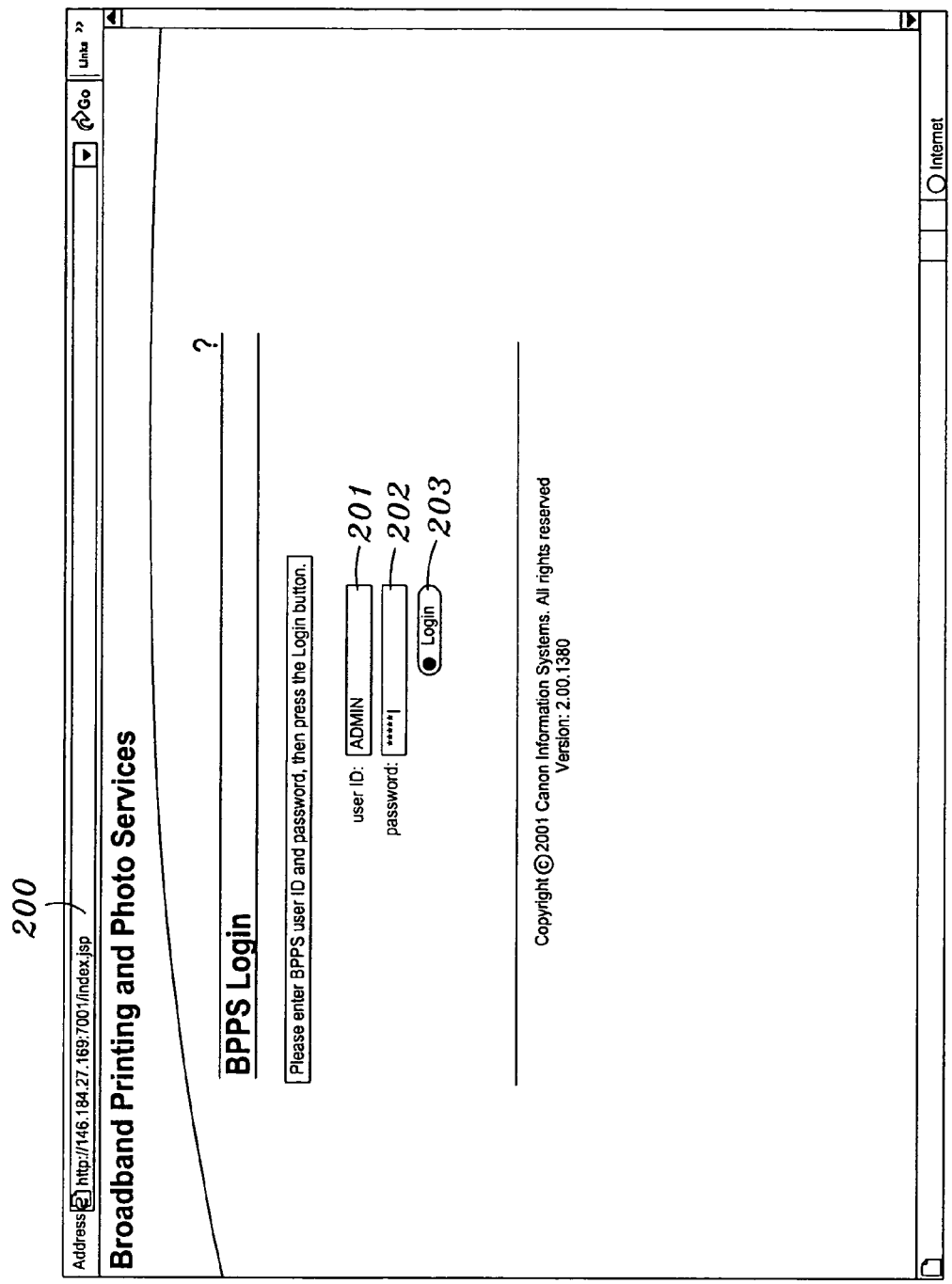

In FIG. 18, an operator enters a URL for a BPPS service server in box 200 of a web browser. The URL is retrieved and a BPPS login screen is depicted in the web browser as seen in the figure. To log-in to the BPPS system, the operator enters their user ID and password in boxes 201 and 202, respectively, and clicks on login button 203. The user ID and password entered in boxes 201 and 202 is dependent on the operator's level. That is, different user ID's and passwords are provided to the BPPS level operator, the MSO level operator(s) and the end user(s). The services provided in subsequent screens depends on the level of the operator that logs into the BPPS system. In the current example, a BPPS level operator is shown logging into the BPPS system.

Figure 19:
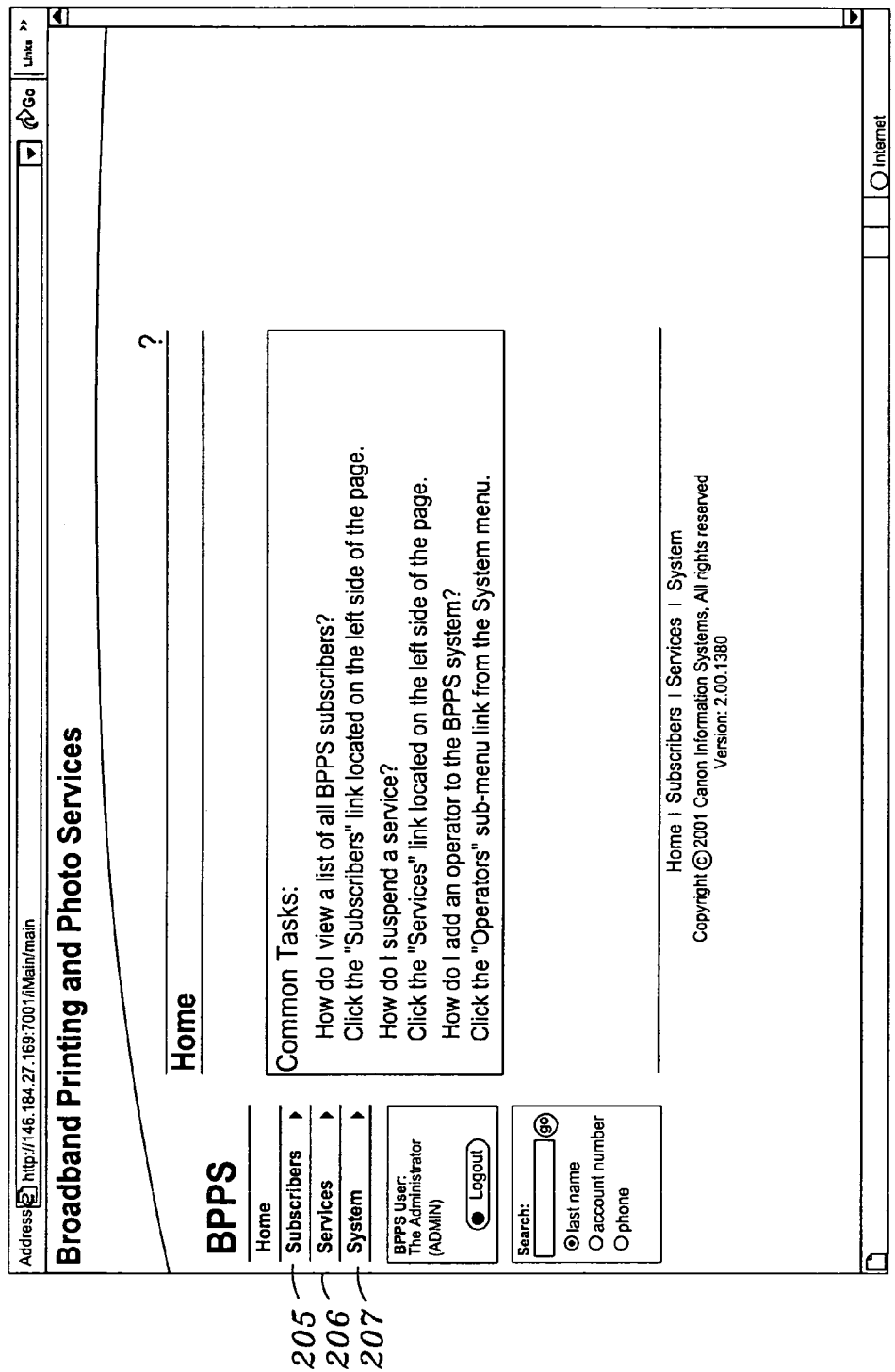
Figure 60:
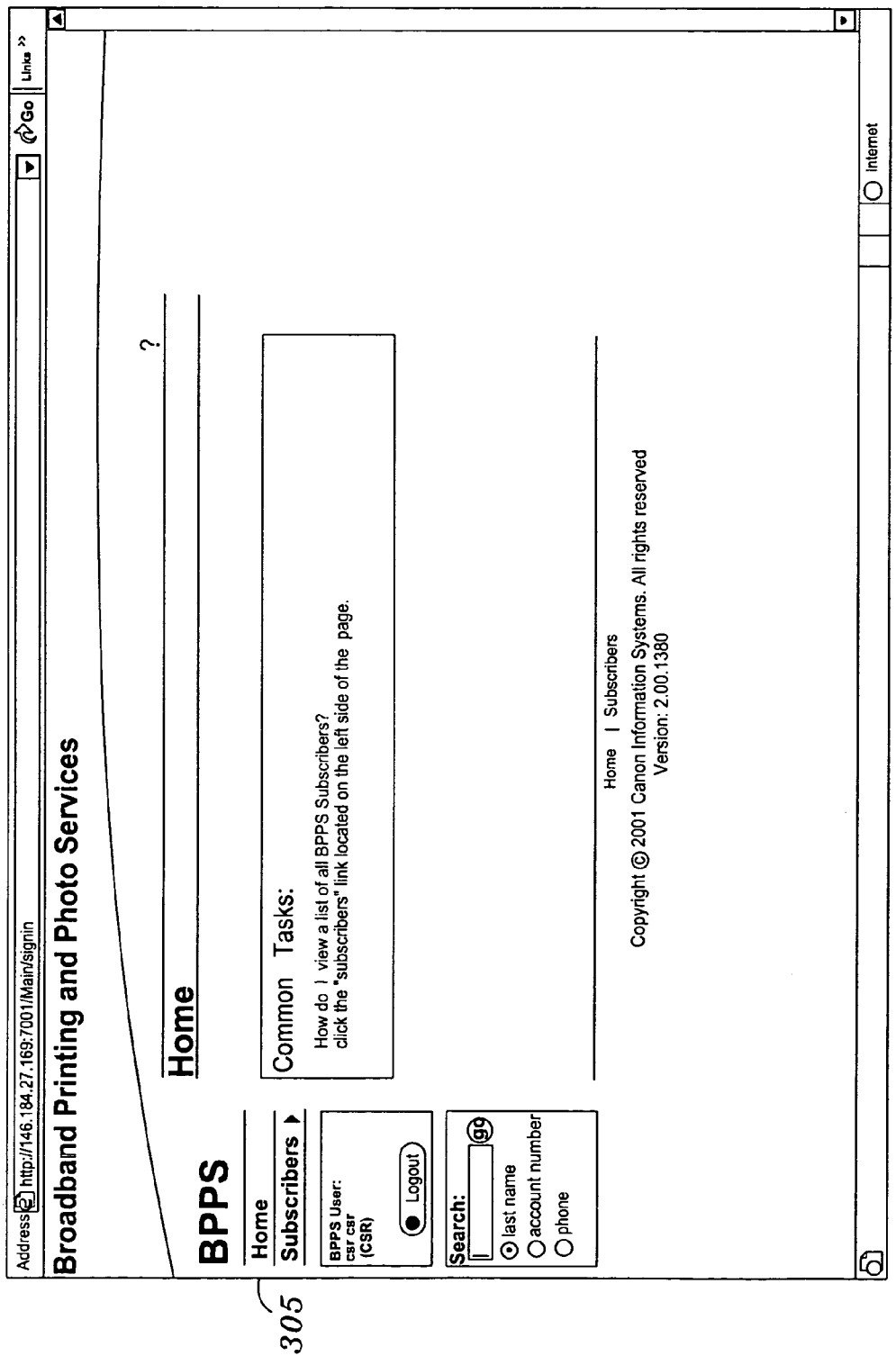

Upon clicking login button 203, a BPPS home page is depicted in the browser as shown in FIG. 19. As seen in FIG. 19, the available operations for the BPPS operator are shown as Subscribers button 205 (for subscriber maintenance operations), Services button 206 (for service maintenance operations), and System button 207 (for system maintenance operations). However, as seen in FIG. 60, when the operator logs in as a customer service representative (end user level), only subscriber maintenance operations are available as shown by Subscribers button 305.

By clicking on Service button 206, the BPPS operator can select to view both the affiliate level properties (MSO level) or the global level properties (BPPS level). However, if the user were to log-in at the MSO operator level, only an affiliate view would be available. In FIG. 21, the available PSB's and their status are listed in box 212. To perform a service maintenance operation on one of the listed PSB's, the operator can click on the service in box 212, such as Print Library PSB 211.

At the BPPS level, the BPPS operator can perform system configuration for the Print Library PSB. Box 215 shown in FIG. 22 is depicted for the BPPS operator to configure the Print Library PSB. It should be noted that the user interface (UI) shown in FIG. 22 is a multi-source web page, wherein box 215, which includes both Setup tab 216 and About PSB tab 216, is the PSB being displayed in conjunction with the BPPS framework (the remainder of the UI shown in FIG. 22). A multi-source web page UI according to the invention will be described in more detail below. To configure the PSB at the BPPS level, the BPPS operator enters the URL for the Print Library PSB server in box 218 and clicks on Save button 219. Thus, the Print Library PSB is configured at the BPPS level and is ready for configuration at the MSO level.

Figure 23:
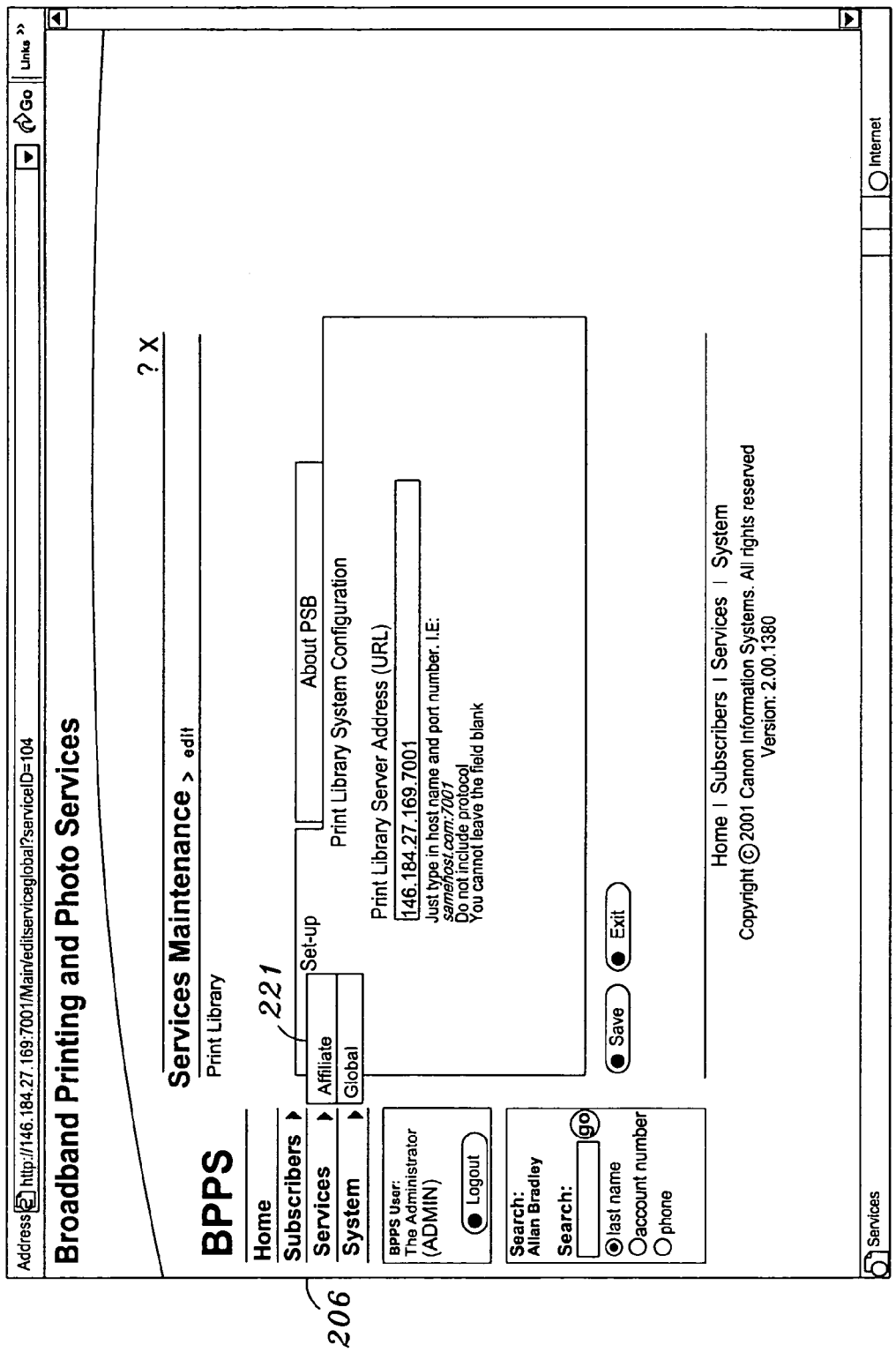

The MSO level operations are preferably performed by an MSO operator logging into the BPPS system and performing the operations to setup the PSB's according to the MSO's preferences. However, the BPPS operator can also setup the PSB for the MSO as a proxy. That is, the MSO can simply request that the BPPS operator setup (or configure) the PSB based on instructions provided by the MSO operator. FIG. 23 depicts a user interface screen in a case where the BPPS operator, who has already logged in to the BPPS system, configures the PSB's for the MSO. Therefore, the BPPS operator selects Services button 206 and affiliate (MSO) button 221 as seen in FIG. 23, thereby invoking box 220 shown in FIG. 24. Box 220 lists the PSB's which are available for MSO level configuration. At the MSO level, the operator selects one of the PSB's to configure, which in the present example is Print Library 225 in box 220.

Figure 26:
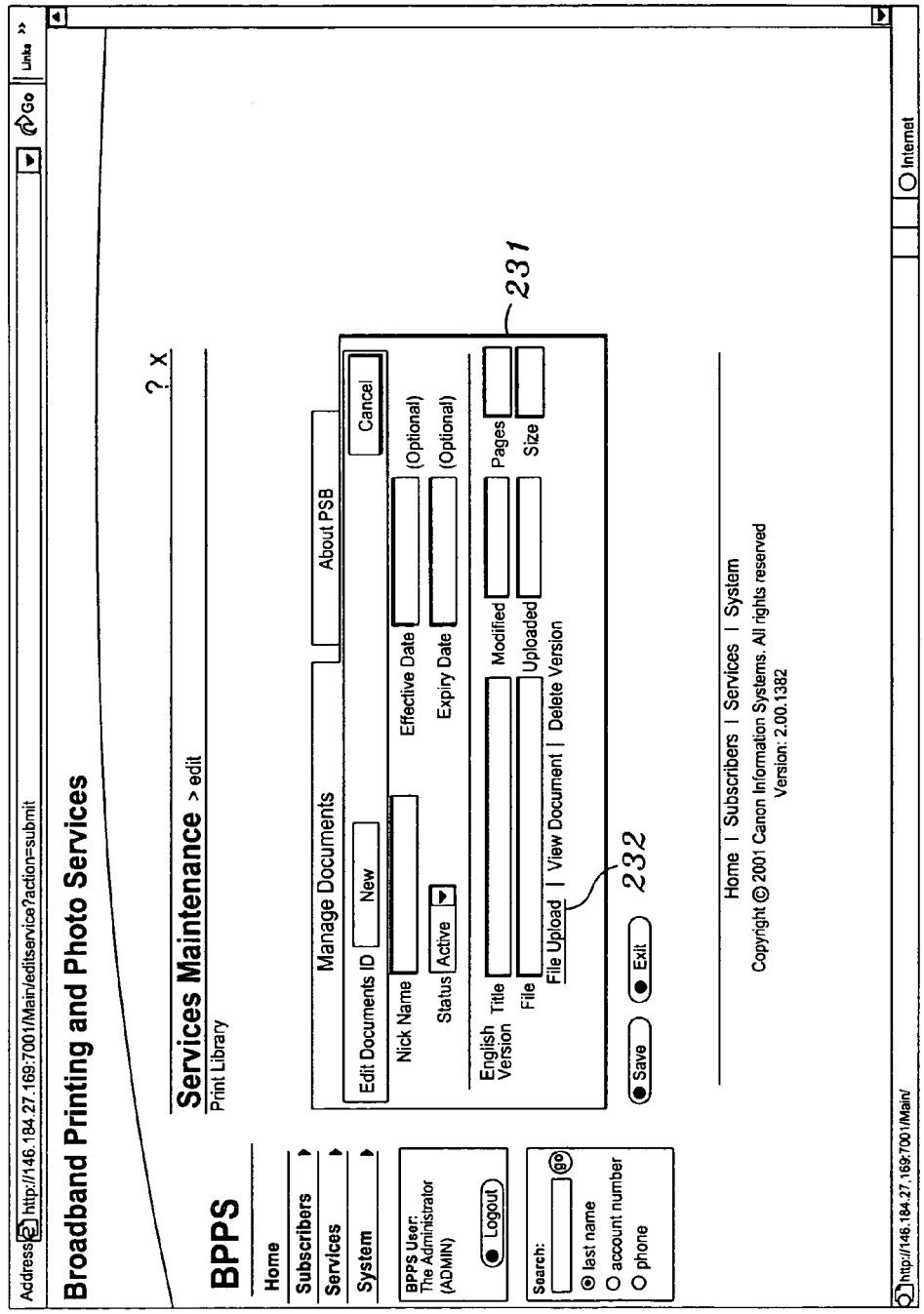

Upon selecting Print Library 225, the PSB is invoked to retrieve and display the available documents that are currently contained in the library. The currently available documents are listed in box 226 of FIG. 24. In the present example, the MSO level operator wants to add a new document to the library. Accordingly, the operator selects Add button 230, thereby invoking box 231 as seen in FIG. 26.

Figure 27:
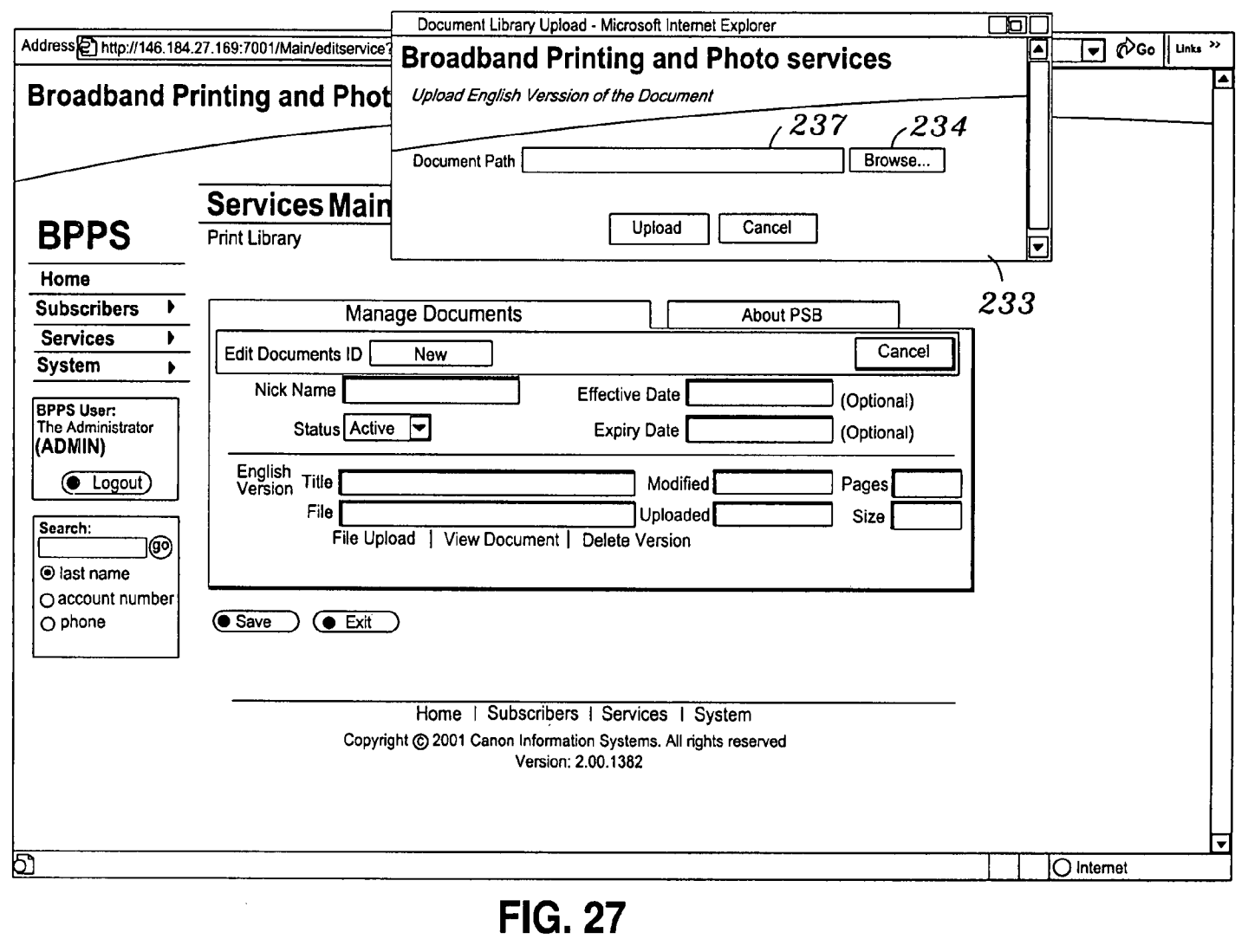
Figure 28:
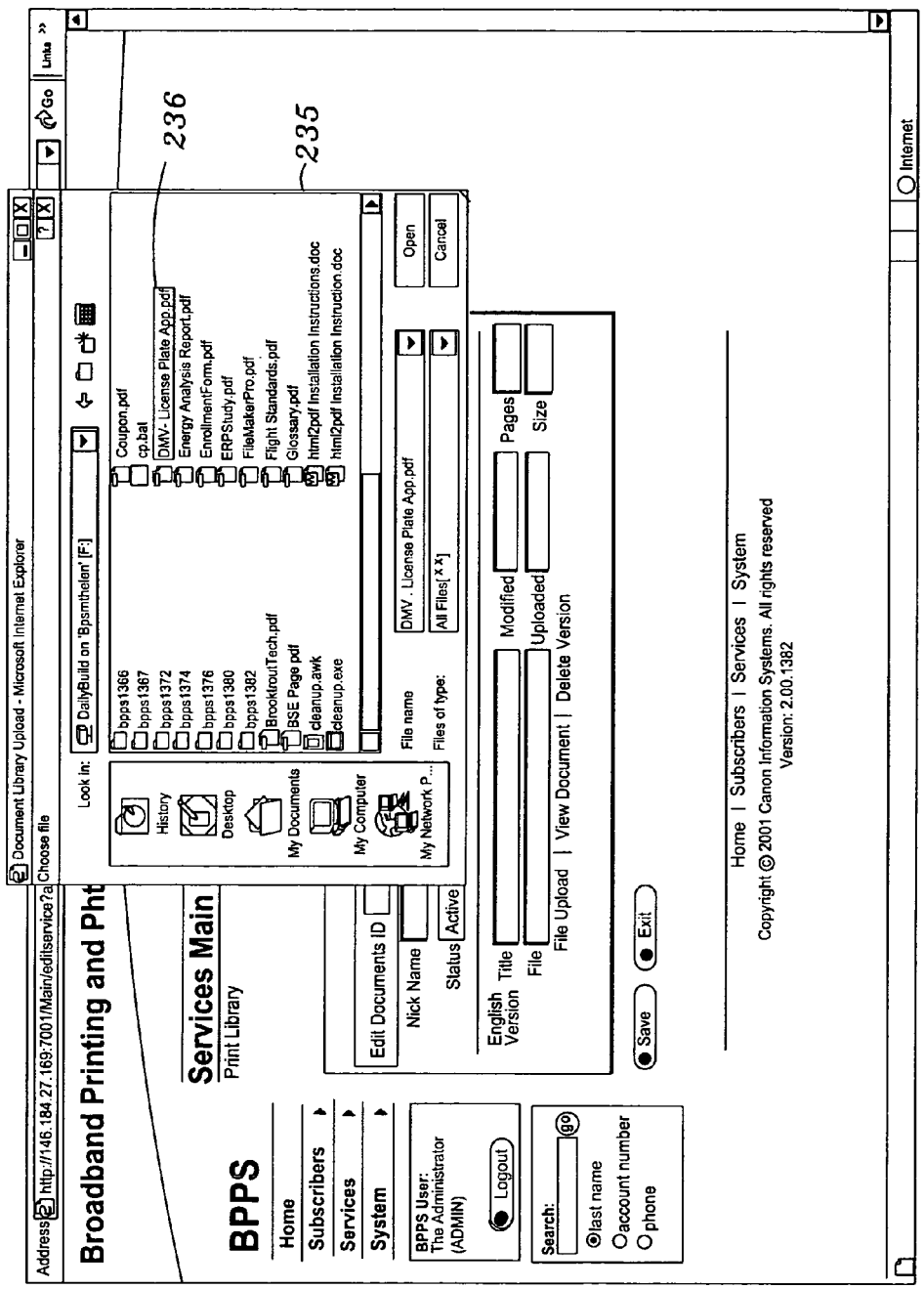
Figure 29:
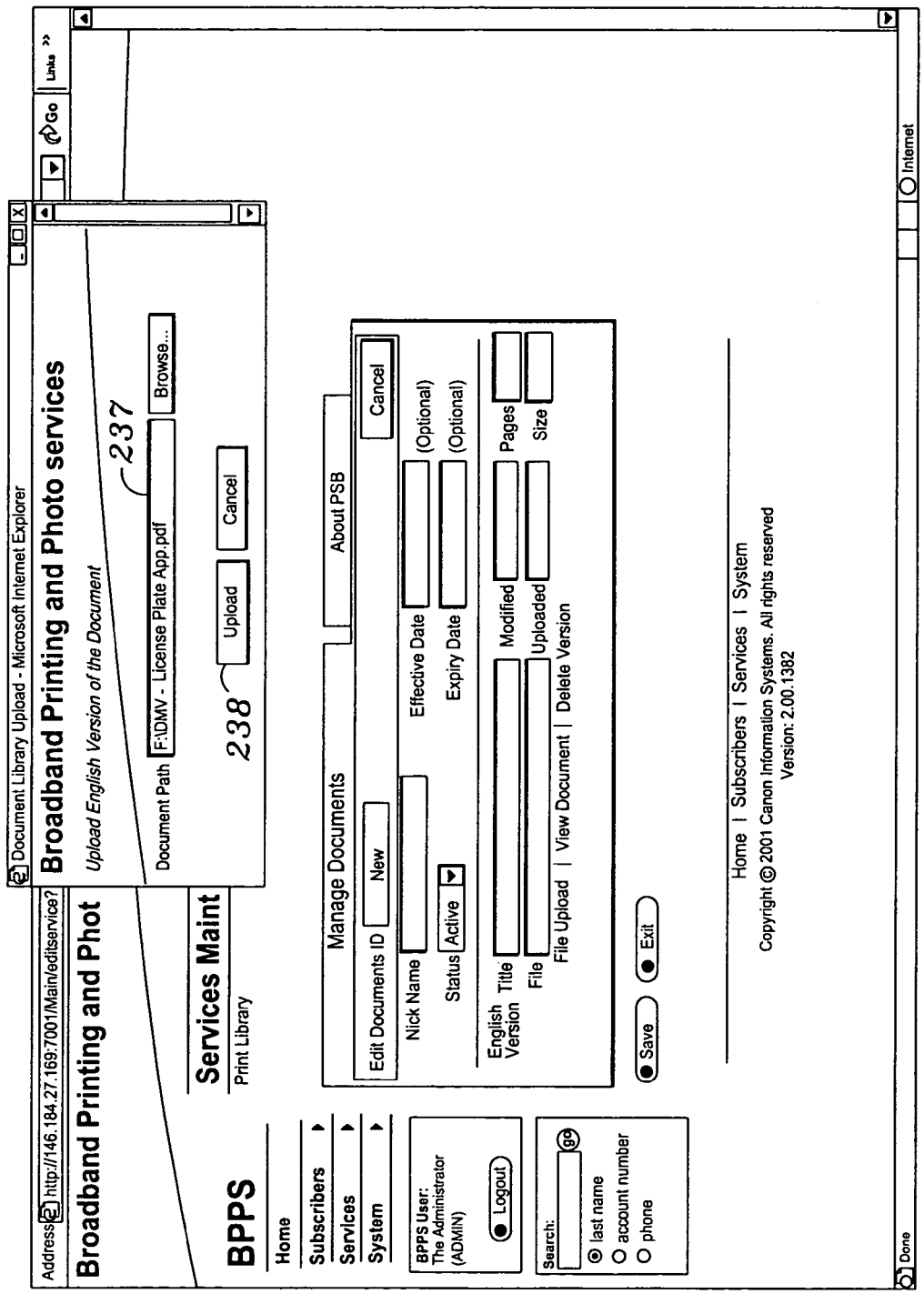
Figure 30:
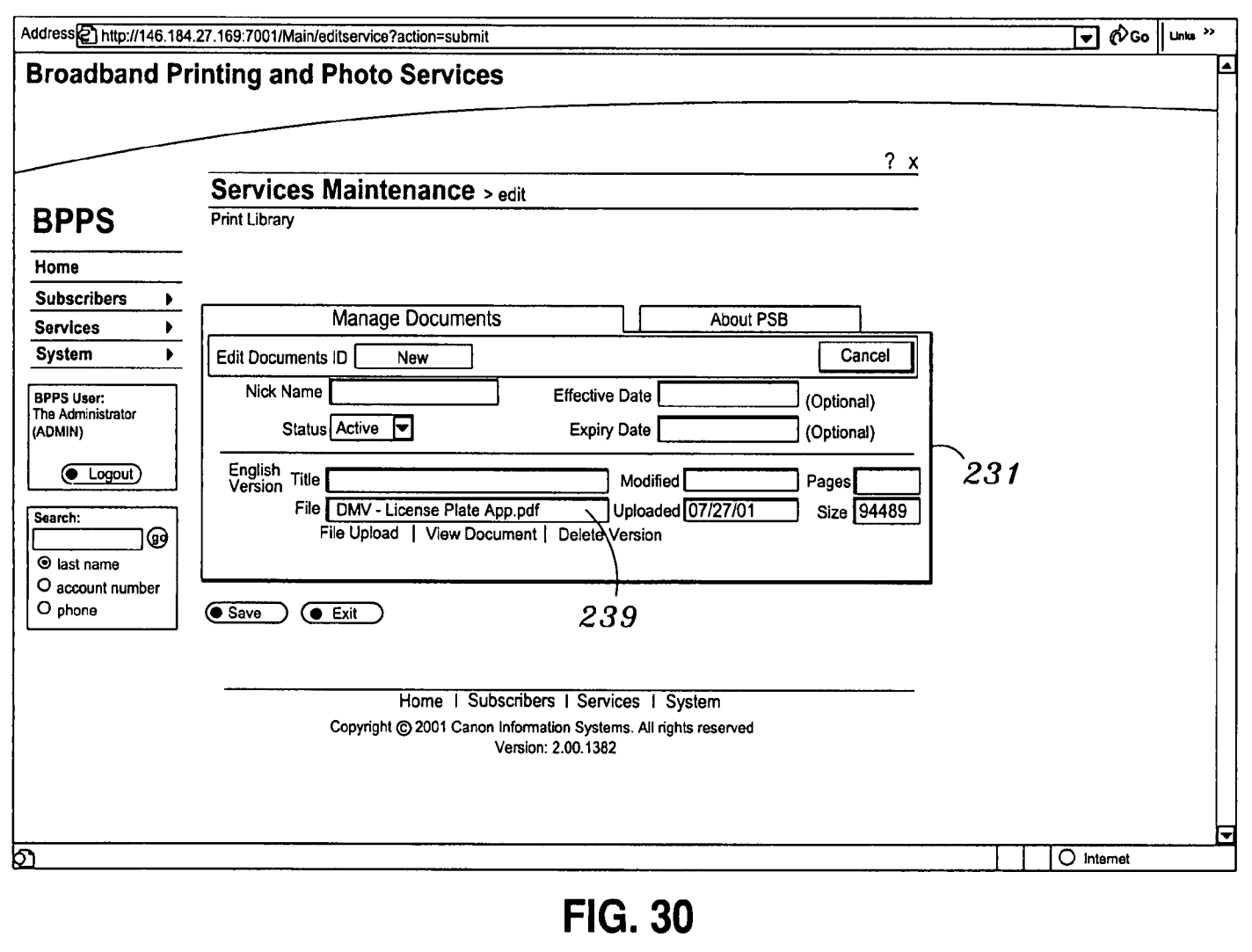
Figure 31:
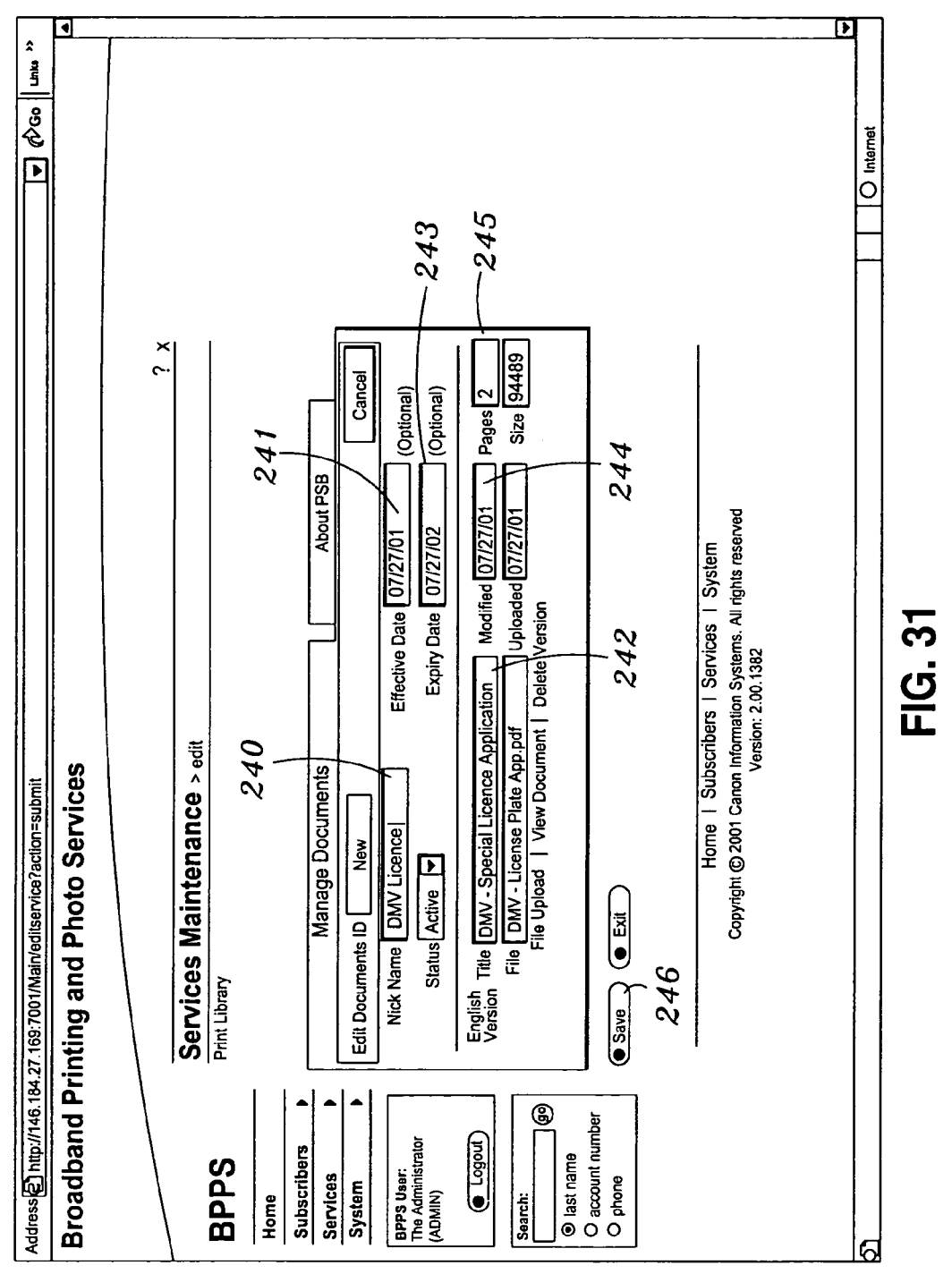
Figure 32:
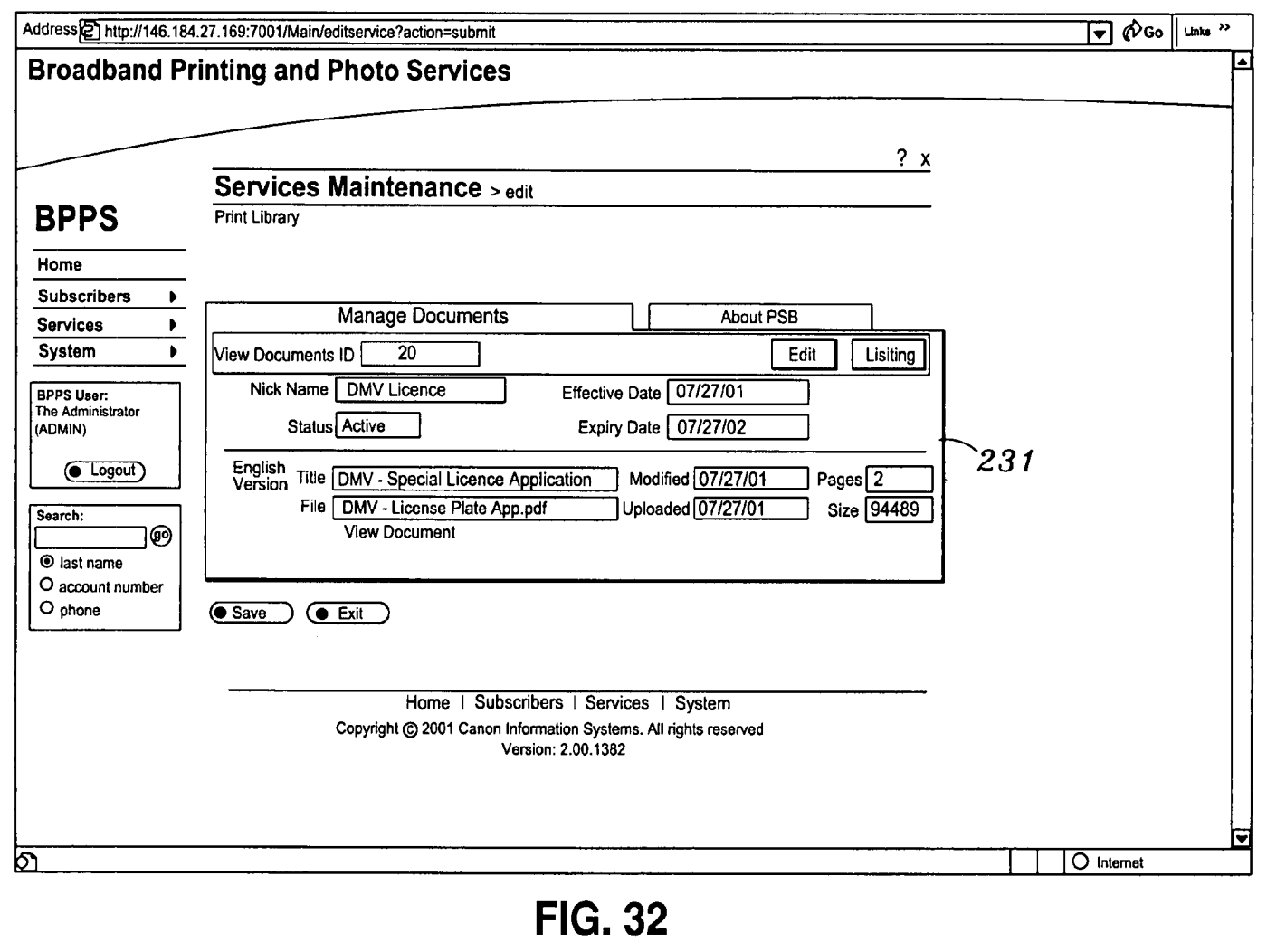

To add the new document, the operator can select File Upload button 232, thereby invoking window 233 shown in FIG. 27. In window 233, the operator can enter the file path in box 237 (if known) or can select Browse button 234. If the operator selects Browse button 234, an explorer window 235 may be displayed as seen in FIG. 28. In explorer window 235, the operator can select the file to be uploaded, such as file 236. Upon selecting the file, the path is entered in box 237 as seen in FIG. 29 and the operator can select Upload button 238. When the user selects Upload button 238, the file is entered in box 239 of window 231 as seen in FIG. 30. The operator can then enter information in boxes 240 to 245 of window 231 and select Save button 246. Upon selecting Save button 246, the information is saved as seen in window 231 of FIG. 32 and a document ID is obtained and saved. The operator can then exit to view the print library listing as seen in FIG. 33, which now shows the new document (DMV-Special License Application) added in FIGS. 26 to 32 as being listed in the library. The operator can then select Services button 206 and the affiliate option (FIG. 34) to return to the affiliate view to select a different PSB to configure (FIG. 35).

Figure 37:
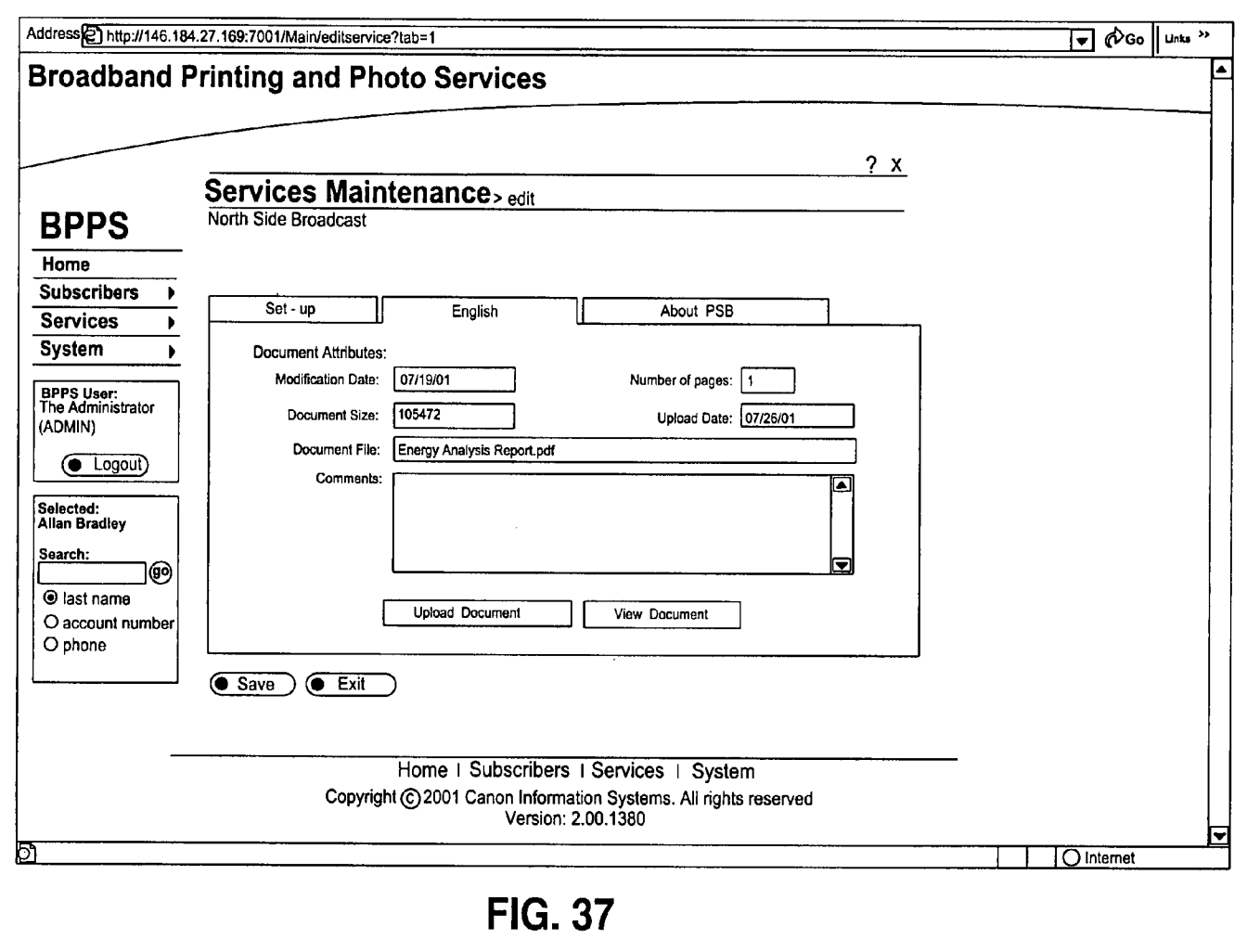
Figure 38:
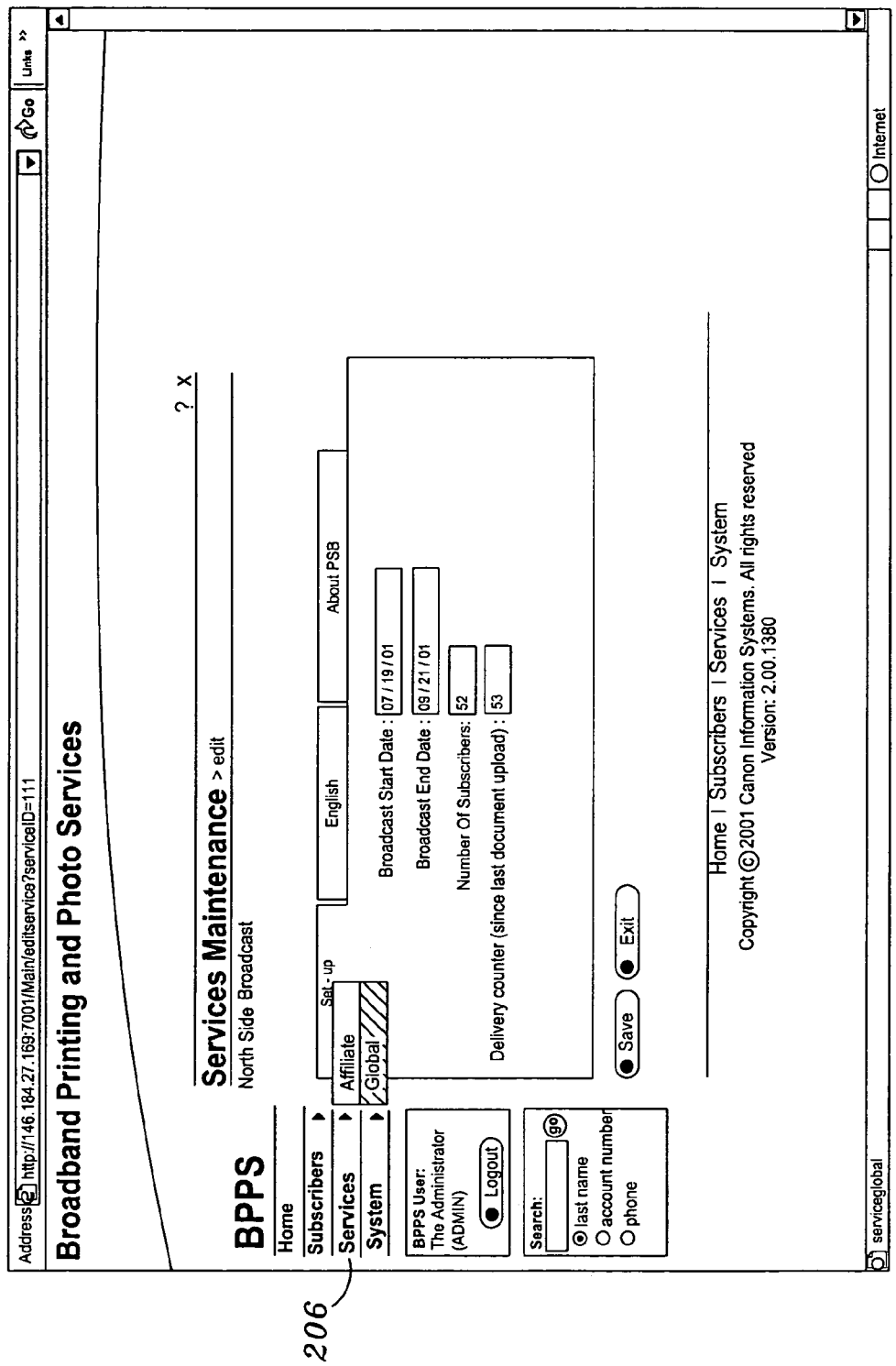

Selecting a different PSB in FIG. 35 (North Side Broadcast) results in the PSB UI depicted FIG. 36. A broadcast PSB is a .pdf file that is periodically broadcast to subscribers, such as a daily or weekly newsletter. In configuring the North Side Broadcast PSB, the MSO operator enters the broadcast start and end dates as seen in FIG. 36, and sets up the document to be broadcast as seen in FIG. 37. The operator can then return to configure a different PSB by selecting services button 206. In the present case, the operator wants to configure the ValuePage #1 PSB (a coupon providing PSB). However, it should be noted that this PSB has not yet been configured at the BPPS level and therefore, since the operator is logged in as a BPPS operator, the operator selects the global view option in FIG. 38, thereby resulting in the global view of the PSB's shown in FIG. 39.

Figure 40:
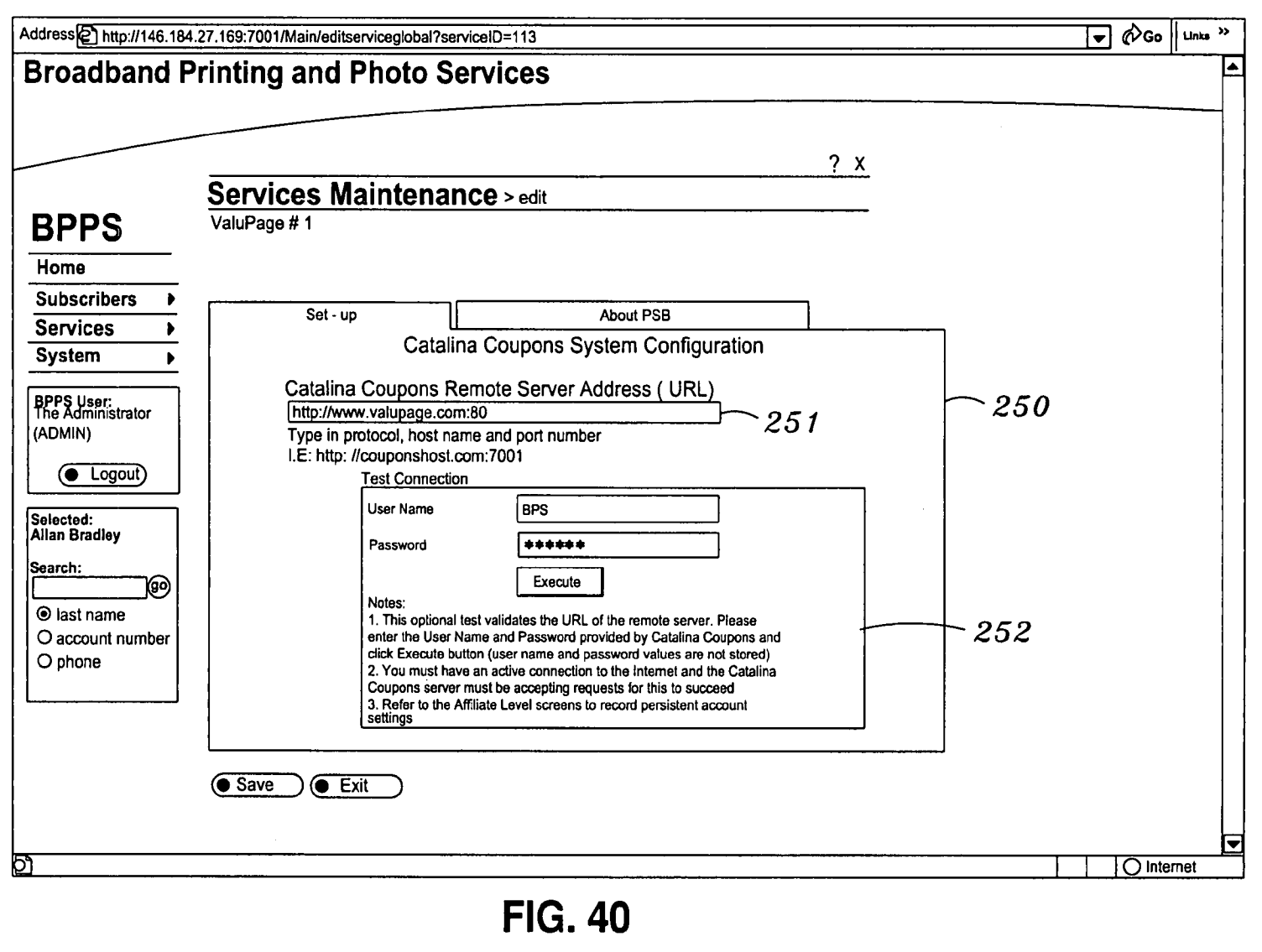

In FIG. 39, the BPPS operator selects the ValuePage #1 PSB for configuration, thereby invoking the PSB and resulting in the configuration window 250 shown in FIG. 40. In window 250, the BPPS operator enters the server address for the coupon provider (Catalina Coupons) to configure the ValuePage #1 PSB at the BPPS level. If desired, the operator can test the connection by entering a user name and password in box 252. The PSB is now ready for configuration at the MSO level. Again, since the operator is logged in as a BPPS operator, the BPPS operator can configure the PSB at the MSO level.

Figure 41:
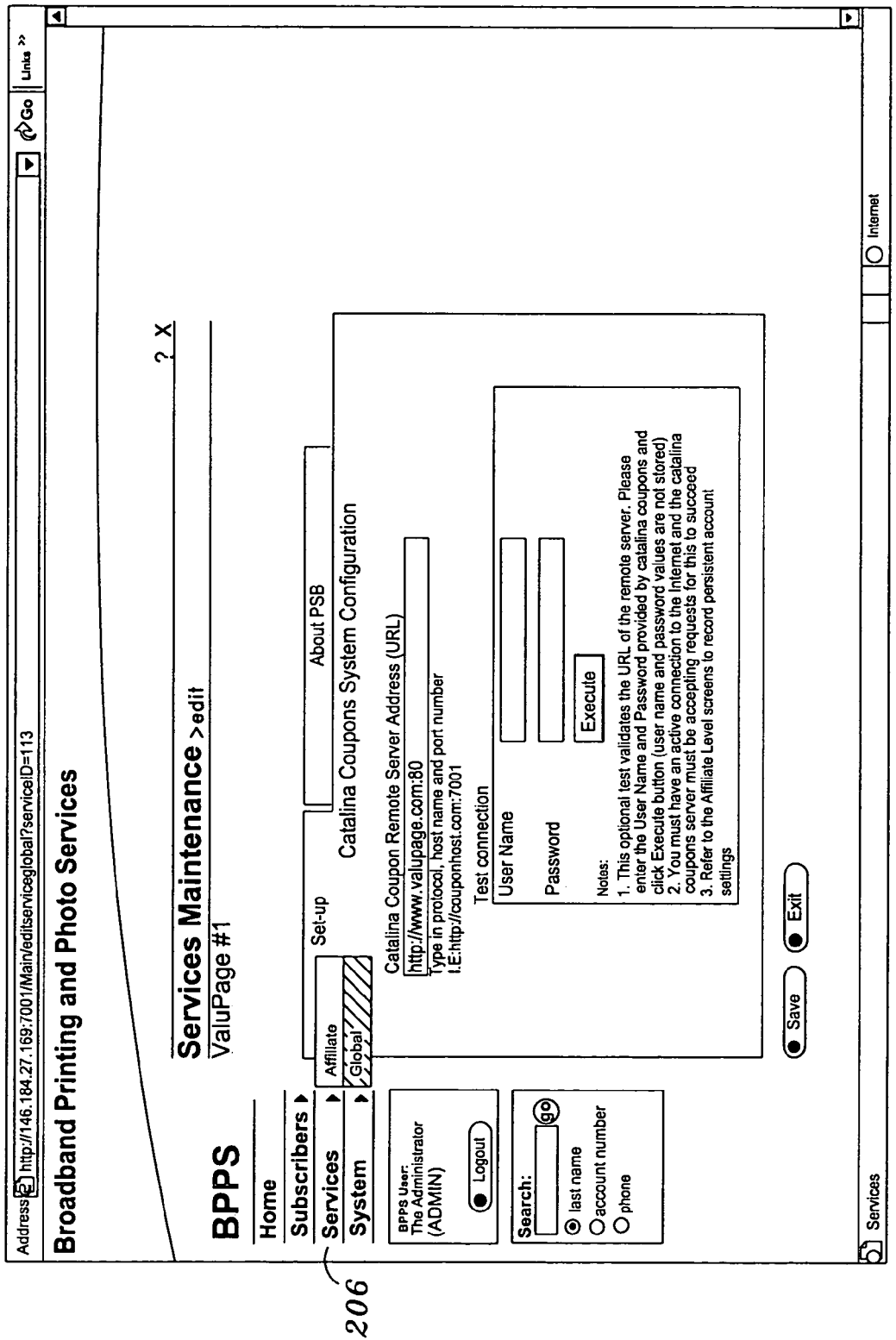
Figure 43:
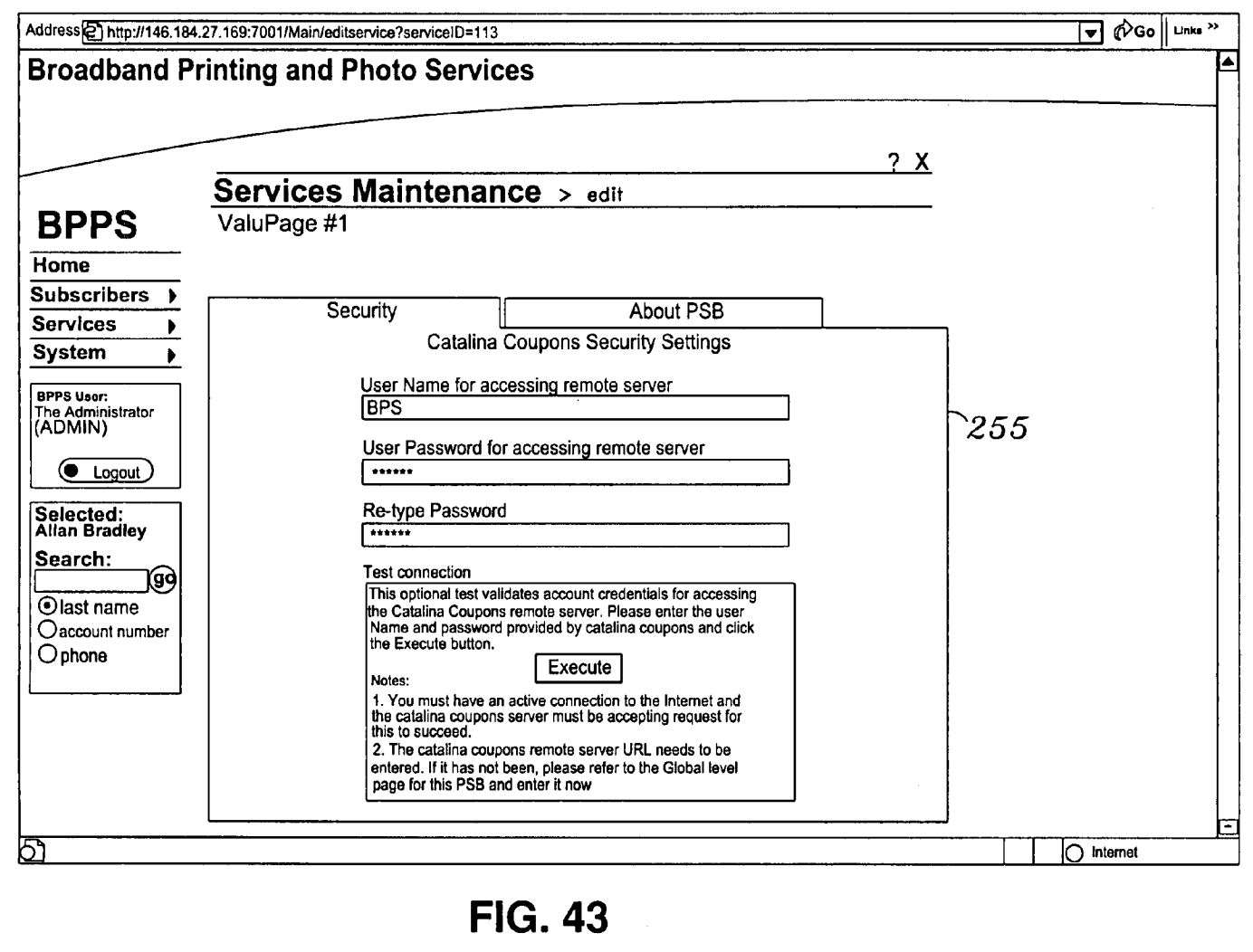

To configure the PSB at the MSO level, the operator selects services button 206 and the affiliate option as seen in FIG. 41, thereby resulting in the display of PSB's shown in FIG. 42. The operator selects the ValuePage #1 PSB in FIG. 42, thereby invoking the PSB for configuration at the MSO level. As seen in a comparison of window 250 of FIG. 40 and window 255 of FIG. 43, the PSB UI displayed is somewhat different based on the level of access. In the present case, the operator configures the PSB at the MSO level by entering a user name and password in box 255.

A description will now be made of the BPPS operator (currently logged in to the BPPS system) performing subscriber maintenance to add a subscriber. As stated above, this operation could be performed by a customer service representative (end user level operator), an MSO level operator or a BPPS level operator. However, for simplicity, the present discussion will be made with regard to this subscriber maintenance operation being performed by the BPPS level operator.

Figure 47:
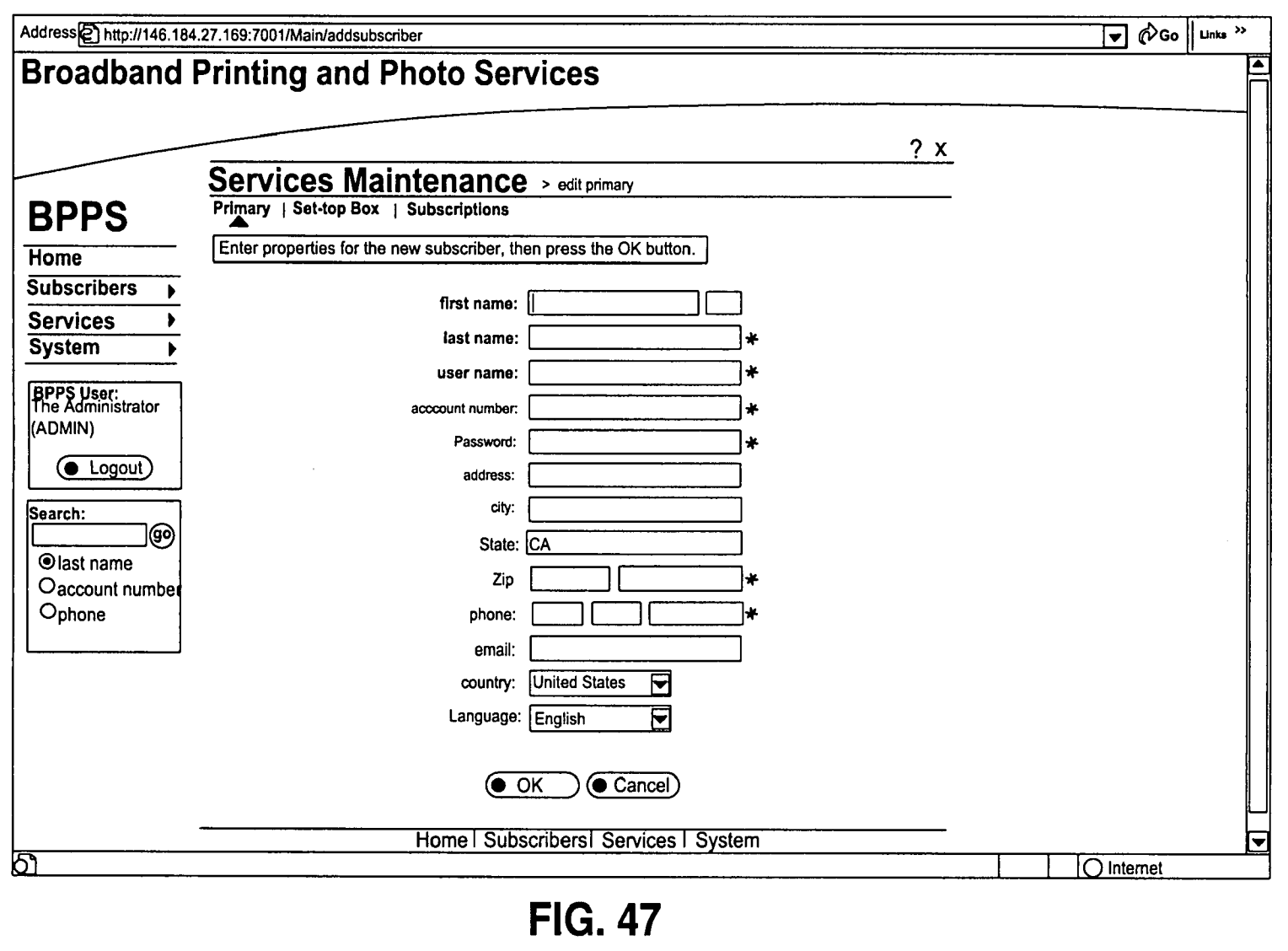
Figure 49:

As seen in FIG. 44, the operator selects Subscribers button 205, thereby resulting in the listing of subscribers shown in FIG. 45. To add a new subscriber to the listing, the operator selects Subscriber button 250 and the Add option as seen in FIG. 46, thereby invoking the subscriber properties window shown in FIG. 47. After entering the subscriber properties as seen in FIG. 48, the operator selects the OK button and the new subscriber is added, with a confirmation window being displayed as shown in FIG. 49 and the new subscriber being included in the listing shown in FIG. 50.

Figure 53:
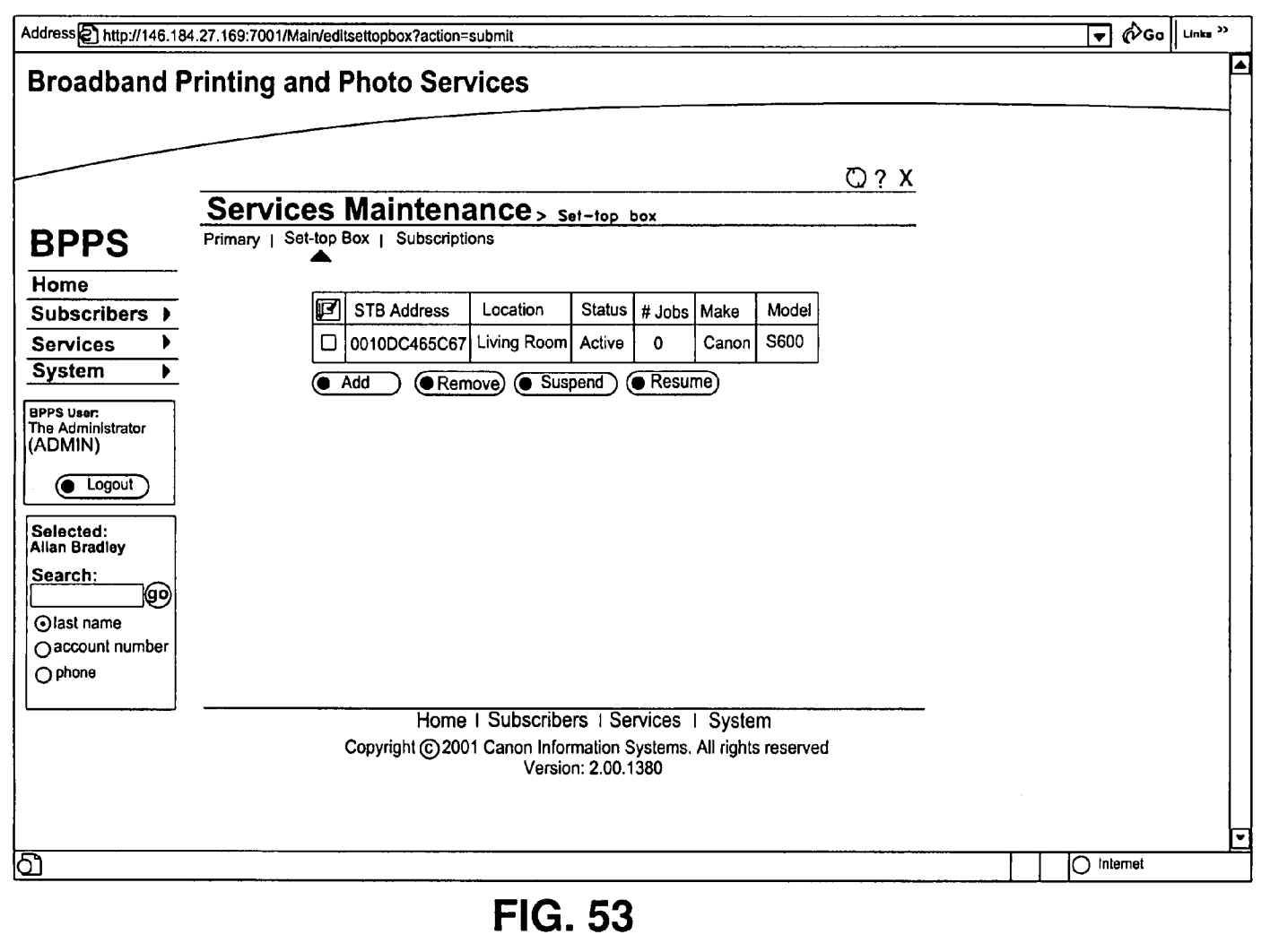

The operator can also add a new set-top box by selecting Subscribers button 205 and the Set Top Box option as shown in FIG. 51. As shown in FIG. 52, the operator enters the set-top box's address and location name. Upon selecting the OK button in FIG. 52, the set-top box is added as shown in FIG. 53.

Figure 54:
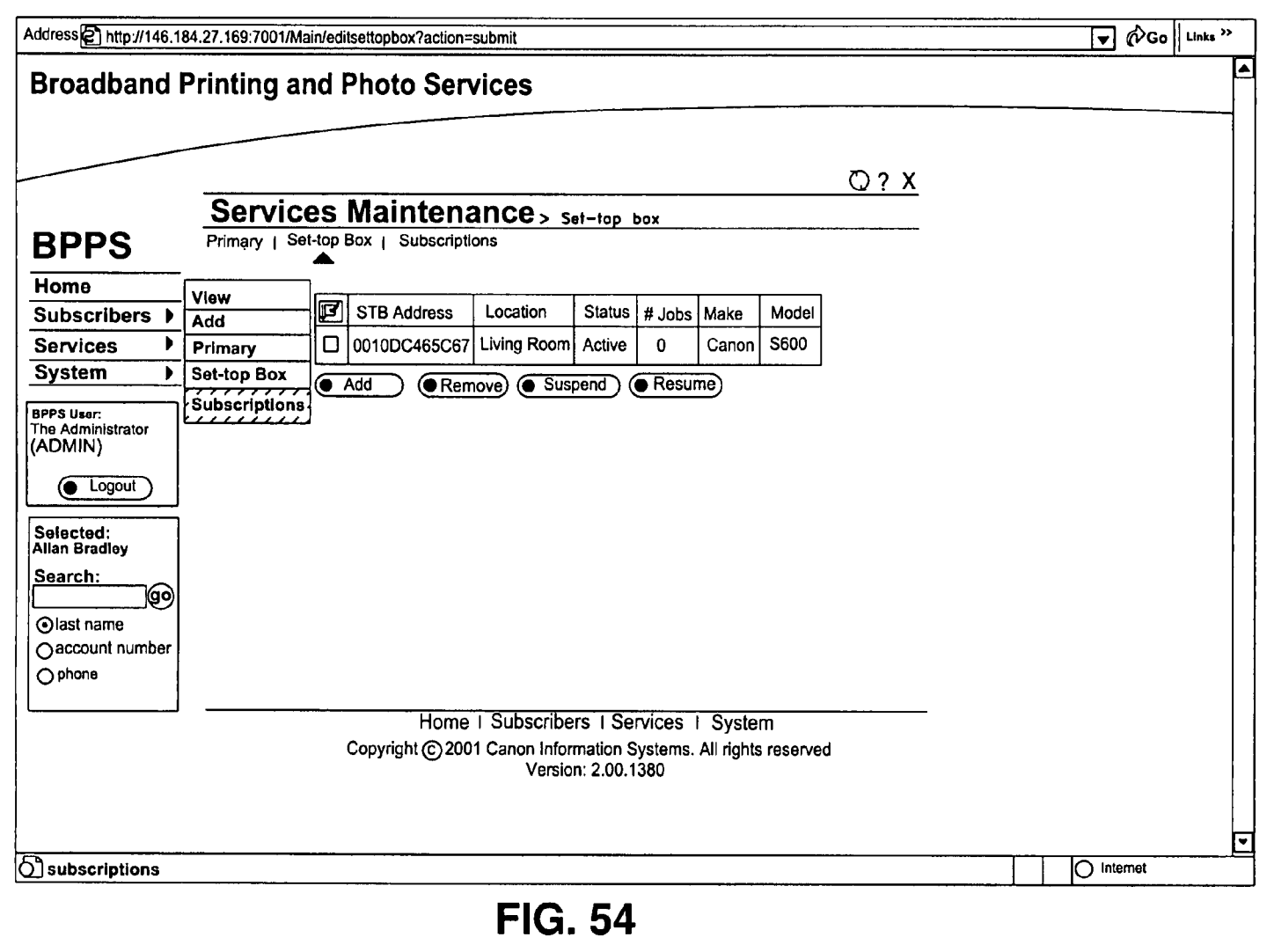
Figure 55:
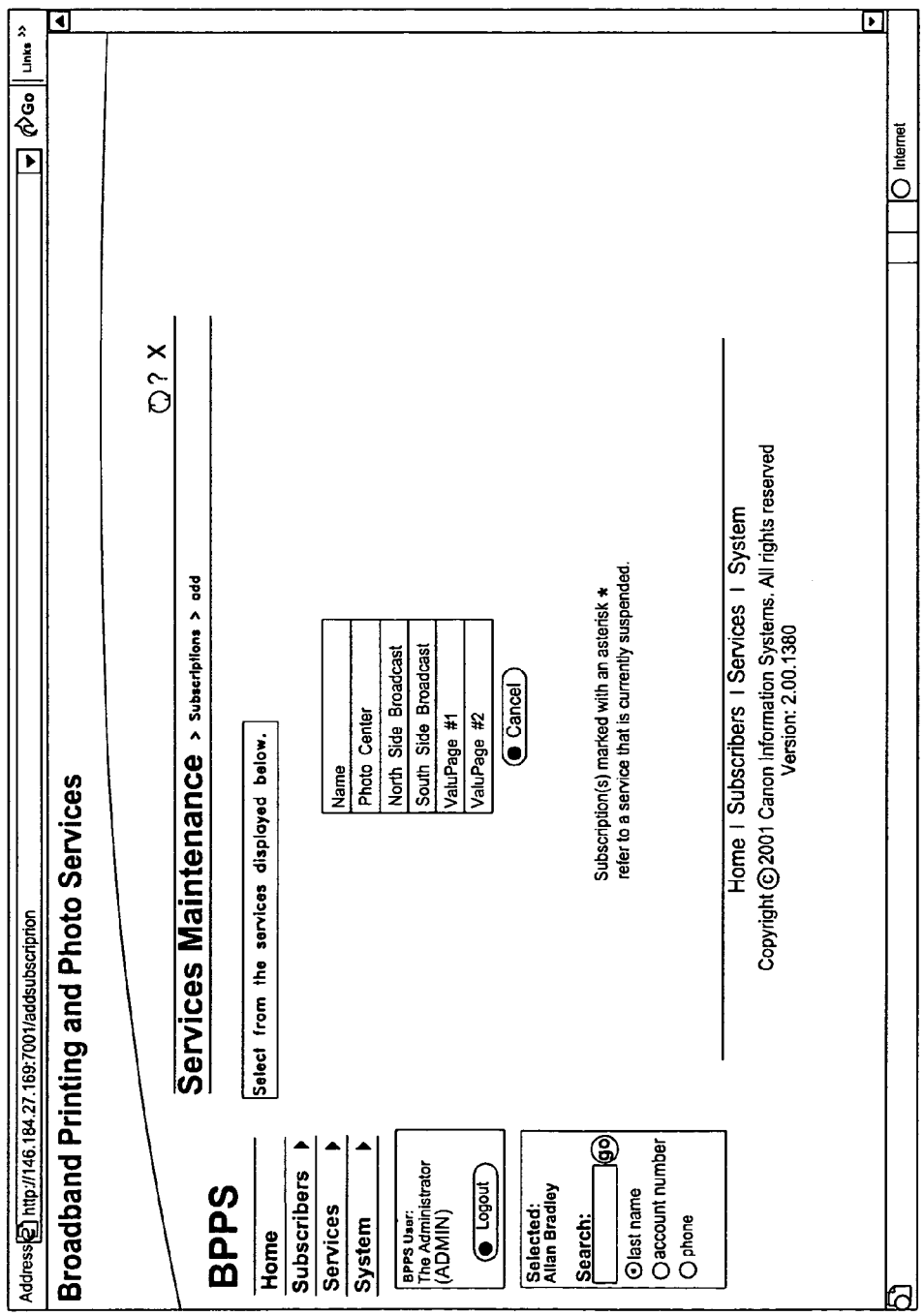
Figure 56:
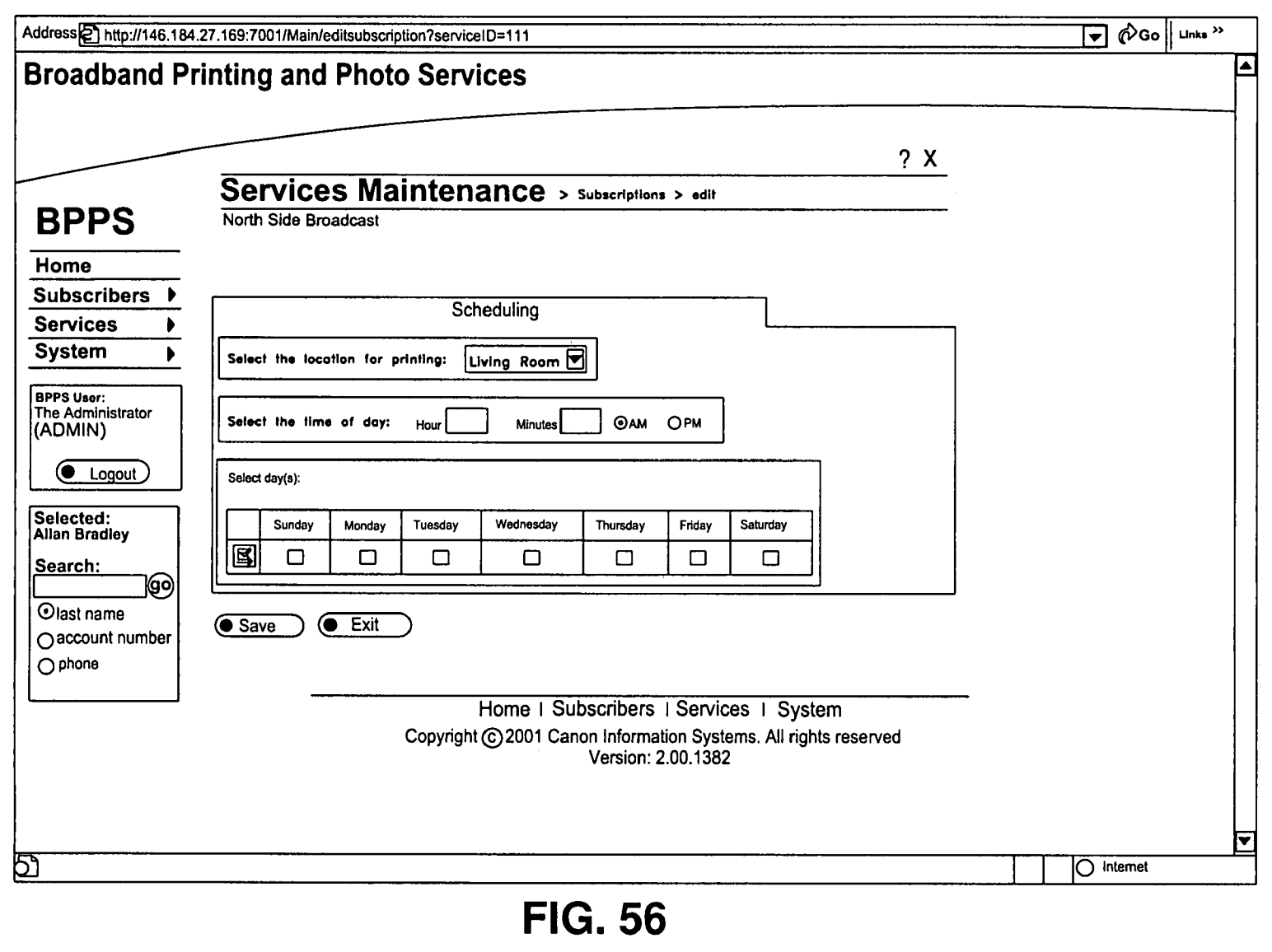
Figure 57:
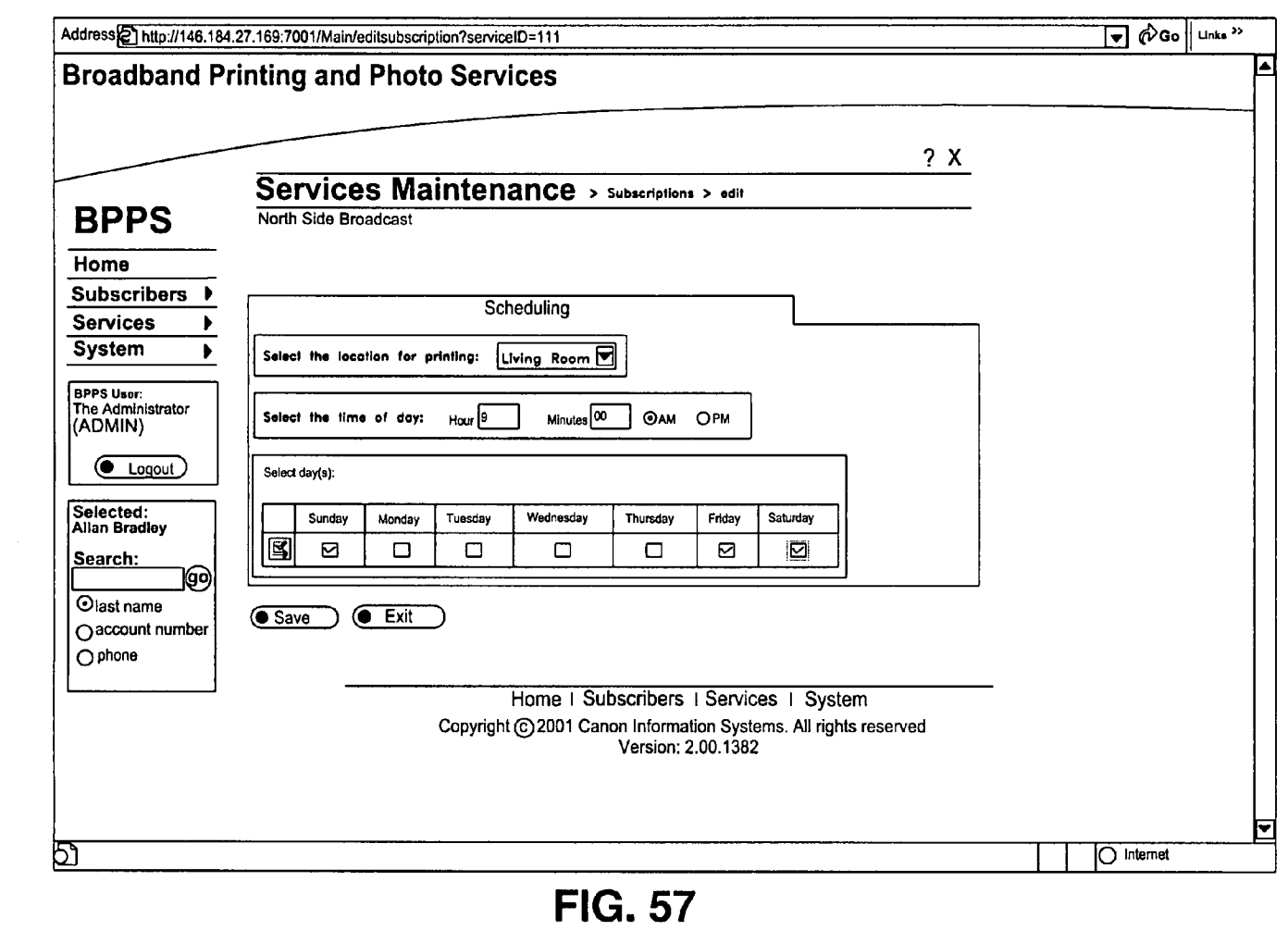
Figure 58:
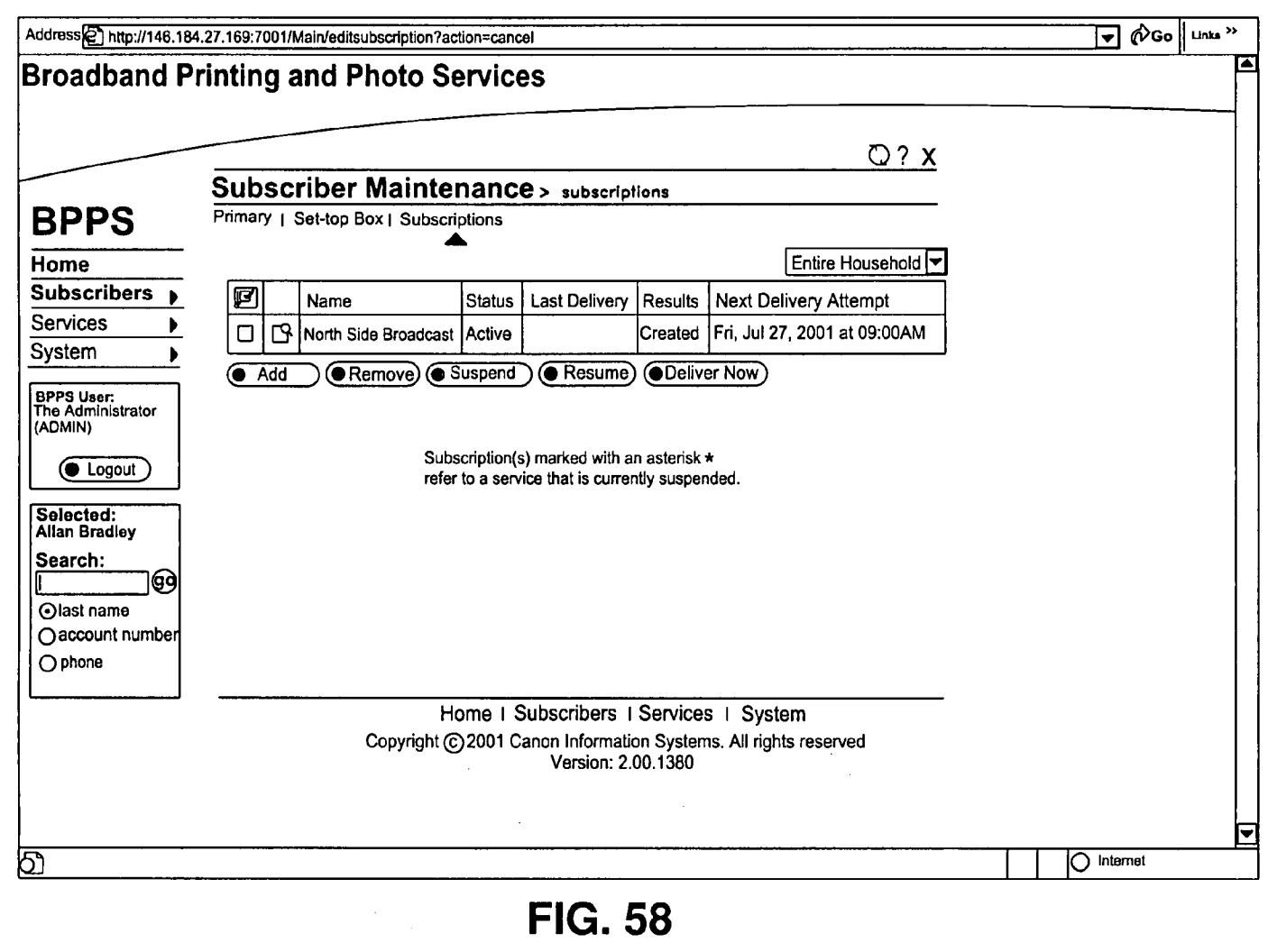

The operator can also configure subscriptions for the new set-top box. As seen in FIG. 54, the operator can select Subscribers button 205 and the Subscriptions option, thereby resulting in a listing of available services as shown in FIG. 55. To configure a subscription, the operator selects the service to be subscribed to, in this case, North Side Broadcast. Upon selecting the North Side Broadcast service in FIG. 55, a scheduling window as seen in FIG. 56 is depicted. Utilizing the scheduling window, the operator can configure the location for printing, time of day, and day or days for the printing to occur. An example of a completed schedule is shown in FIG. 57 and the confirmed subscription is shown in FIG. 58.

The foregoing provided an example of BPPS level, MSO level and end user level configuration operations being performed by a BPPS level operator. The following is a discussion of subscriber maintenance operations being performed by a customer service representative. Recall from FIG. 17 that the customer service representative can perform View subscribers operations, Add/Edit subscriber operations (including Profile information, Subscriptions, Set-Top Box and Printer operations), and can also Delete subscribers. Some of these operations will be described below.

Figure 59:
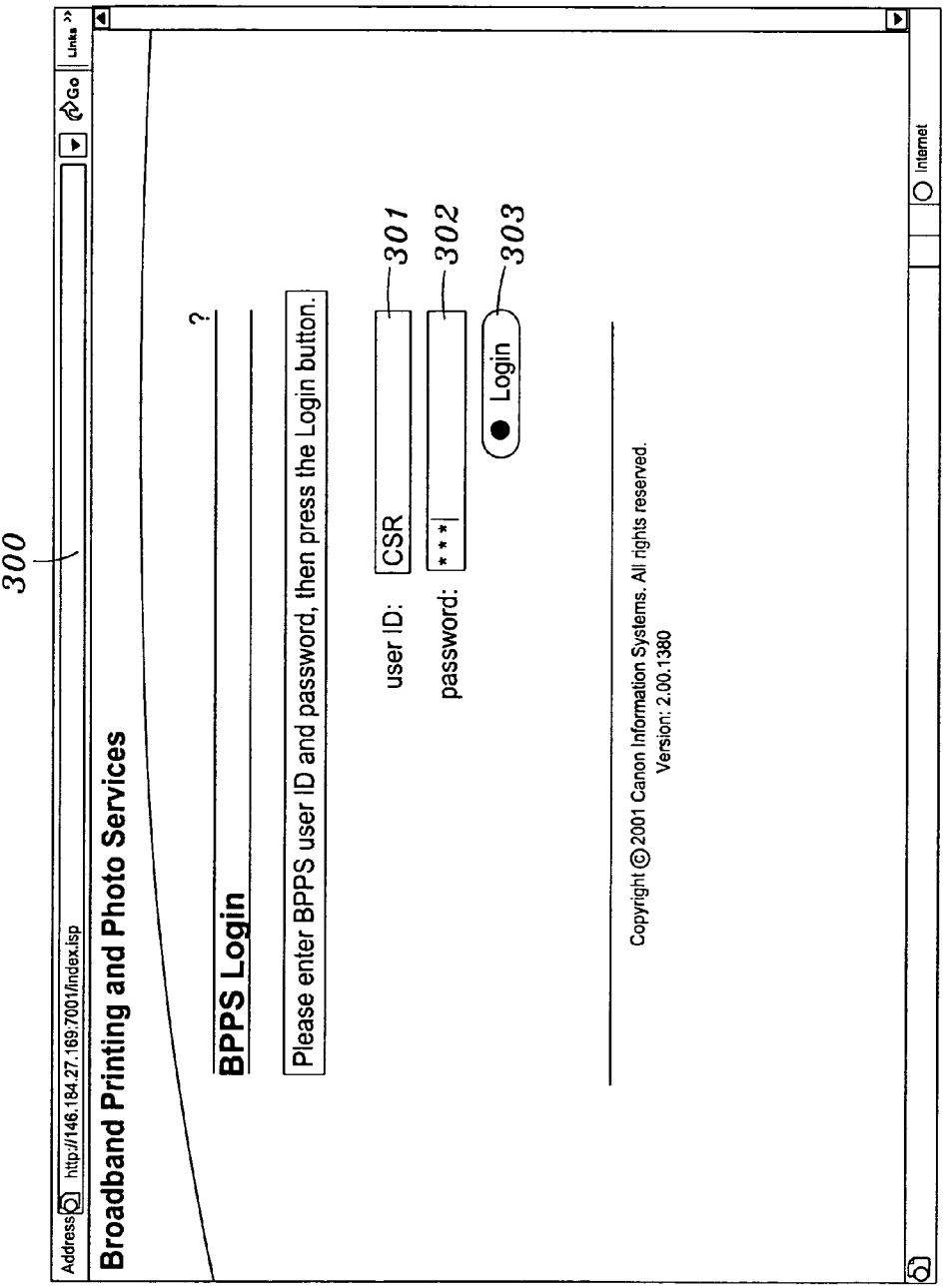

In FIG. 59, the customer service representative enters the URL for the BPPS server in box 300, thereby activating the BPPS login screen shown in the figure for which the operator enters their user ID and password in boxes 301 and 302 and selects login button 303. As stated above, the services and operations made available to the operator depend on the users ID and password. Accordingly, as described above, an operator logging in using a BPPS level user name and password is provided with BPPS level services and operations. However, in the present example, the operator logs in using a customer service representative level user name and password and therefore is provided with end user level services and operations. As such, upon logging in as a customer service representative, a home page is depicted as shown in FIG. 60. As stated above, when the operator logs in as a customer service representative, only Subscribers maintenance button 305 is displayed.

Figure 61:
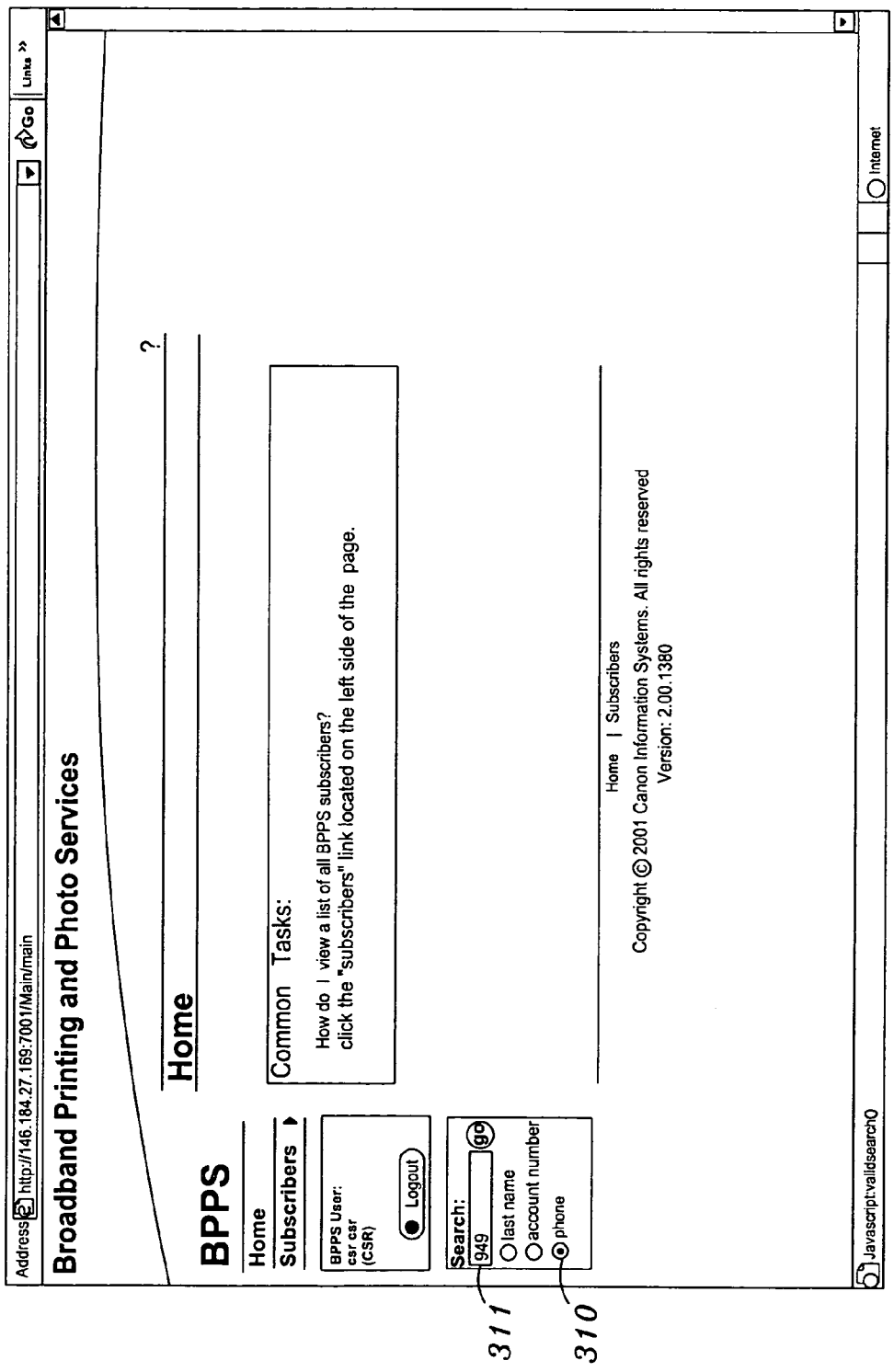

As seen in FIGS. 61 and 62, and as listed in FIG. 17, the operator can perform a view subscribers operation and can search for subscribers by phone number (area code) by selecting Phone button 310 and entering an area code (949) in box 311. The results of the subscriber search are shown in FIG. 62.

Figure 63:
Figure 64:
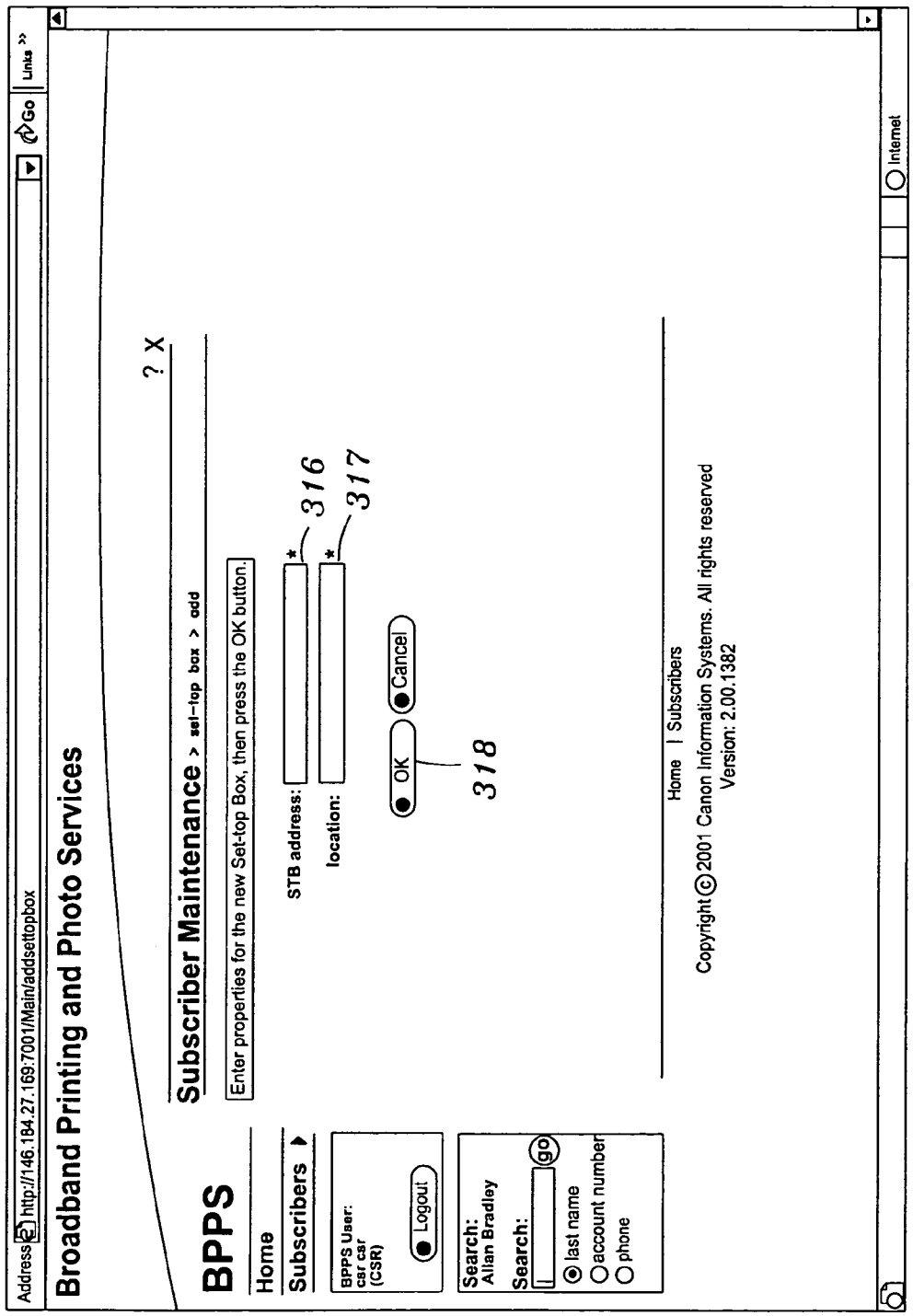
Figure 65:
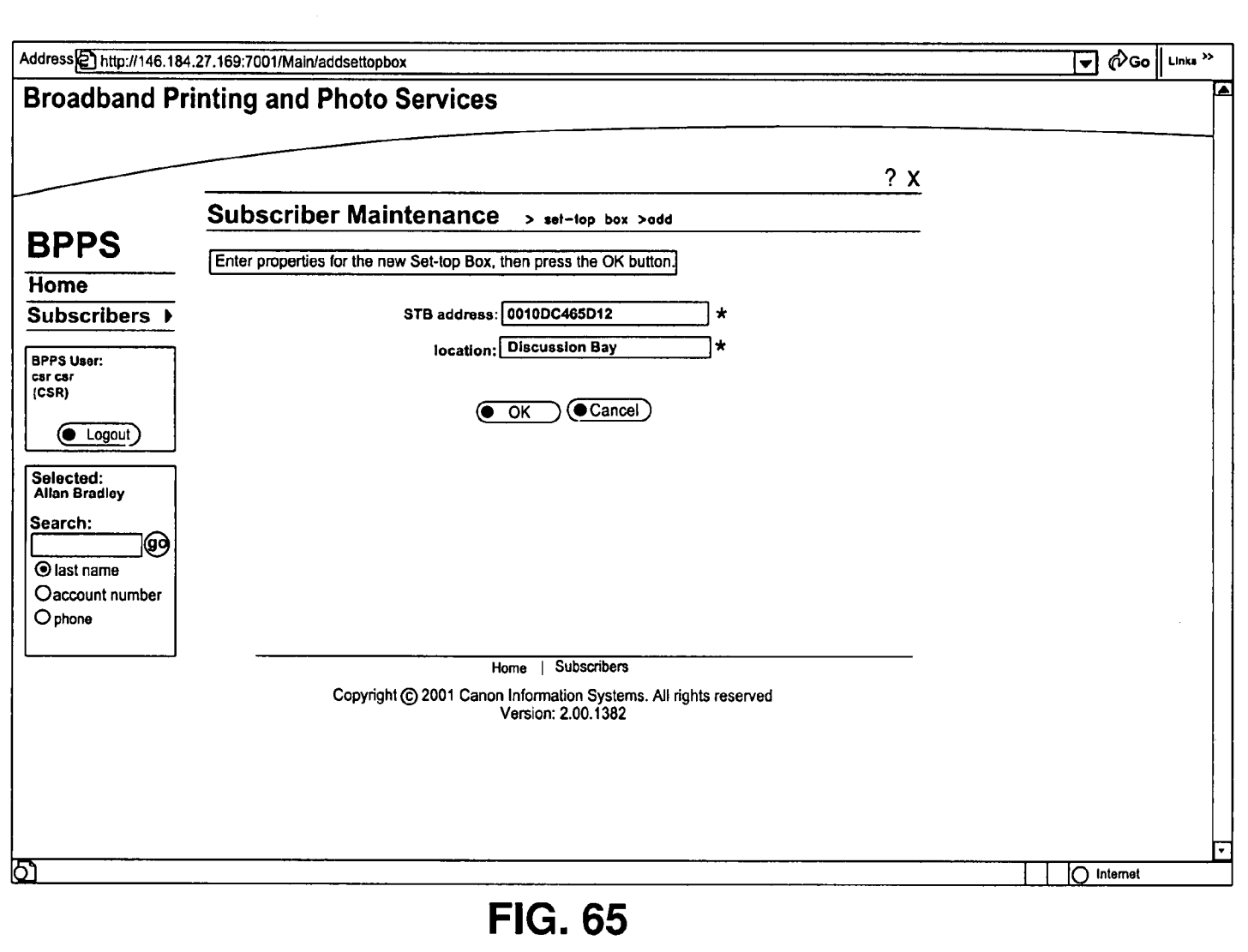

As seen in FIG. 63, the operator can perform set-top box operations and can add a set-top box by selecting Add button 315. Upon selecting Add button 315, a display as seen in FIG. 64 is activated for the operator to enter the set-top box's address in box 316 and location in box 317 as seen in FIG. 65. Upon selecting OK button 318, the set-top box is added as shown in FIG. 66.

Figure 67:
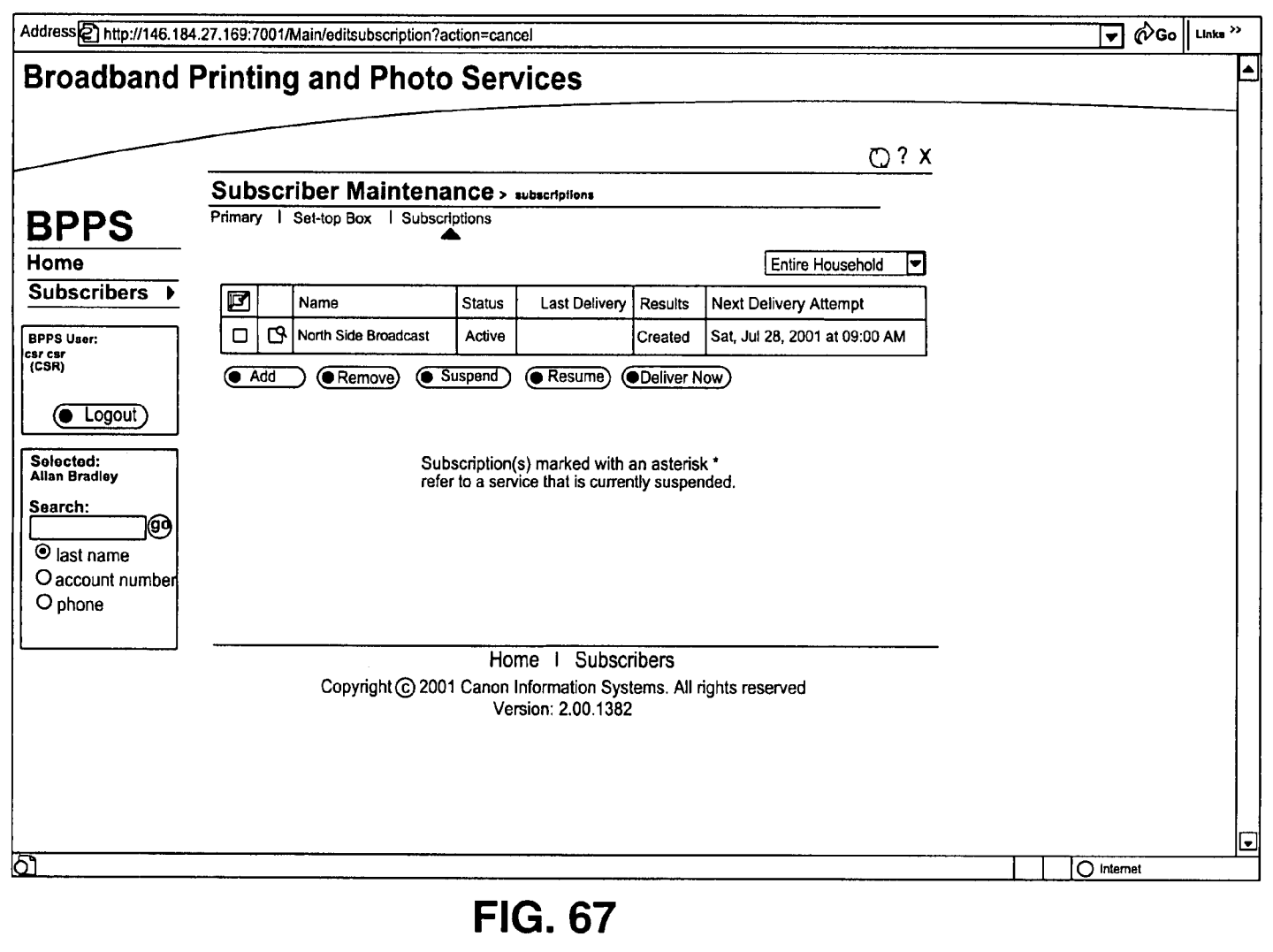
Figure 68:
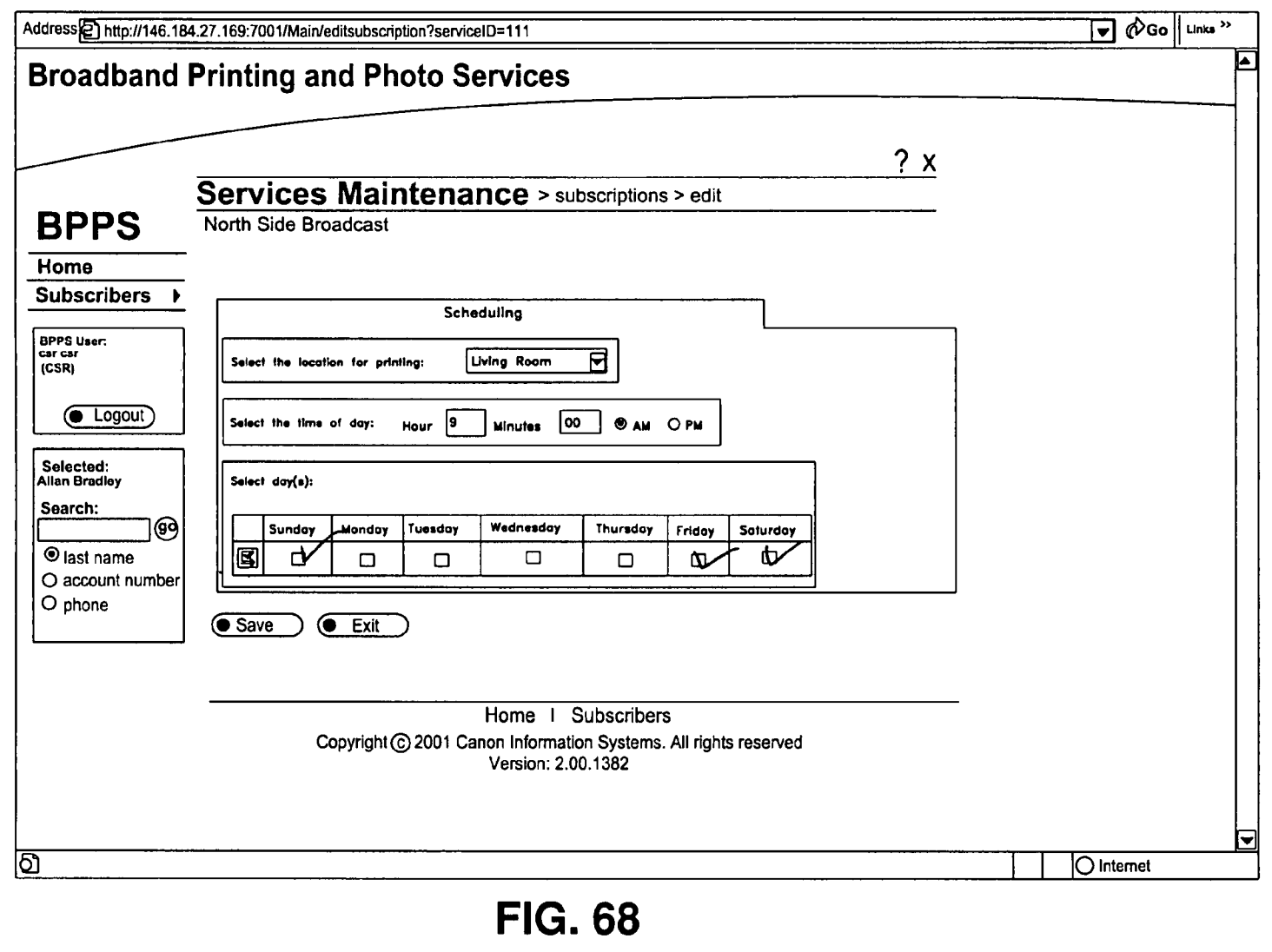
Figure 69:
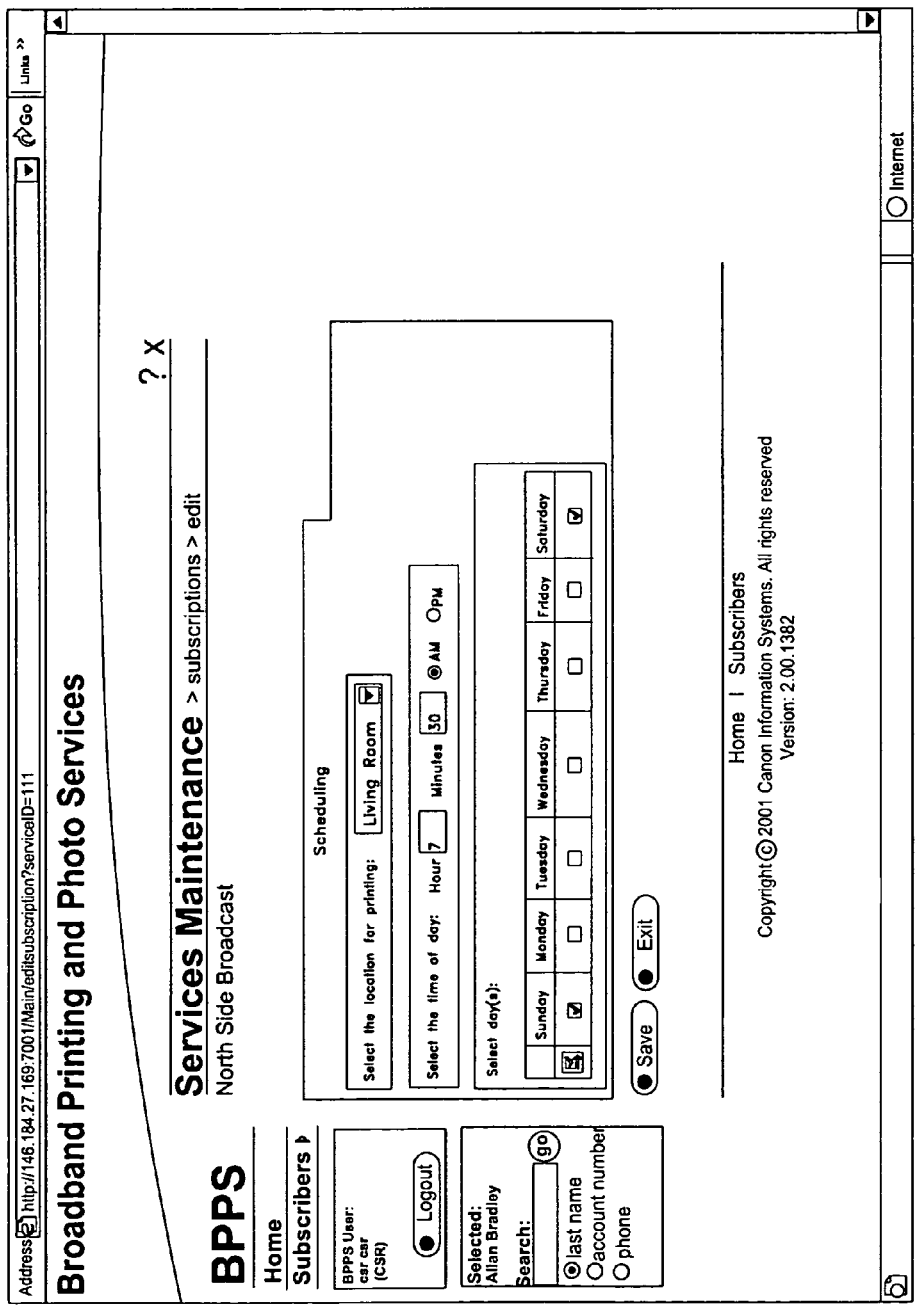
Figure 70:
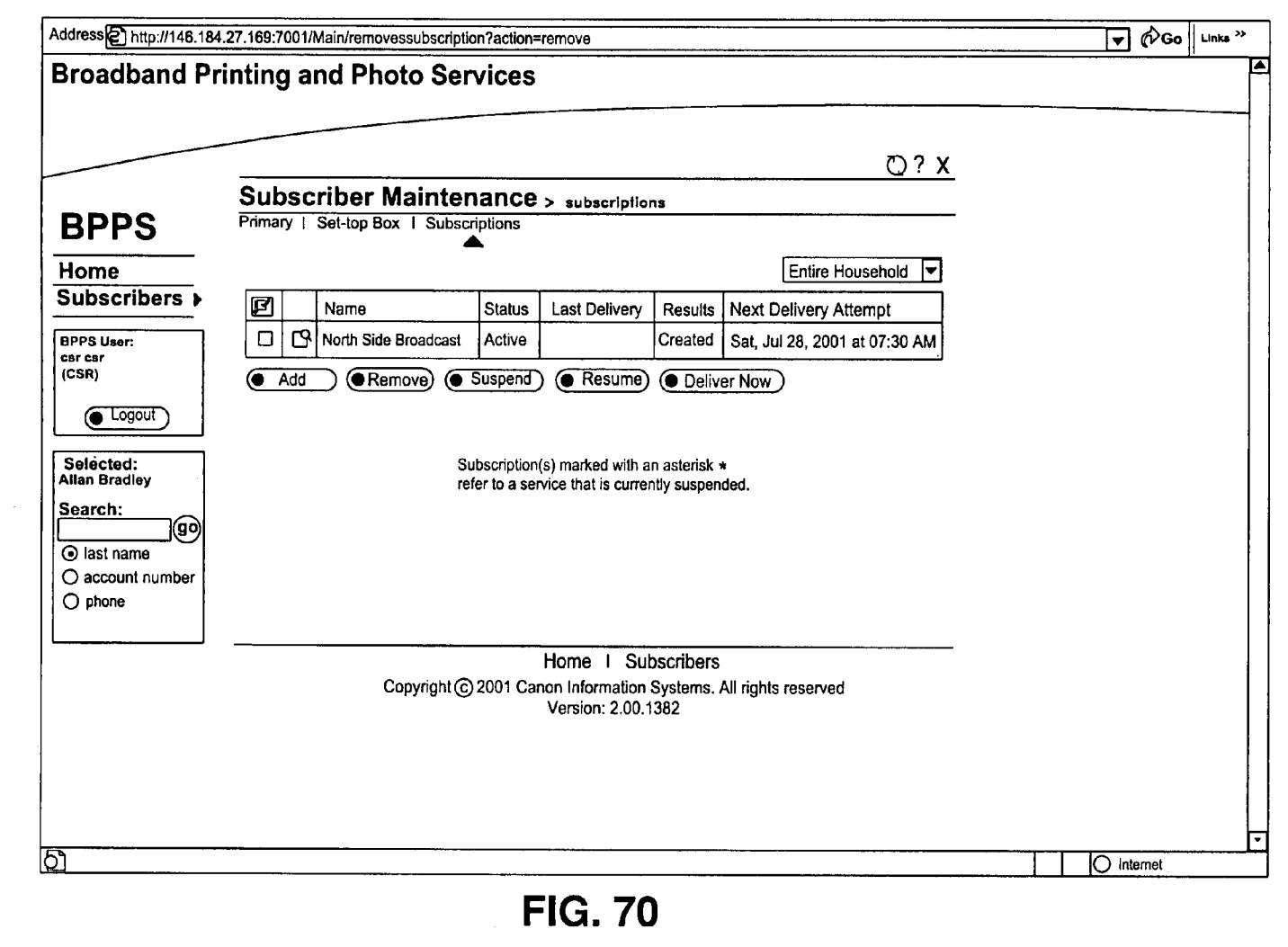

The customer service representative can also edit and add subscriptions. As seen in FIG. 67, the operator can edit a subscription for the North Side Broadcast service by selecting the service in FIG. 67, thereby activating the subscription as shown in FIG. 68. The operator can then edit the subscription to change the time and days of delivery from those shown in FIG. 68 to those shown in FIG. 69. The edited subscription is displayed in FIG. 70 with the next delivery attempt date and time having been updated as shown in the figure.

Figure 71:
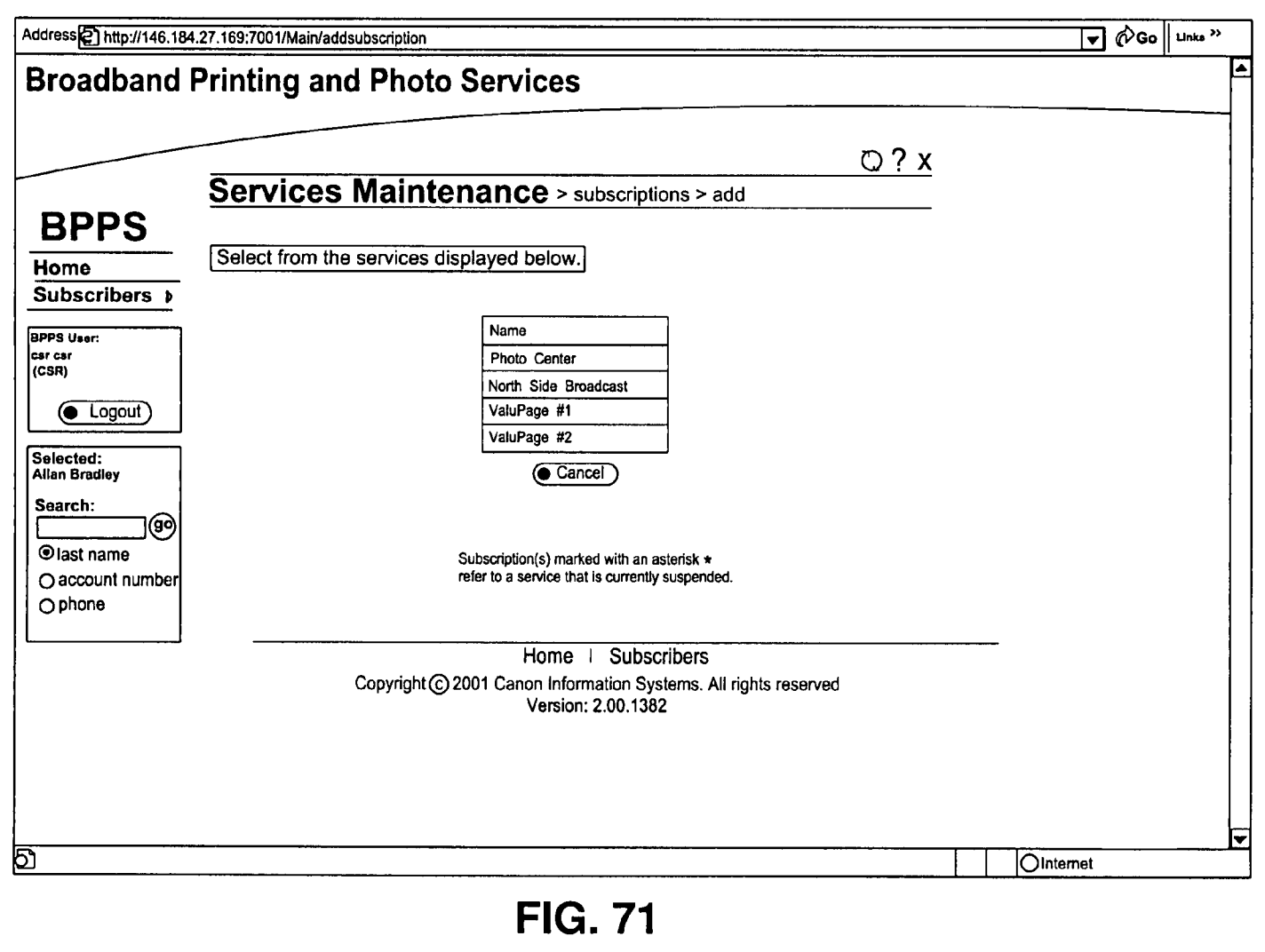
Figure 72:
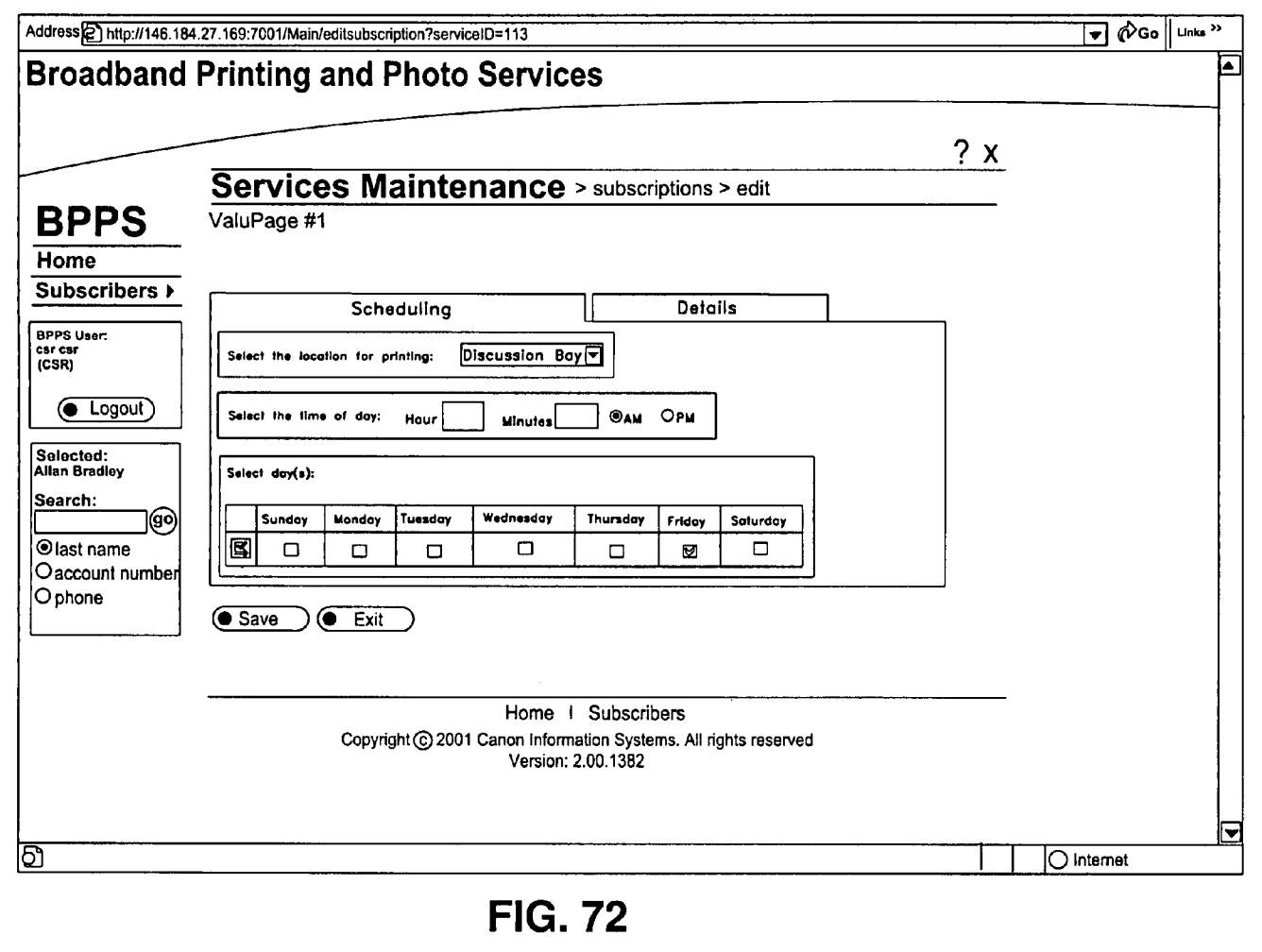
Figure 73:
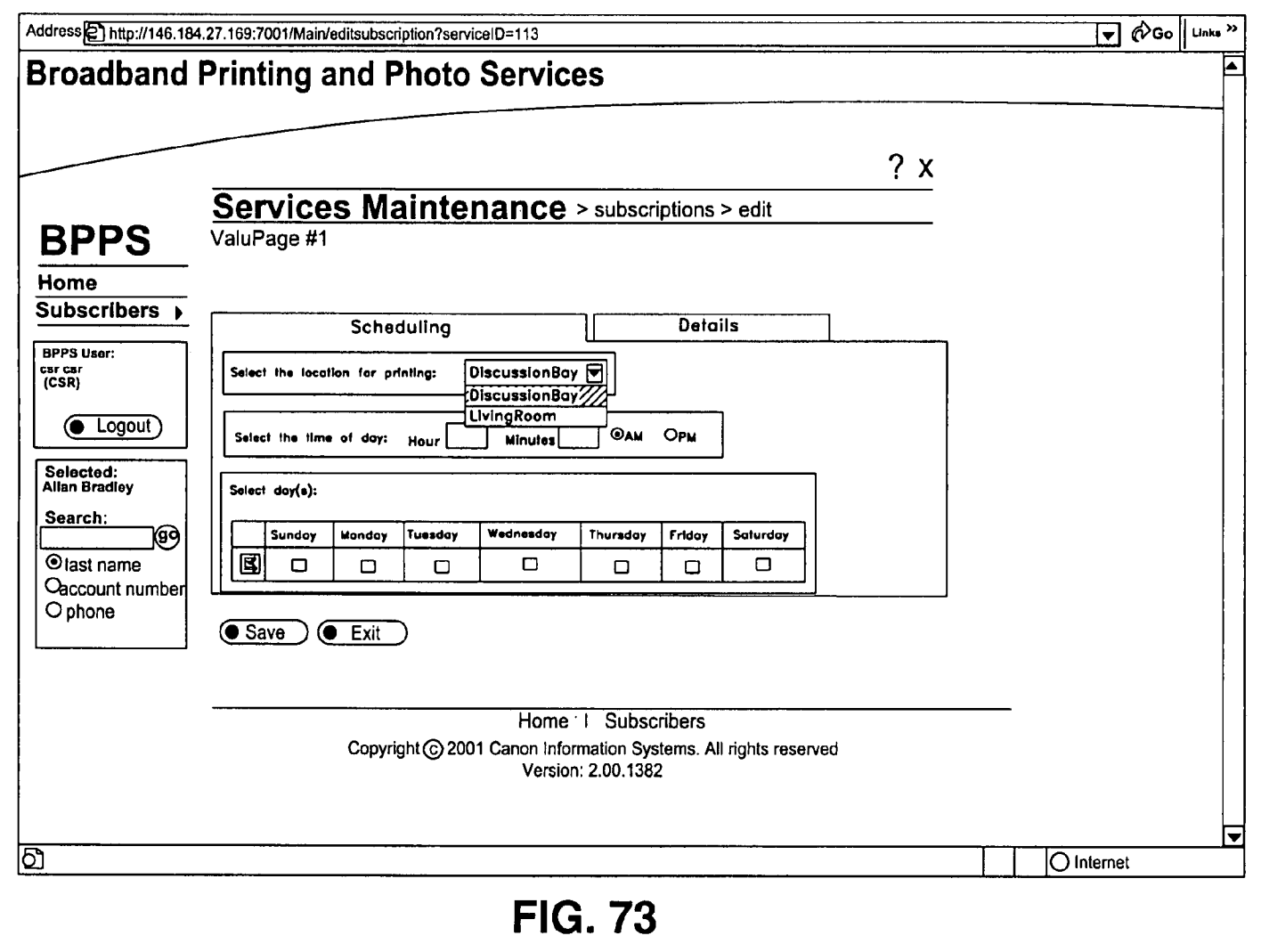
Figure 74:
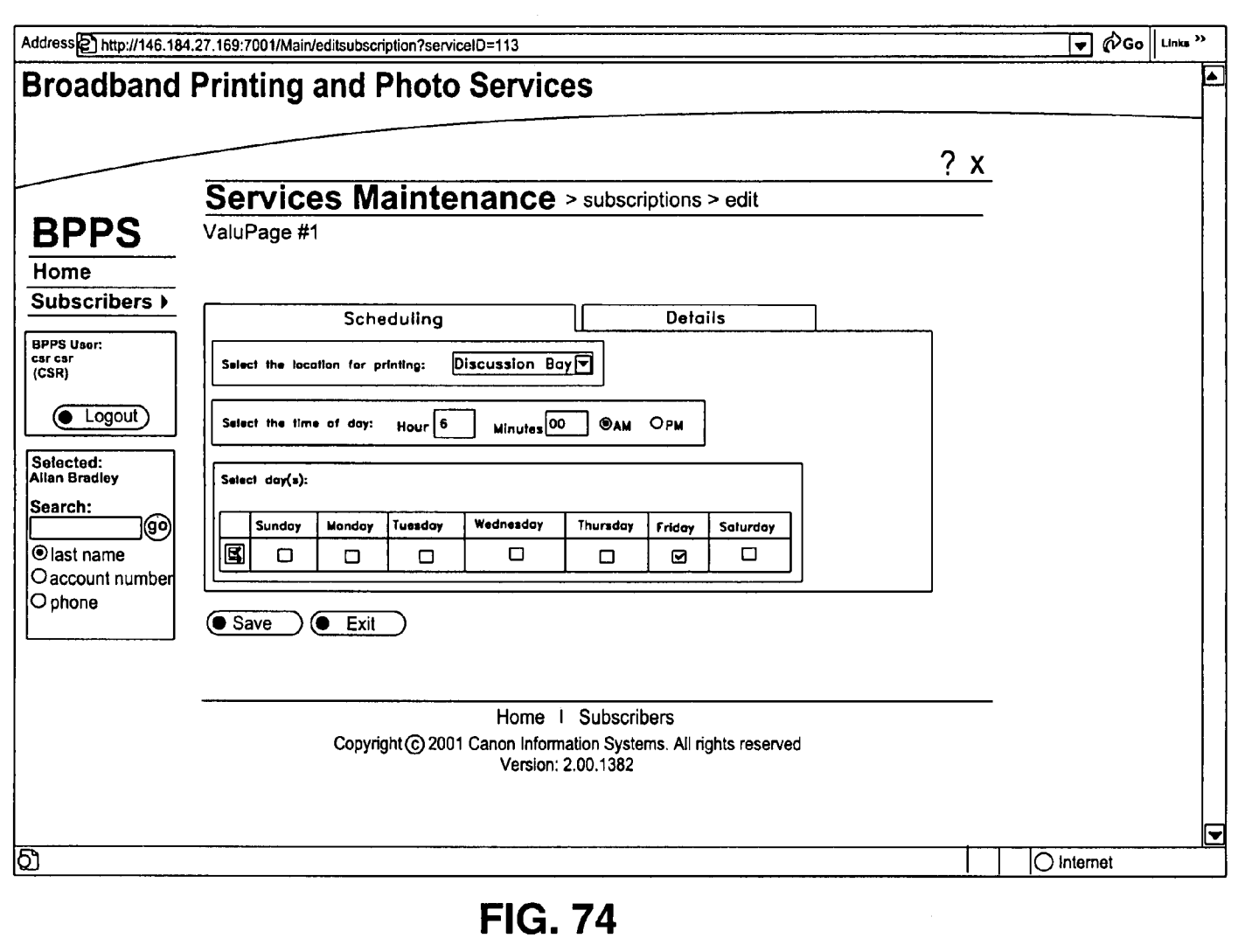
Figure 75:
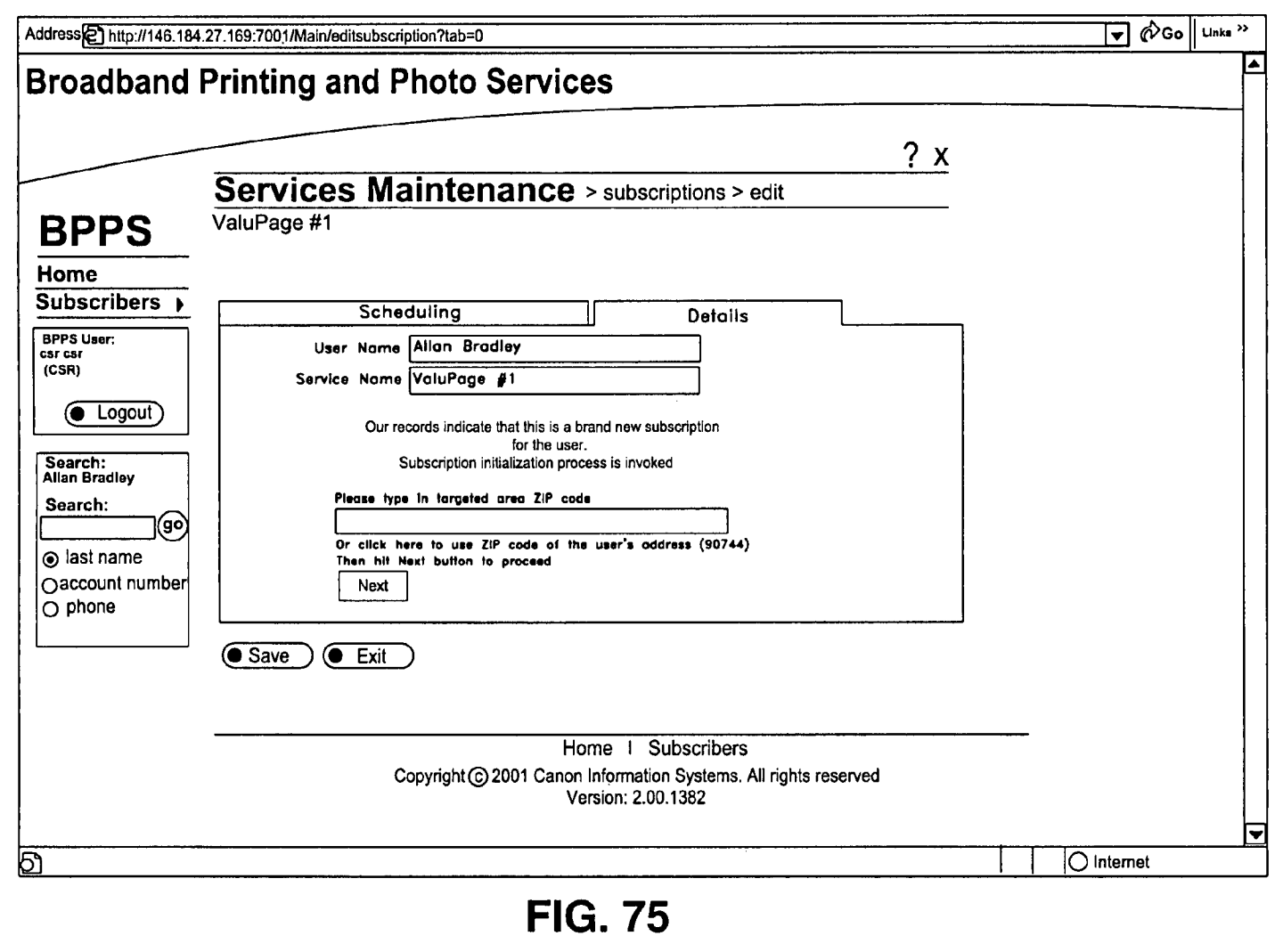
Figure 76:
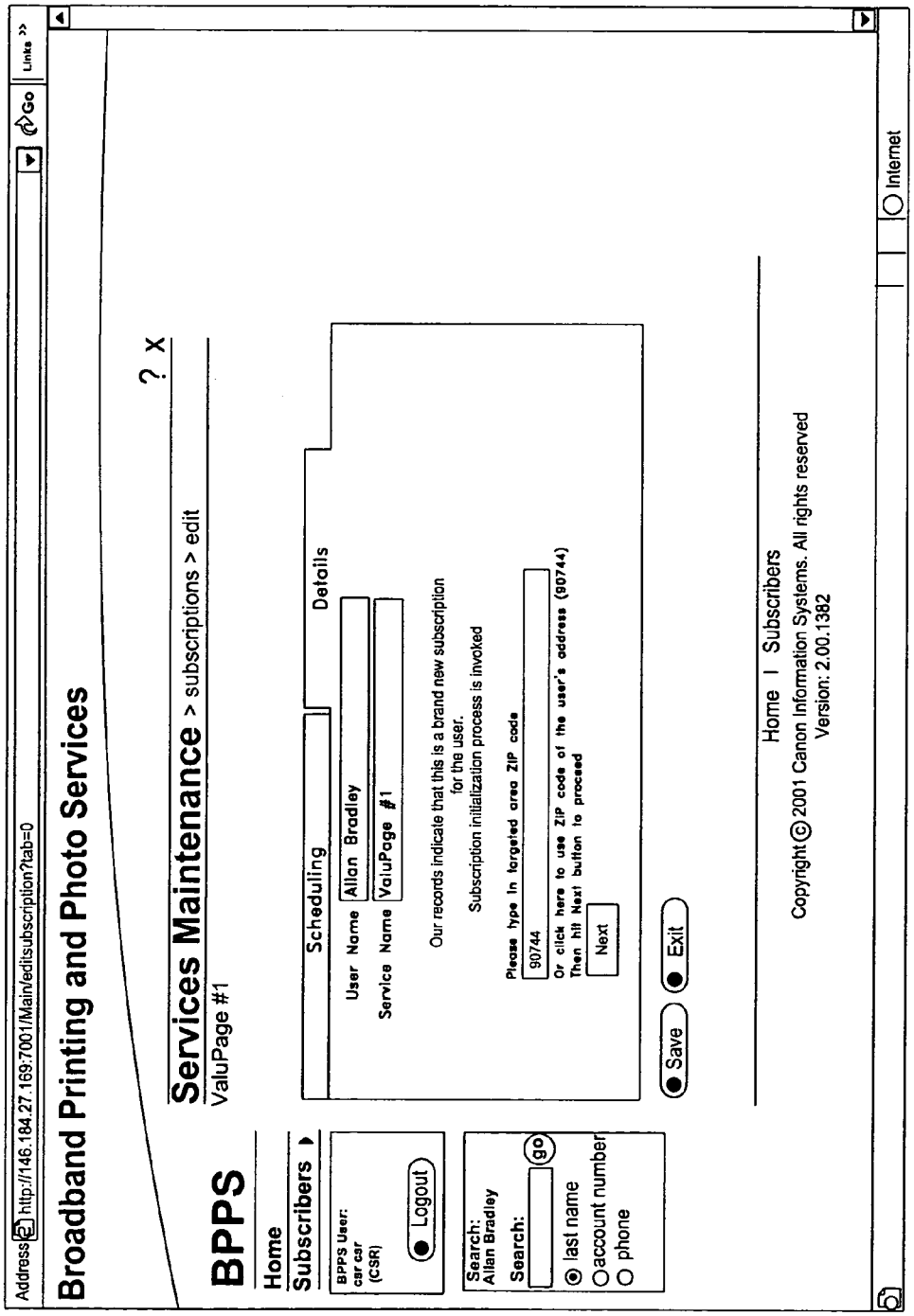
Figure 77:
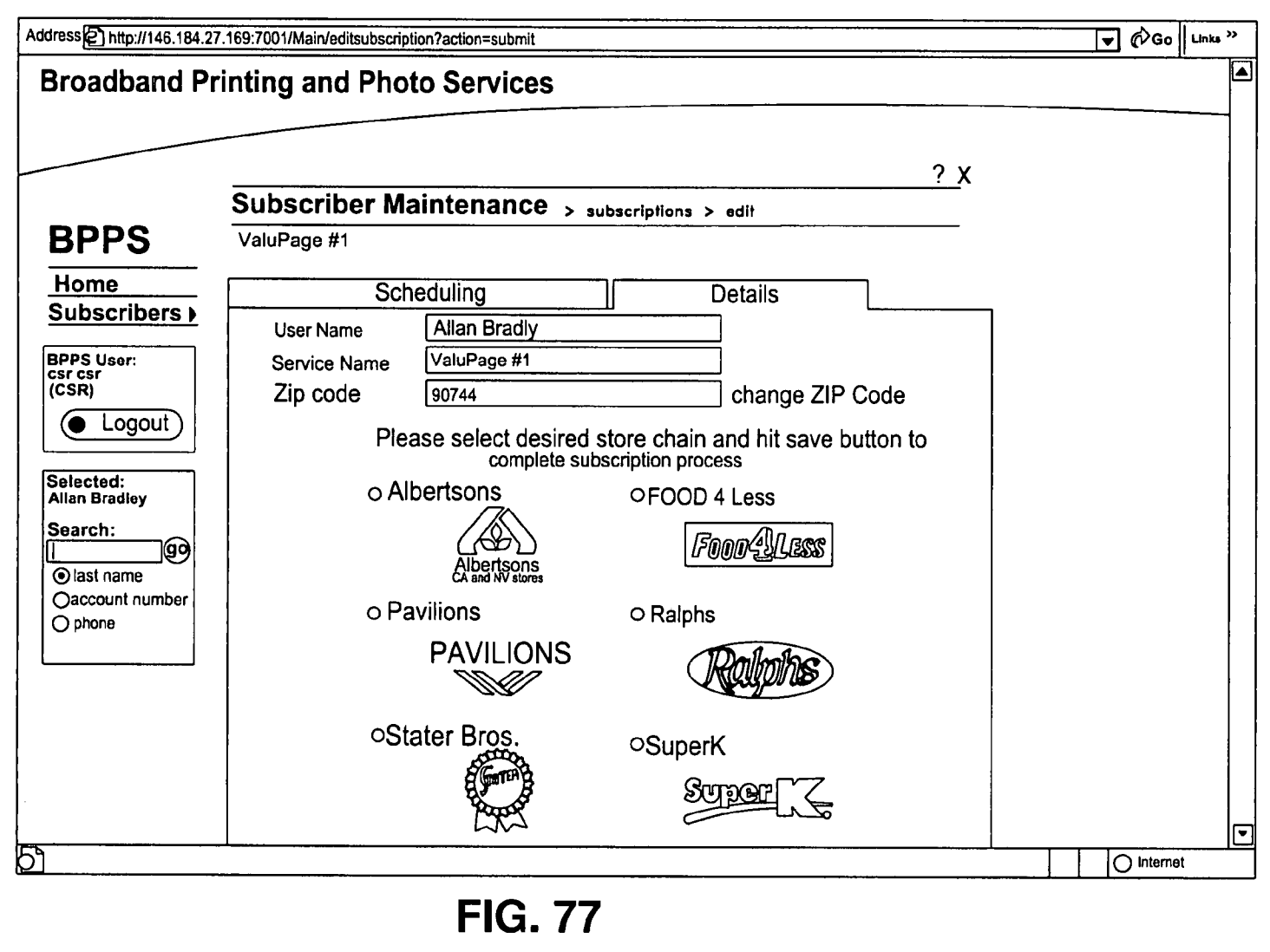
Figure 78:
Figure 79:
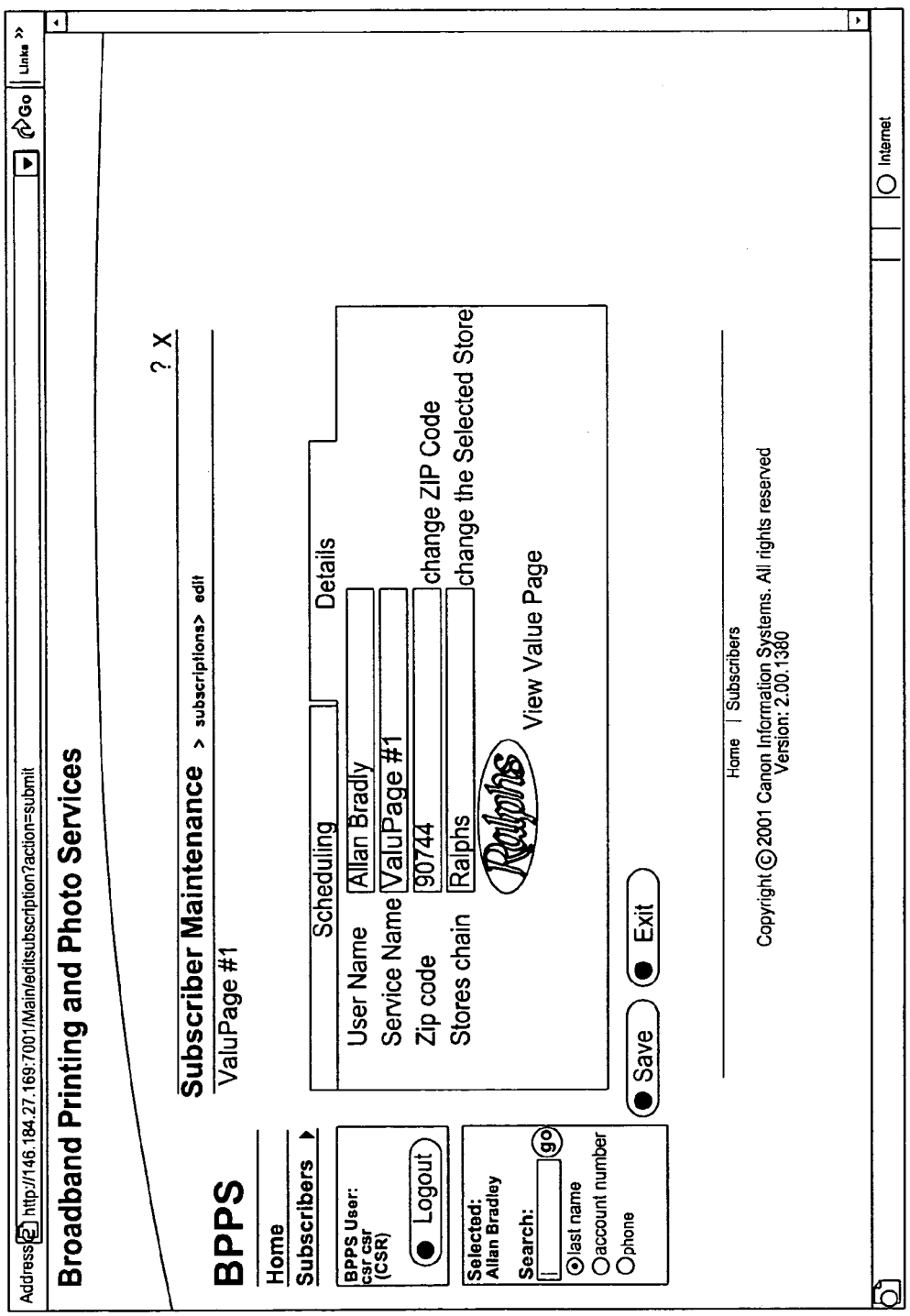

To add a new subscription, the operator can select Subscription button 305 and then the Add option. Upon selecting the foregoing, a listing of available services is shown as seen in FIG. 71. The operator selects one of the available services to add a subscription to, in this case, the ValuePage #1 service (a coupon service). As seen in FIG. 72, the PSB displays a scheduling tab and a details tab for configuring the subscription. The operator enters the scheduling information as shown in FIGS. 72, 73 and 74, and then selects the details tab. Upon selecting the details tab as shown in FIG. 75, the user's name and the service name, which are automatically populated by the PSB, are displayed in the tab, and then the operator enters the user's zip code (FIG. 76) to obtain a listing of vendors for which coupons are available. The listing returned for the user's zip code is shown in FIG. 77, from which the customer service representative selects Ralphs (FIG. 78) based on the user's preference. The Ralphs selection is confirmed as shown in FIG. 79, and upon selecting the Save button in FIG. 79, the user's subscriptions (North Side Broadcast and ValuePage #1) are listed in FIG. 80.

Figure 80:
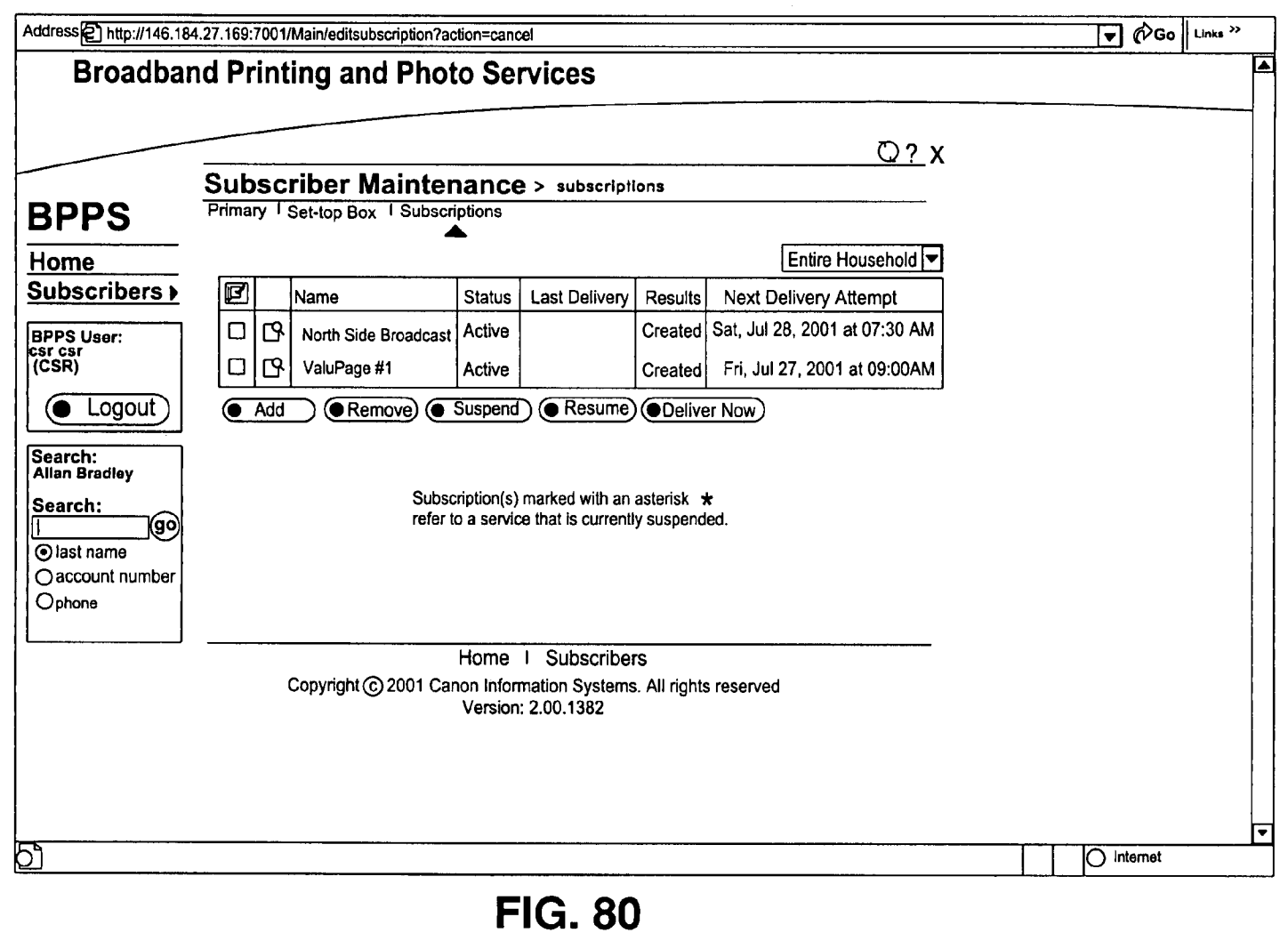

As briefly stated above, each of the user interfaces shown in FIGS. 18 to 80 is a composite web page that uses components from multiple sources (BPPS Framework and PSB) on a dynamic basis. The general user interface is provided in the form of a multi-source web page builder module which interacts with a container module. The web page builder module is used to create a composite web page for display on a user's display. In general, the web page builder module prepares a portion of a web page which is usually consistent from web page to web page. For example, a top portion and side portion of the composite web page may be consistent from one web page to another for use in providing basic navigational functions, error messages, and links to other associated web pages (BPPS Framework portion). The prepared portion of the composite web page leaves open a significant portion of the web page which is to be provided independently from the container module with which the web page builder module interfaces. The container module interfaces directly with one of a plurality of different web page modules. Each of the web page modules may be developed and provided by a third party, or may be developed and provided by the same party who developed the web page builder module. Each web page module prepares a portion of a web page independently for providing a user interface to functions supported by the web page module.

The container module is informed by the web page builder as to which of the web page modules are needed for constructing the composite web page. The container module then establishes an interface with the designated web page module. The web page module then provides a prepared web page portion to the container module which in turn passes the web page portion to the web page builder. The web page builder then combines the web page portion provided from the web page module with the already-prepared web page portion which was prepared by the web page builder in order to form a single composite web page. The single composite web page is then sent to the requesting user for display on the user's display. Preferably, all of the web page modules are designed and developed according to particular design guidelines, such that the composite web page always has the same overall look and feel, regardless of which one of the plurality of web page modules is providing a web page portion into the composite web page.

When a user selects a link, such as a URL, within the composite web page which requires support from another one of the web page modules, the container module establishes a connection with the newly-required web page module and receives the corresponding web page portion from that module. The container then passes the web page portion to the web page builder for incorporation into a new composite web page, which is then sent to the user's display. In this manner, a composite web page is dynamically built based on a first portion of the web page, which is always prepared and provided by the web page builder module, and a second portion of the web page, which is provided by any one of a plurality of web page modules which are utilized on a dynamic basis as the need arises. Because the plurality of web page modules are designed and developed according to a common display and interface specification, the overall look and feel of the composite web page is always provided to the user in a consistent and similar manner, thereby avoiding confusion during the use and navigation of the composite web page. Accordingly, the fact that the composite web page is built from multiple sources is transparent to the user.

Figure 81:
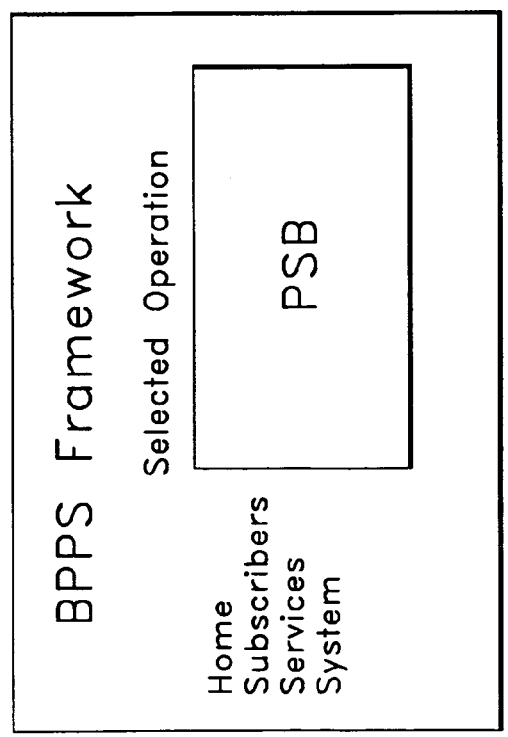
FIGS. 81 and 82 depict a structure of a multi-source web page according to the invention.
Figure 82:
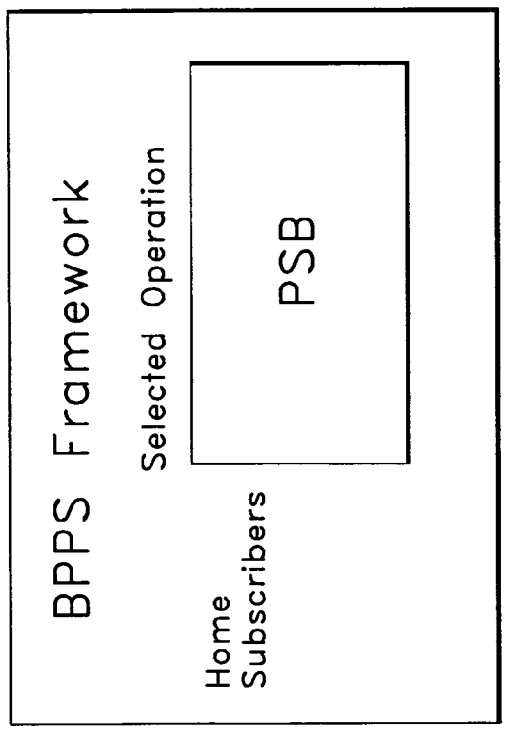

FIGS. 81 and 82 depict example structures of a multi-source web page. As seen in the figures, a background portion is built and displayed by the BPPS framework module while a foreground portion is built and displayed by the PSB module. The BPPS framework portion remains relatively consistent and generally only changes based on the operator rights of the operator that is logged in. That is, as seen in FIGS. 18 to 58, the framework includes (on the left-hand side of the page) Home, Subscribers, Services, and System options for a BPPS level and an MSO level operator, while the page only provides Home and Subscriber options for a customer service representative level operator. The foreground (PSB) portion dynamically changes based on the PSB invoked, but nonetheless is displayed somewhat consistent. For example, as seen in FIG. 22, the Print Library PSB is displayed at the BPPS level with Setup and About PSB tabs, while the same PSB is displayed at the MSO level with Manage Documents and About PSB tabs in FIG. 26. Likewise, the North Side Broadcast PSB is displayed in FIG. 36 with its configuration tabs (Set-up, English and About PSB). Accordingly, the display for each PSB dynamically changes, but yet remains somewhat consistent in its overall look and feel.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A publication service interface between a content service provider application and a content providing application in a network printing system, comprising:

functionality for configuring the interface for the content service provider to interface with the content providing application on a first level, wherein the first level comprises content service provider administration properties, wherein the content service provider administration properties comprise a service configuration operation, which includes at least one of an operation of adding a content service provider and an operation of deleting a content service provider, for a parameter to provide a service provided by the content service provider;

functionality for configuring the interface for a multi-service operator to interface with the content providing application on a second level, wherein the second level comprises multi-service level administration properties that comprise a portion of the content service provider administration properties which excludes the service configuration operation for the parameter to provide the service provided by the content service provider application; and functionality for configuring the interface for an end user to interface with the content providing application on a third level, wherein the third level comprises end user level administration properties that comprise a portion of the multi-service provider administration properties.

2. An interface according to claim 1, wherein the content service provider administration properties further comprise system maintenance, service maintenance and subscriber maintenance operations.

3. An interface according to claim 2, wherein the multi-service provider administration properties comprise the content service provider administration properties except system maintenance operations and service maintenance operations specifically relating to content service provider level operations.

4. An interface according to claim 3, wherein the end user administration properties comprise the subscriber maintenance operations.

5. An interface according to claim 2, wherein the system maintenance operations comprise viewing system status, viewing operators, adding and editing operators, and deleting operators, the service maintenance operations comprise viewing services, suspending services, resuming services and adding/removing services, and the subscriber maintenance properties comprise viewing subscribers, adding and editing subscribers and deleting subscribers.

6. An interface according to claim 5, wherein the multi-service administration properties comprise each of the system maintenance properties except some adding and editing operators and some deleting operators operations, each of the service maintenance operations except adding and removing services, and each of the subscriber maintenance operations.

7. An interface according to claim 5, wherein the end user administration properties comprise the subscriber maintenance properties.

8. An interface according to claim 1 further comprising functionality for obtaining content information from the content providing application at a scheduled delivery time, and for managing delivery of the content information to the end user.

9. An interface according to claim 1, wherein the interface can be configured differently for each of a plurality of multi-service operators to provide each multi-service operator with a different interface at the second level to the content providing application.

10. An interface according to claim 1, wherein the interface for the content service provider application on the first level is controlled by operating a configuration dialog that enables configuration of the content service provider administration properties.

11. An interface according to claim 1, wherein the interface for the content service provider application on the second level is controlled by operating a configuration dialog that enables configuration of the multi-service level administration properties that comprise a portion of the content service provider administration properties.

12. An interface according to claim 1, wherein the interface for the content service provider application on the third level is controlled by operating a configuration dialog that enables configuration of the end user level administration properties that comprise a portion of the multi-service provider administration properties.

13. An interface according to claim 1, further comprising:

functionality for obtaining identification information corresponding to a user; and functionality for determining a level of the interface in accordance with the obtained identification information.

14. A method of managing content information between a content service providing application and a content providing application, comprising the steps of:

the content service providing application interfacing with the content providing application on a first level to perform content service provider operator level administration operations, wherein the content service provider operator level administration operations comprise a service configuration operation, which includes at least one of an operation of adding a content service provider and an operation of deleting a content service provider, for a parameter to provide a service provided by the content service providing application;

a multi-service provider interfacing with the content providing application on a second level to perform multi-service operator level administration operations, the multi-service operator level operations being less than all of the content service provider operator level administration operations and excluding the service configuration operation for the parameter to provide the service provided by the content service provider application; and an end user interfacing with the content providing application on a third level to perform end user operator level administration operations, the end user operator level administration operations being less than all of the multi-service operator level operations.

15. A method according to claim 14, wherein the content service provider operator level administration properties further comprise system maintenance, service maintenance and subscriber maintenance operations.

16. A method according to claim 15, wherein the multi-service operator level administration properties comprise the content service provider administration properties except system maintenance operations and service maintenance operations specifically relating to content service provider operator level operations.

17. A method according to claim 16, wherein the end user operator level administration properties comprise the subscriber maintenance operations.

18. A method according to claim 14, wherein the interface on the first level is controlled by operating a configuration dialog that enables configuration of the content service provider operator level administration operations.

19. A method according to claim 14, wherein the interface on the second level is controlled by operating a configuration dialog that enables configuration of the multi-service operator level administration operations that are less than all of the content service provider operator level administration operations.

20. A method according to claim 14, wherein the interface on the third level is controlled by operating a configuration dialog that enables configuration of the end user operator level administration operations that are less than all of the multi-service provider operator level administration operations.

21. A method according to claim 14, further comprising:
obtaining identification information corresponding to a user; and
determining a level of the interface in accordance with the obtained identification information.

22. A method of managing content information in a network printing system, comprising the steps of:

a printing content service provider, which maintains a content printing service application, configuring an interface between the content printing service application and a content providing application, which is maintained by a content provider, so that the content printing service application can perform content service provider administration operations with the content providing application on a first level, wherein the first level comprises administration operations comprising a service configuration operation, which includes at least one of an operation of adding a content service provider and an operation of deleting a content service provider, for a parameter to provide a service by the printing content service provider;

a multi-service operator, which provides subscriptions for a printing service provided by the printing content service provider to end users of the multi-service operator, configuring the interface to interface between the multi-service operator and the content providing application so that the multi-service operator can perform administration operations on the content providing application on a second level, wherein the second level comprises a portion of the content service provider administration operations excluding the service configuration operation for the parameter to provide the service by the content service provider; and an end user, which subscribes to the printing service provided by the multi-service operator, configuring the interface between the end user and the content providing application for the end user to perform administration operations on the content providing application on a third level.

23. A method according to claim 22, wherein the printing content service provider configures the interface by operating a configuration dialog that enables configuration of the administration operations on the first level.

24. A method according to claim 22, wherein the multi-service operator configures the interface by operating a configuration dialog that enables configuration of the administration operations on the second level.

25. A method according to claim 22, wherein the end user configures the interface by operating a configuration dialog that enables configuration of the administration operations on the third level.

26. A method according to claim 22, further comprising:
prior to any one of the printing content service provider, the multi-service operator and the end user configuring the interface, obtaining identification information corresponding to the user; and
determining a level of the interface in accordance with the obtained identification information.

27. A network printing system, comprising:
a printing content service provider that provides a content printing service application, the content printing service application including an interface with a content providing application of a content provider that provides content information to be included in a publication generated by the content printing service application, the interface being configured for the printing content service provider to perform content service provider administration operations on the content providing application on a first level, wherein the first level comprises administration operations comprising a service configuration operation, which includes at least one of an operation of adding a content service provider and an operation of deleting a content service provider, for a parameter to provide a service by the printing content service provider;

a multi-service operator that provides subscriptions to the printing service to end users, the interface being configured for the multi-service operator to perform administration operations on the content providing application on a second level, wherein the second level comprises a portion of the content service provider administration operations excluding the service configuration operation for the parameter to provide the service by the content service provider; and an end user that subscribes to the printing service with the multi-service operator, the interface being configured for the end user to perform administration operations on the content providing application on a third level.

28. A system according to claim 27, wherein the interface for the printing service application is configured on the first level by operating a configuration dialog that enables configuration of the content service provider administration operations.

29. A system according to claim 27, wherein the interface for the content service provider application is configured on the second level by operating a configuration dialog that enables configuration of the multi-service operator administration operations.

30. A system according to claim 27, wherein the interface for the content service provider application is configured on the third level by operating a configuration dialog that enables configuration of the end user level administration operations.

31. A system according to claim 27, wherein, prior to the interface being configured by any one of the printing content service provider, the multi-service operator and the end user, the printing service application obtaining identification information corresponding to the user, and determining a level of the interface in accordance with the obtained identification information.

32. A broadband printing system in which content information maintained by a content provider is printed on an end user's printer based on subscription information provided by the end user to a broadband printing content service provider, comprising:

plural content providers that each maintain a content providing application of content information for printing on the end user's printer;

a broadband printing content service provider that operates a broadband printing service that obtains content information from at least one of the plural content providers and processes the obtained content information to be printed on the end users printer;

plural multi-service operators that each receive subscription requests for the broadband printing service from plural end users, wherein each multi-service operator can determine which of the plural content providers the end user can request a subscription to; and plural end users that subscribe with at least one of the plural multi-service operators to receive content information and have it printed on the end user's printer, wherein, an interface between the broadband content printing service and the content providing application provides for the broadband content printing service to perform content service provider operations with the content providing application on a first level, wherein the first level comprises administration operations comprising a service configuration operation, which includes at least one of an operation of adding a content service provider and an operation of deleting a content service provider, for a parameter to provide a service by the printing content service provider, for each of the plural multi-service operators to perform operations with the content providing application on a second level lower than the first level, wherein the second level comprises a portion of the content service provider administration operations excluding the service configuration operation for the parameter to provide the service by the content service provider, and for each of the end user's to perform operations with the content providing application on a third level lower than the second level.

* * * * *